(12) United States Patent
Hsu et al.

(10) Patent No.: US 11,205,116 B2
(45) Date of Patent: Dec. 21, 2021

(54) THREE-DIMENSIONAL NEURAL NETWORK ARRAY

(71) Applicants: Fu-Chang Hsu, San Jose, CA (US); Kevin Hsu, San Jose, CA (US)

(72) Inventors: Fu-Chang Hsu, San Jose, CA (US); Kevin Hsu, San Jose, CA (US)

(*) Notice: Subject to any disclaimer, the term of this patent is extended or adjusted under 35 U.S.C. 154(b) by 989 days.

(21) Appl. No.: 15/835,375

(22) Filed: Dec. 7, 2017

(65) Prior Publication Data

US 2018/0165573 A1 Jun. 14, 2018

Related U.S. Application Data

(60) Provisional application No. 62/574,895, filed on Oct. 20, 2017, provisional application No. 62/572,411, filed on Oct. 13, 2017, provisional application No. 62/570,518, filed on Oct. 10, 2017, provisional application No. 62/432,563, filed on Dec. 9, 2016.

(51) Int. Cl.
*G06N 3/063* (2006.01)
*G06N 3/04* (2006.01)

(52) U.S. Cl.
CPC .............. *G06N 3/063* (2013.01); *G06N 3/04* (2013.01); *G06N 3/0454* (2013.01)

(58) Field of Classification Search
CPC ......... G06N 3/063; G06N 3/04; G06N 3/0454
See application file for complete search history.

(56) References Cited

U.S. PATENT DOCUMENTS

| 5,422,982 | A | * | 6/1995 | Pernisz | G06N 3/063 706/33 |
| 8,775,341 | B1 | | 7/2014 | Commons | |
| 9,189,732 | B2 | * | 11/2015 | Bichler | G06N 3/088 |
| 10,489,700 | B1 | * | 11/2019 | Asnaashari | G06N 3/04 |
| 2005/0146787 | A1 | | 7/2005 | Lukyanitsa | |
| 2010/0241601 | A1 | | 9/2010 | Carson et al. | |

(Continued)

FOREIGN PATENT DOCUMENTS

KR 20170080441 A * 7/2017

OTHER PUBLICATIONS

Wang et al., "3D Synaptic Architecture with Ultralow sub-10 fJ Energy per Spike for Neuromorphic Computation", Dec. 15-17, 2014. IEEE (Year: 2014).*

(Continued)

*Primary Examiner* — Alan Chen
(74) *Attorney, Agent, or Firm* — Intellectual Property Law Group LLP

(57) ABSTRACT

Three-dimensional neural network array. In an exemplary embodiment, a three-dimensional (3D) neural network includes a plurality of input conductors forming a plurality of stacked input layers having a first orientation, and at least one output conductor forming an output layer having the first orientation. The three-dimensional (3D) neural network also includes a plurality of hidden conductors having a second orientation. Each hidden conductor includes an in-line threshold element. The three-dimensional (3D) neural network also includes synapse elements coupled between the hidden conductors and the input conductors and between the hidden conductors and the output conductor. Each synapse element includes a programmable resistive element.

20 Claims, 58 Drawing Sheets

(56) References Cited

U.S. PATENT DOCUMENTS

| | | | | |
|---|---|---|---|---|
| 2011/0119215 A1* | 5/2011 | Elmegreen | ............ | G06N 3/0635 |
| | | | | 706/37 |
| 2011/0267866 A1* | 11/2011 | Carter | ....................... | G11C 5/06 |
| | | | | 365/63 |
| 2016/0133317 A1* | 5/2016 | Lee | .................... | H01L 27/11568 |
| | | | | 257/314 |
| 2017/0154257 A1* | 6/2017 | Cao | ......................... | G06N 3/049 |
| 2018/0260694 A1* | 9/2018 | Bedell | ..................... | G06N 3/084 |

OTHER PUBLICATIONS

International Search Report, dated of Mar. 23, 2018, for corresponding International Application No. PCT/US2017/065194.

Written Opinion of the International Searching Authority, dated of Mar. 23, 2018, for corresponding International Application No. PCT/US2017/065194.

\* cited by examiner

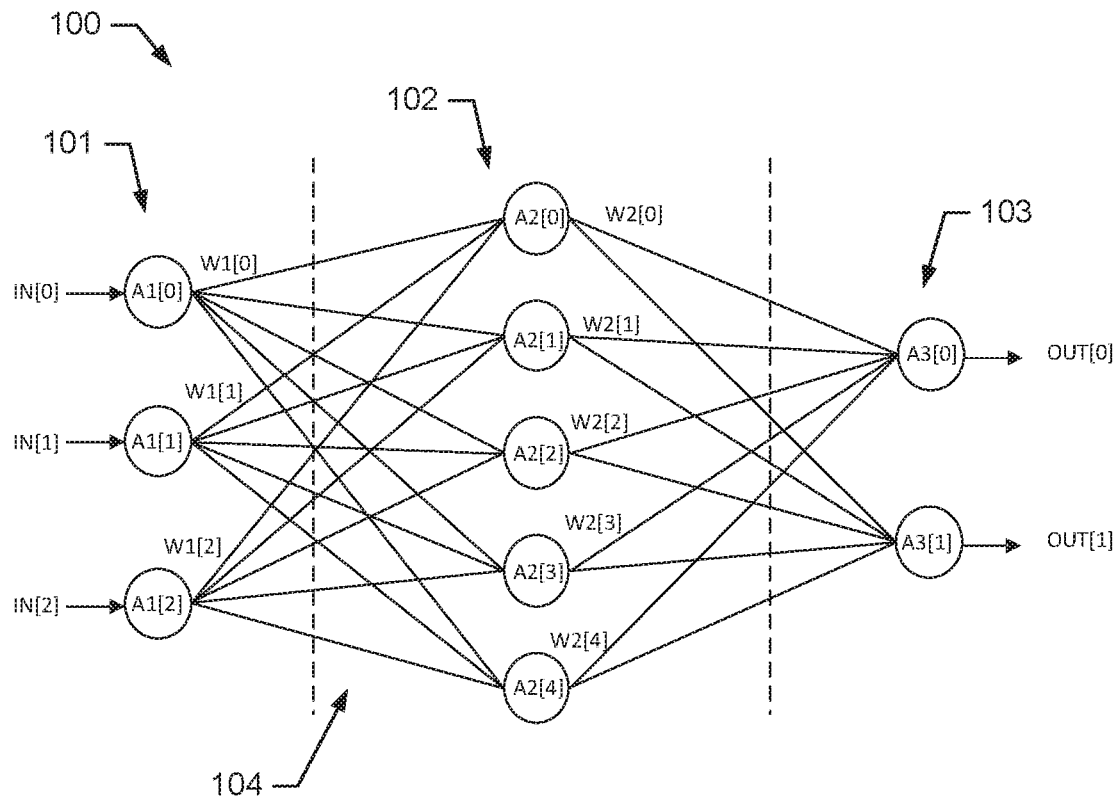
FIG. 1A
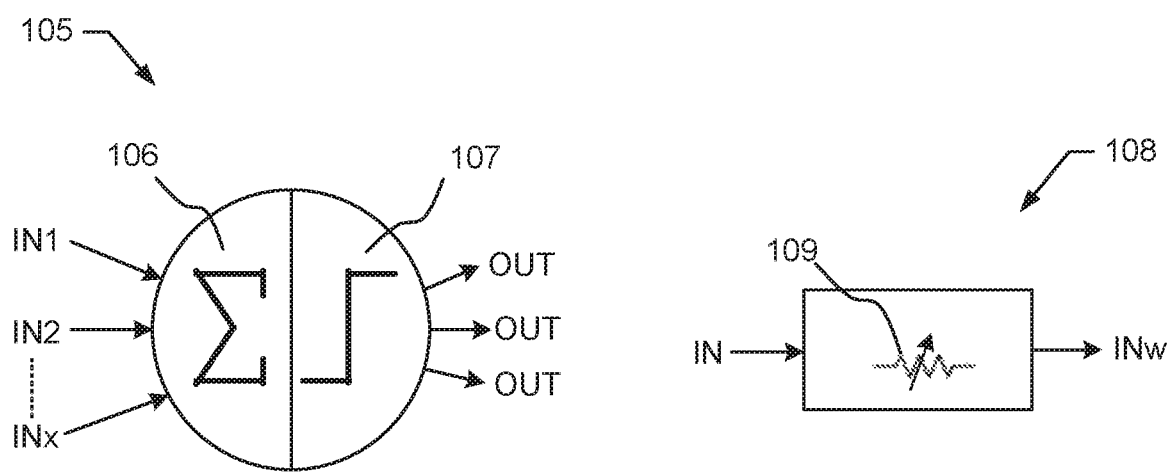
FIG. 1B
FIG. 1C

THREE-DIMENSIONAL NEURAL NETWORK ARRAY

PRIORITY

This application claims the benefit of priority based upon U.S. Provisional Patent Application having Application No. 62/432,563, filed on Dec. 9, 2016, and entitled "NOVEL 3D VERTICAL NEURAL NETWORK ARRAY" and U.S. Provisional Patent Application having Application Ser. No. 62/570,518, filed on Oct. 10, 2017, and entitled "3D NEURAL NETWORK ARRAY" and U.S. Provisional Patent Application having application Ser. No. 62/572,411, filed on Oct. 13, 2017, and entitled "3D NEURAL NETWORK ARRAY" and U.S. Provisional Patent Application having Application No. 62/574,895, filed on Oct. 20, 2017, and entitled "3D NEURAL NETWORK ARRAY," all of which are hereby incorporated herein by reference in their entireties.

FIELD OF THE INVENTION

The exemplary embodiments of the present invention relate generally to the field of semiconductors, and more specifically to the design and operation of semiconductors forming neural network arrays.

BACKGROUND OF THE INVENTION

A neural network is an artificial intelligence (AI) system that has learning capabilities. AI systems have been used for may applications such as voice recognition, pattern recognition, and hand-writing recognition to name a few.

The typical neural network may be implemented by using software or hardware. A software implementation of a neutral network relies on a high-performance CPU to execute specific algorithms. For very high density neural networks, the speed of the CPU may become a bottleneck to the performance of real-time tasks. On the other hand, the hardware implementation is more suitable for high-speed real-time applications. However, typical circuit sizes may limit the density or size of the neuron network thereby limiting its functionality.

Therefore, it is desirable to have a high-density neural network that overcomes the problems associated with conventional networks.

SUMMARY

A novel high-density three-dimensional (3D) neutral network array structure is disclosed. In various exemplary embodiment, the 3D neural network array provides much higher density and speed over conventional neural networks.

In an exemplary embodiment, a three-dimensional (3D) neural network is disclosed that includes a plurality of input conductors forming a plurality of stacked input layers having a first orientation, and at least one output conductor forming an output layer having the first orientation. The three-dimensional (3D) neural network also includes a plurality of hidden conductors having a second orientation. Each hidden conductor includes an in-line threshold element. The three-dimensional (3D) neural network also includes synapse elements coupled between the hidden conductors and the input conductors and between the hidden conductors and the output conductor. Each synapse element includes a programmable resistive element.

In an exemplary embodiment, a synapse element is disclosed for use in a three-dimensional (3D) neural network. The synapse element comprises a threshold layer having an outside surface connected to a first conductor and also includes an inside surface. The synapse element also includes a programmable resistive layer having an outside surface connected to the inside surface of the threshold layer and an inside surface connected to a second conductor. The programmable resistive layer is programmable to provide a plurality of resistance values.

In an exemplary embodiment, a three-dimensional (3D) neural network is disclosed that comprises a first plurality of input conductors forming a first plurality of input layers, a second plurality of input conductors forming a second plurality of input layers, a plurality of output conductors forming a plurality of output layers, and a plurality of hidden conductors. The three-dimensional (3D) neural network also comprises a plurality of synapse elements that connect the input and output conductors to the hidden conductors. Each synapse element includes a programmable resistive element and a threshold element.

Additional features and benefits of the exemplary embodiments of the present invention will become apparent from the detailed description, figures and claims set forth below.

BRIEF DESCRIPTION OF THE DRAWINGS

The exemplary embodiments of the present invention will be understood more fully from the detailed description given below and from the accompanying drawings of various embodiments of the invention, which, however, should not be taken to limit the invention to the specific embodiments, but are for explanation and understanding only.

FIG. 1A shows an exemplary embodiment of a neural network structure;

FIG. 1B shows an exemplary embodiment of a neuron and its associated functions;

FIG. 1C shows an exemplary embodiment of a synapse and its associated functions;

DETAILED DESCRIPTION

Figure 2:
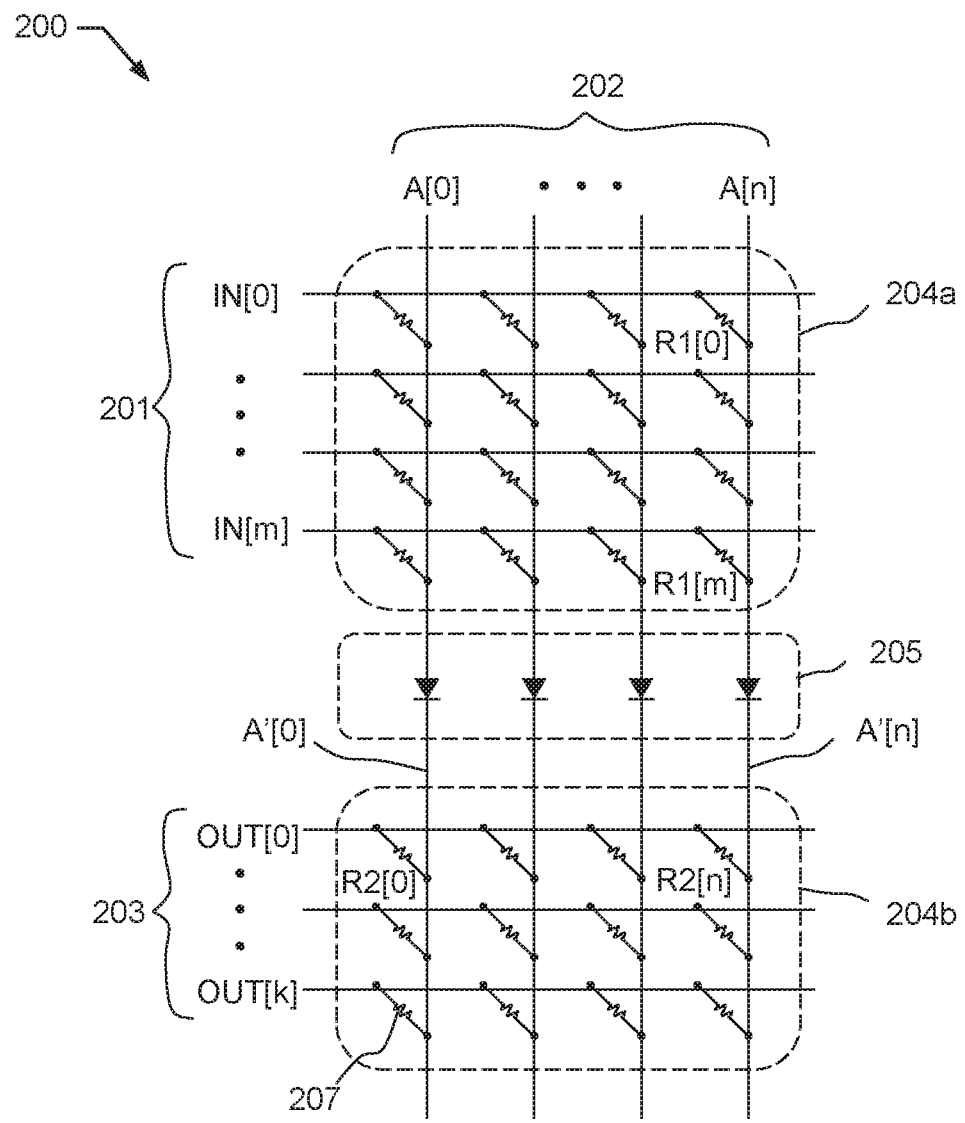
FIG. 2 shows an exemplary embodiment of a circuit implementing a 3D neural network.

Those of ordinary skilled in the art will realize that the following detailed description is illustrative only and is not intended to be in any way limiting. Other embodiments of the present invention will readily suggest themselves to skilled persons having the benefit of this disclosure. Reference will now be made in detail to implementations of the exemplary embodiments of the present invention as illustrated in the accompanying drawings. The same reference indicators or numbers will be used throughout the drawings and the following detailed description to refer to the same or like parts.

FIG. 1A shows an exemplary embodiment of a neural network structure 100. The neural network structure 100 comprises three layers. The first layer is an input layer 101 that includes three input neurons (A1[0]-A1[2]). A second layer is a hidden layer 102 that includes five neurons (A2[0]-A2[4]). A third layer is an output layer 103 that includes two neurons (A3[0]-A3[1]). In other embodiments, the neural network structure 100 may contain more than one hidden layer, and any number of neurons in each layer. With more layers and more neurons, the neural network structure 100 can learn more complicated tasks.

The neurons of the different layers are connected through synapses 104 that transfer signals between the neurons. Each synapse applies a variable 'weight' to the signal flowing through it. For example, the synapse connecting neurons A1[0] and A2[0] provides weight W1[0] to the signal flowing through it, and the synapse connecting neurons A1[1] and A2[0] provides weight W1[1] to the signal flowing through it, respectively. As illustrated in FIG. 1A, the synapses connecting the input layer 101 neurons to the hidden layer 102 neurons provide variable weights W1[x], and the synapses connecting the hidden layer 102 neurons to the output layer 103 neurons provide variable weights W2[x].

During operation, input signals IN(0-2) flow into the input layer 101 neurons and then flow through one or more hidden layers of neurons, such as hidden layer 102, and finally flow to the output layer 103 neurons. By adjusting the weights of the synapses it is possible to "train" the neural network 100 to generate a desired set of outputs (OUT(0-1) given a particular set of inputs (IN(0-2)).

FIG. 1B shows an exemplary embodiment of a neuron 105 and its associated functions. For example, the neuron 105 is suitable for use as any of the neurons shown in FIG. 1A. The neuron 105 provides two functions. The first function is a summation function 106, and the second function is a threshold function 107. The summation function 106 determines the sum of input signals (e.g., IN1-INx) that are received by the neuron. The threshold function 107 determines whether the sum exceeds a threshold value. If the sum exceeds the threshold value, the neuron generates one or more output signals (OUT) having a particular output value. For example, for the hidden layer 102 neuron A2[0] shown in FIG. 1A, the sum of its input signals can be determined from the following expression.

$$A2[0]=IN[0] \times W1[0])+(IN[1] \times W1[1])+(IN[2] \times W1[2]) \quad \text{(Eq. 1)}$$

Similarly, for the output layer 103 neuron A3[0] shown in FIG. 1A, the sum of its input signals can be determined from the following expression.

$$A3[0]=(A2[0] \times W2[0])+(A2[1] \times W2[1])+(A2[2] \times W2[2])+(A2[3] \times W2[3])+(A2[4] \times W2[4]) \quad \text{(Eq. 2)}$$

For each neuron, the sum of its inputs is passed to its threshold function (e.g., 107). When the sum of the inputs is higher than the threshold, the threshold function will generate an output signal to the neuron's output(s). Otherwise, there is no output from the neuron. For example, when the sum of the inputs is higher than the threshold, the neuron may generate a signal of logic 1 to the output. When the sum is lower than the threshold, the neuron may generate a signal of logic 0 to the output. In a hardware implementation, logic 1 may be VDD and logic 0 may be 0V. This mechanism is also known as 'winner takes all'.

FIG. 1C shows an exemplary embodiment of a synapse element 108 and its associated function. For example, the synapse element 108 is suitable for use as any of the synapses 104 shown in FIG. 1A. The synapse element 108 comprises a variable weighting function 109 that applies a variable weight to a signal received at the synapse input to generate a weighted signal (INw) at the output of the synapse element. In an exemplary embodiment, the variable weighting function 109 provides either a continuous weighting function or variable weighting in discrete steps. For example, in an exemplary embodiment, the variable weighting function provides variable weighting in 8 steps. For example, in an exemplary embodiment, the variable weighting function provides variable weighting in 8 steps, such as 1K ohm, 5K ohm, 10K ohm, 50K ohm, 100K ohm, 500K ohm, 1M ohm, 5M ohm. In other exemplary embodiments, the synapse element includes a threshold function in addition to the weighting function. A more detailed description of the how the synapse operates to provide the variable weighting function is provided below.

The learning process for a neural network (e.g., the network 100) includes two steps. The first step is called forward-propagation, which calculates an output of the network based on the inputs and the existing weights of the synapses. After that, the output is compared to a desired output to obtain an error value. The second step is called backward-propagation and is used to adjust the weights of the synapses according to the error value. The purpose of the adjustment of the weights of the synapses is to reduce the error value. These two steps are alternatively repeated many times to gradually reduce the error value until the error value is smaller than a predetermined error threshold. At that point, the learning or "training process" is complete. The final weights stored in the synapses represents the learning result. The neural network then can be used for applications such as pattern recognition. When the inputs are presented, the neural network performs forward-propagation with the stored weights to generate the desired output.

In various exemplary embodiments, novel three-dimensional (3D) 'vertical' neural network arrays are disclosed that utilize resistive material to implement the synapse weights, such as programmable resistive material or phase-change material (PCM).

FIG. 2 shows an exemplary embodiment of a circuit 200 implementing a 3D neural network. The circuit 200 comprises an input layer 201 that includes (m+1) inputs IN[0] IN[m], a hidden layer 202 that includes (n+1) neurons A[0]-A[n], and an output layer 203 that includes (k+1) outputs OUT[0]-OUT[k]. The circuit 200 also comprises resistive elements 204a and 204b that represent the 'synapses' connecting the inputs to the hidden layer neurons, and the hidden layer neurons to the outputs, respectively.

In an exemplary embodiment, the voltage of A[n] can be expressed as:

$$A[n]=\{IN[0]/R1[0]+ \ldots +IN[m]/R1[m]\}/(1/R1[0]+ \ldots +1/R1[m]),$$

assuming;

$$W1[m]=1/\{R1[m]\times(1/R1[0]+ \ldots +1/R1[m])\},$$

then A[n] becomes;

$$A[n]=(IN[0]\times W1[0])+ \ldots +(IN[m]\times W1[m]), \quad (Eq. 3)$$

which is equal to the summation function of the neural network as expressed in Eq. 2.

The circuit 200 also comprises diodes 205 that may be Schottky diodes or any device that perform a threshold function. The outputs of the diodes 205 are A'[0] to A'[n].

Similarly, the voltage of OUT[k] equals to:

$$OUT[k]=\{A'[0]/R2[0]+ \ldots +A'[n]/R2[n]\}/(1/R2[0]+ \ldots +1/R2[n])$$

Assuming $$W2[n]=1/\{R2[m]\times(1/R2[0]+ \ldots +1/R2[n])\}$$

then A[n] becomes:

$$OUT[k]=(A'[0]\times W2[0])+ \ldots +(A'[n]\times W2[n]) \quad (Eq. 4)$$

This equals to the summation function of the neural network as expressed in Eq. 2. As a result, a multiple layer 3D neural network is realized by the circuit 200 shown in FIG. 2.

Figure 3A:
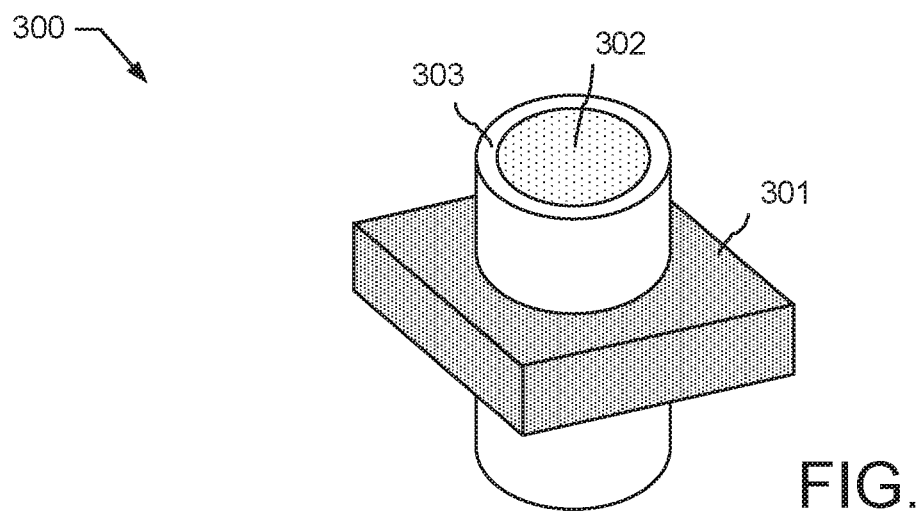
FIG. 3A shows an exemplary embodiment of a synapse.

FIG. 3A shows an exemplary embodiment of a synapse 300. For example, the synapse 300 is suitable for use as any of the synapses shown in FIG. 2 (e.g., the synapse 207). The synapse 300 comprises conductors 301 and 302 that comprise a suitable metal, such as tantalum (Ta), platinum (Pt), or titanium (Ti). The synapse 300 also comprises resistive material 303, such as HfOx, or TaOx. The resistive material 303 surrounds the conductor 302 and is located between the conductors 301 and 302. The resistance of the resistive material may be changed by applying the appropriate bias conditions to the conductors 301 and 302. Thus, the synapse 300 can be programmed with the appropriate bias conditions to provide variable resistance for use in a neural network array. In an exemplary embodiment, the resistive material 303 can be programmed to provide either a continuous weighting function or variable weighting in discrete steps. For example, in an exemplary embodiment, the variable weighting function provides variable weighting in 8 resistive steps. For example, in an exemplary embodiment, the resistive material 303 can be programmed to provide variable weighting in 8 resistive steps, such as 1K ohm, 5K ohm, 10K ohm, 50K ohm, 100K ohm, 500K ohm, 1M ohm, and 5M ohm. For example, in an exemplary embodiment, programming can be performed by an external programming device (not shown) that biases each resistive element to achieve its desired resistance value.

Figure 3B:
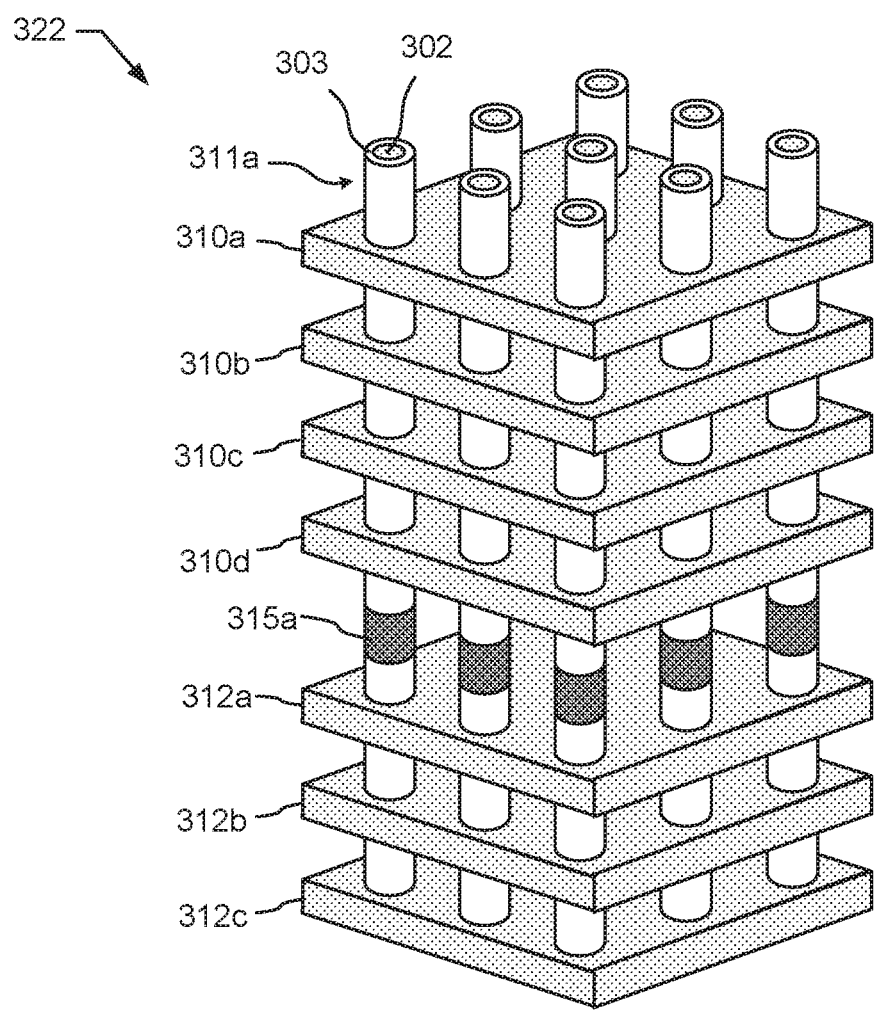
FIG. 3B shows an exemplary embodiment of a 3D neural network array that includes synapses as shown in FIG. 3A.

FIG. 3B shows an exemplary embodiment of a 3D neural network array 322 that includes synapses configured as shown in FIG. 3A. The array 322 comprises conductive input layers 310a to 310d, which correspond to the (m+1) inputs IN[0]-IN[m] as shown in FIG. 2. For the purpose of describing FIG. 3B, it will be assumed that m equals 3. The array 322 also comprises (n+1) hidden layer neurons (e.g., neuron 302), which correspond to A'[0]-A'[n] as shown in FIG. 2. For the purpose of describing FIG. 3B, it will be assumed that n equals 8. The array 322 also comprises nine diodes (e.g., diode 315a), which can be Schottky diodes or other material that exhibits threshold behavior. For example, there is one diode for each neuron. The array 322 also comprises conductive output layers 312a to 312c, which correspond to (k+1) outputs OUT[0]-OUT[k] as shown in FIG. 2. For the purpose of describing FIG. 3B, it will be assumed that k equals 2. Thus, the array 322 implements an embodiment of the circuit 200 shown in FIG. 2.

In an exemplary embodiment, the nine neurons (e.g., neuron 302) are formed by trenching holes through the multiple input and output layers. For clarity, fill material between the layers is not shown, but it is understood that trenched holes pass through the fill material as well as the layers. Inside the trench holes, the resistive material layer 303 is formed on the sidewalls of the holes, and then a neuron conductor layer 302 is formed in the center of the trench holes. Thus, the intersection of each neuron (e.g., 302) and each layer (e.g., 310a) forms a synapse as illustrated in FIG. 3A.

Figure 3C:
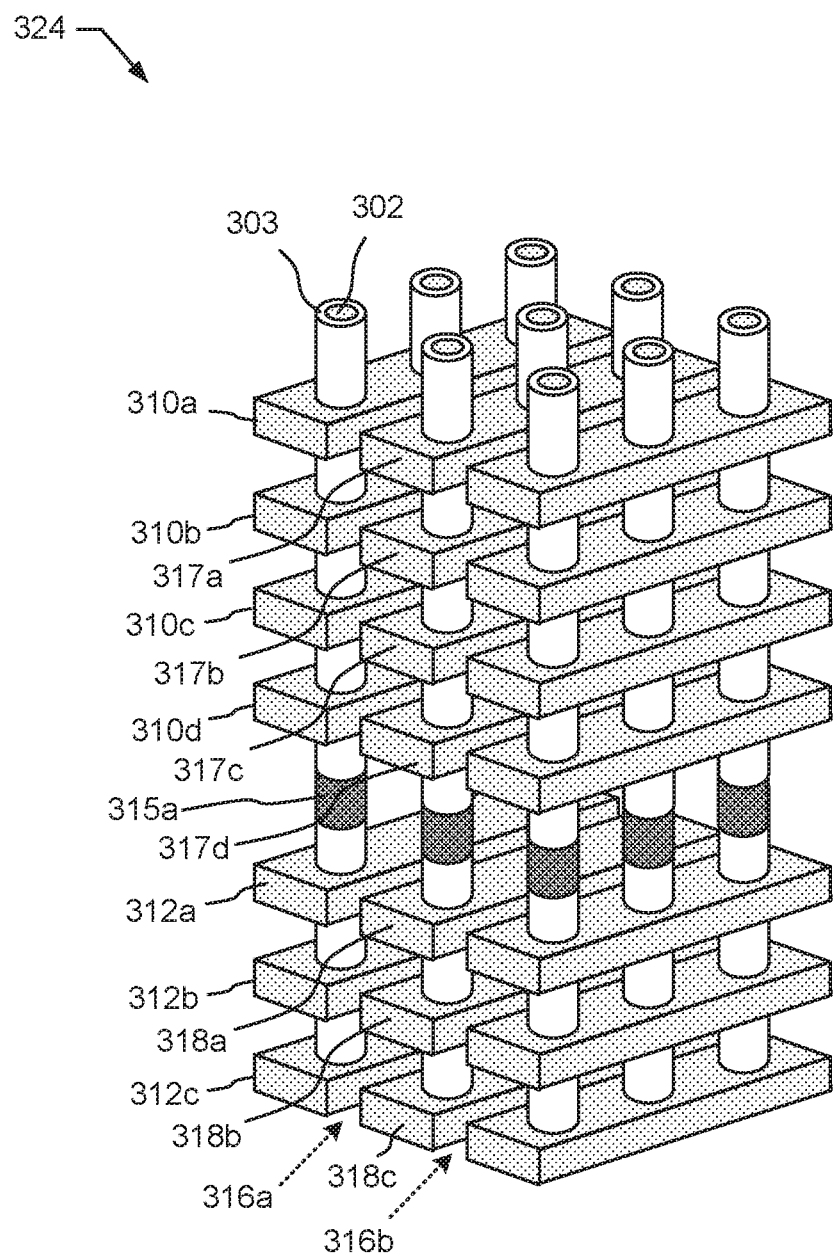
FIG. 3C shows another exemplary embodiment of a 3D neural network array that includes synapses as shown in FIG. 3A.

FIG. 3C shows another exemplary embodiment of a 3D neural network array 324 that includes synapses as shown in FIG. 3A. The array 324 is similar to the array 322 shown in FIG. 3B except that each horizontal input and output layer is cut into three segments forming slits 316a and 316b (e.g., unconnected regions between the segments). Therefore, the input layers are separated into groups, such as first input group comprising segments 310a-310d and a second input group comprising segments 317a-317d. Likewise, the output layers are separated into groups, such as first output group comprising segments 312a-312c and second output group comprising segments 318a-318c. It should be noted that the hidden layer neurons (e.g., neuron 302) and diodes (e.g., diode 315a) are unchanged from FIG. 3B. Thus, the 3D neural network array 324 structure is organized into multiple input and output groups.

Figure 3D:
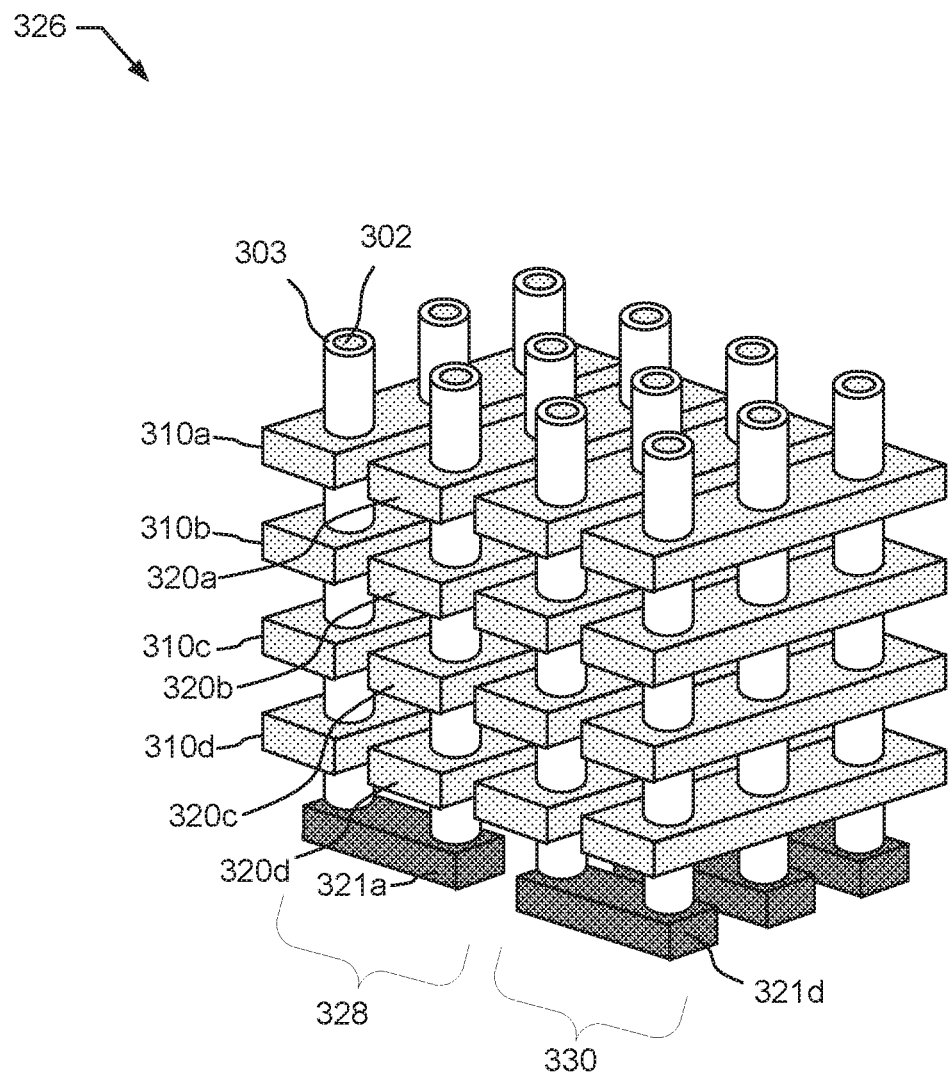
FIG. 3D shows another exemplary embodiment of a 3D neural network array that includes synapses as shown in FIG. 3A.

FIG. 3D shows another exemplary embodiment of the 3D neural network array 326 that includes synapses as shown in FIG. 3A. In this embodiment, the array 326 comprises a first input/output group 328 and a second input/output group 330. The first input/output group 328 comprises four input layers (e.g., 310a, 310b, 310c, and 310d) and four output layers (e.g., 320a, 320b, 320c, and 320d). The diode 321a divides the input and output layers of the first input/output group 328 and the diode 321d divides the input and output layers of the second input/output group 330. Also shown are neurons (e.g., 302) that run through the first input/output group 328. The second input/output group 330 is configured similarly to the first input/output group 328 and includes diode 321 separating the input and output layers.

Figure 4:
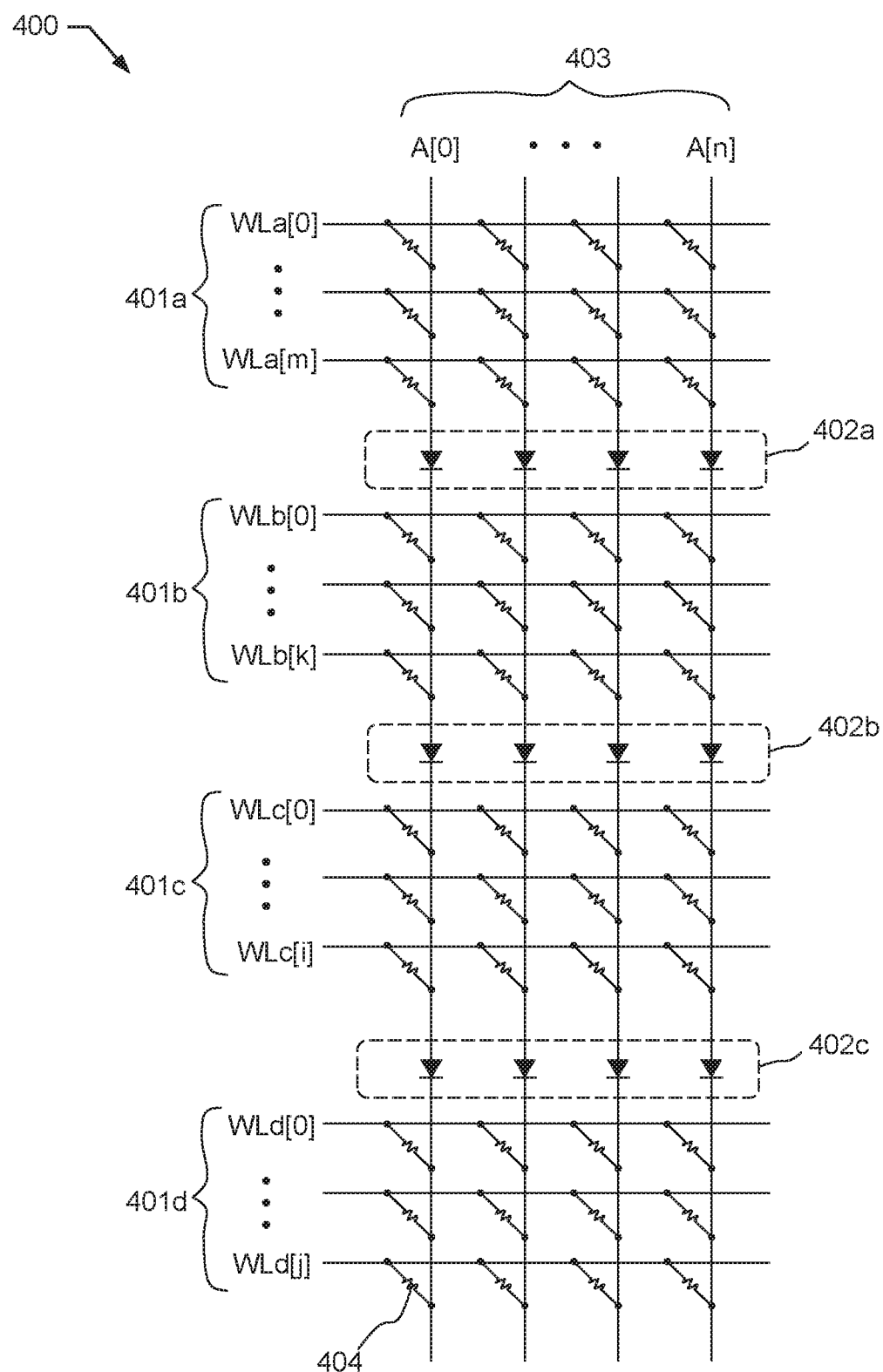
FIG. 4 shows an exemplary embodiment of a 3D neural network array.

FIG. 4 shows an exemplary embodiment of a circuit forming a neural network array 400. The array 400 comprise four groups of signal lines (401a, 401b, 401c, and 401d), (n+1) neurons 403, and three groups of threshold device (402a, 402b, and 402c). Each of the signal lines is connected to the (n+1) neurons through programmable resistive elements (e.g., resistive element 404). In this embodiment, the array 400 can be flexibly configured into different input/output configurations.

In one exemplary configuration, the signal lines 401a (e.g., WLa[0]-Wla[m]) are used as inputs and the signal lines 401b, 401c, and 401d are used as outputs. In another exemplary configuration, the signal lines 401a and 401b are used as inputs, and signal lines 401c and 401d are used as outputs. In another exemplary configuration where the diodes 402c are reversed, the signal lines 401a, 401b, and 401d are used as inputs, and the signal lines 401c are used as outputs.

In another exemplary configuration, the array is configured into two groups of neural networks. The first group uses the signal lines 401a as inputs and signal lines 401b as outputs. The second group uses signal lines 401c as inputs and signal lines 401d as outputs. When one group is activated, the other group is supplied with a reverse bias condition so that the threshold devices avoid disturbing to the activated group. For example, if the first group containing signal lines 401a and 401b is in operation, the second group's signal lines 401c and 401d are supplied with a voltage high enough to turn off the diodes 402b and 402c. Similarly, if the second group containing signal lines 401c and 401d is in operation, the first group's signal lines 401a and 401b are supplied with voltage low enough to turn off the diodes 402a and 402b.

Figure 5A:
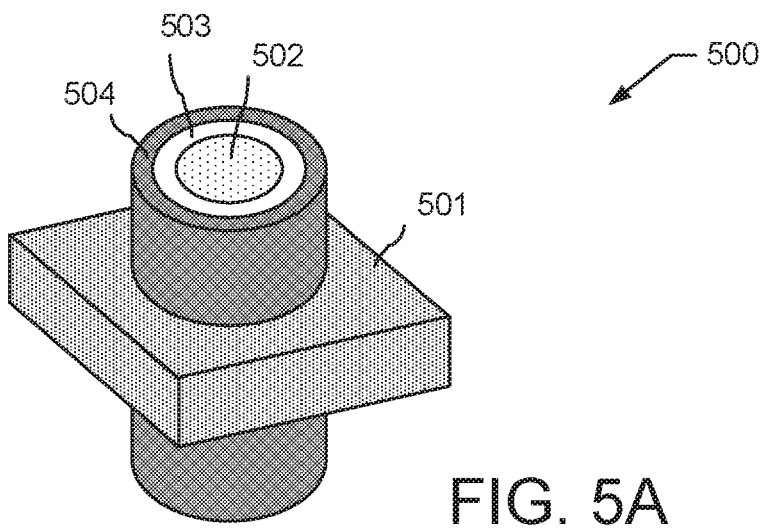
FIGS. 5A-C show exemplary embodiments of synapses (or cells) for use in a 3D neural network.

FIG. 5A shows an exemplary embodiment of a synapse 500 for use in a 3D neural network that comprises conductor layers 501 and 502, which may comprise metal or polysilicon. The synapse 500 also comprises resistive layer 503 and selector (threshold) layer 504. The selector layer 504 comprises a diode such as a Schottky diode, or other material having threshold behavior such as NbOx, TaOx, and VCrOx. For example, the resistive layer 503 surrounds the conductor 502 and the threshold layer 504 surrounds the resistive layer 503. Thus, the resistive layer 503 and the threshold layer 504 form concentric cylinders around the conductor 502. The conductor layer 501 surrounds the threshold layer 504.

Figure 5B:
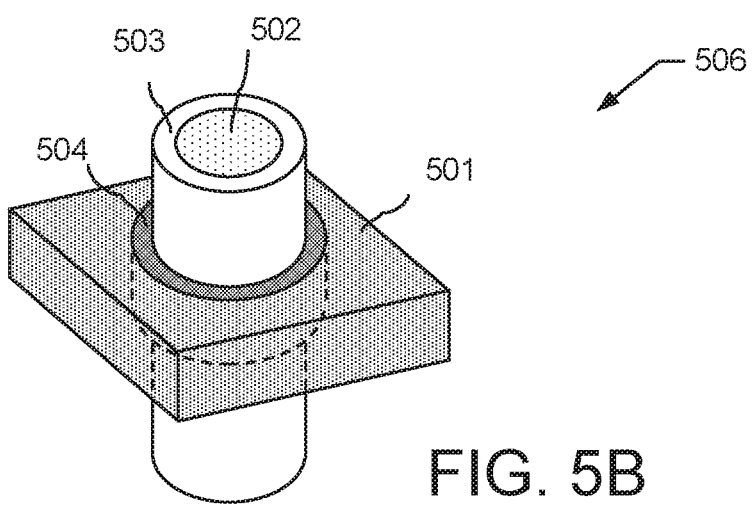

FIG. 5B shows another exemplary embodiment of a synapse 506 for use in a 3D neural network that comprises a selector 504 that is formed as a discrete island. For example, the selector material 504 is located between the intersection of the conductor layer 501 and the resistive layer 503. The synapse 506 is different from the synapse 500 in that outside the region of the conductor layer 501, the selector material 504 is removed from the resistive layer 503.

Figure 5C:
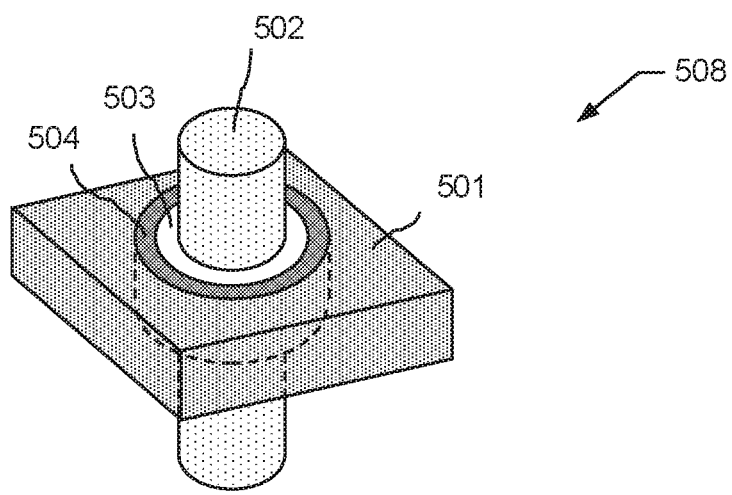

FIG. 5C shows another exemplary embodiment of a synapse 508 for use in a 3D neural network that comprises both a selector layer 504 and a resistive layer 503 that are formed as discrete islands. For example, the selector layer 504 and the resistive layer 503 are located between the intersection of the conductor layer 501 and the conductive layer 502. The synapse 508 is different from the synapse 500 in that outside the region of the conductor layer 501, the selector layer 504 and the resistive layer are removed from the conductor layer 502.

Figure 6A:
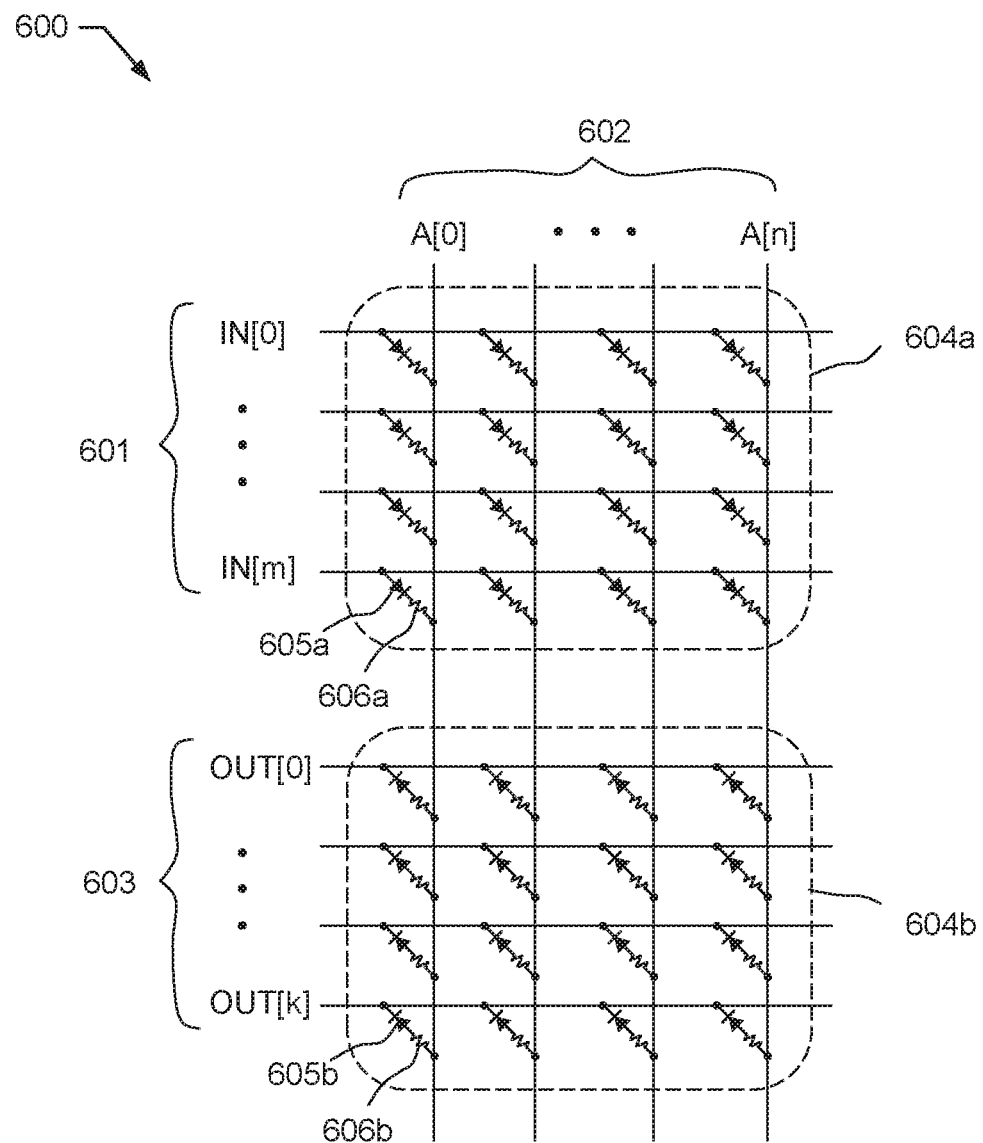
FIGS. 6A-B show exemplary embodiments of circuits that implement 3D neural network arrays.

FIG. 6A shows an exemplary embodiment of a circuit that implements a neural network 600. In an exemplary embodiment, the array 600 uses the synapse structures as shown in FIGS. 5A-C. The array 600 comprises (m+1) inputs 601, (n+1) neurons 602 of a hidden layer, and (k+1) outputs 603. The synapses 604a connect the inputs 601 to the neurons 602 and the synapses 604b connect the neurons 602 to the outputs 603. The synapses 604a comprise selectors and resistive elements such as diode 605a and resistive element 606a. The synapses 604b comprise selectors and resistive elements such as diode 605b and resistive element 606b. It should be noted that the selectors 605a and 605b allow current to pass in opposite directions to provide a current path from the inputs 601 to the outputs 603.

Figure 6B:
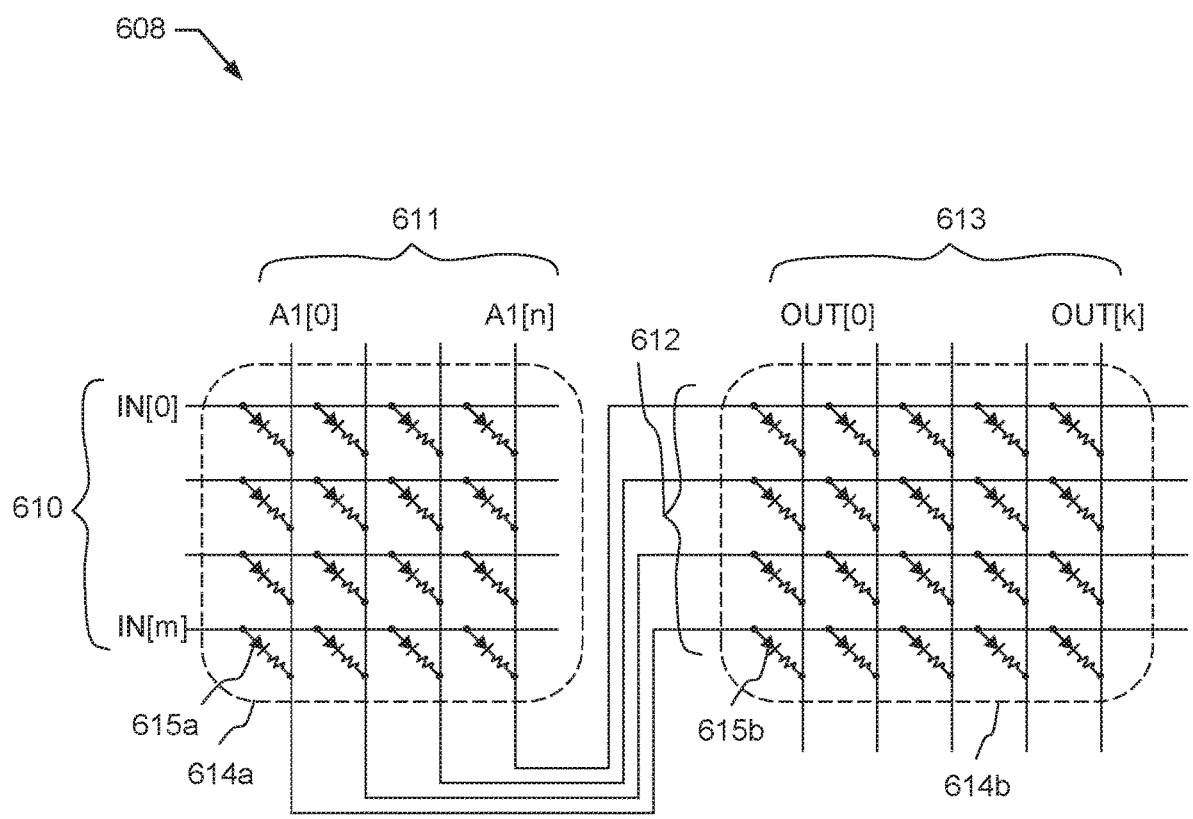
Figure 7A:
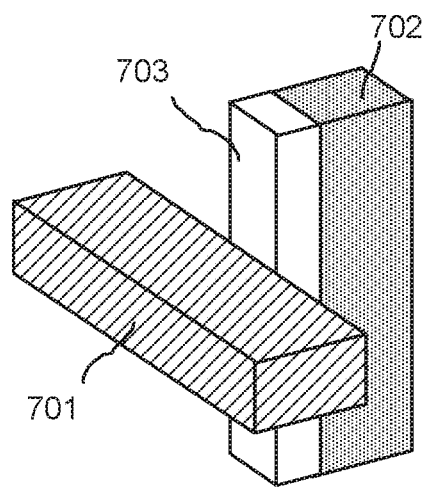
FIGS. 7A-D show exemplary embodiments of cell structures that can be used to implement a horizontal 3D neural network array.
Figure 7B:
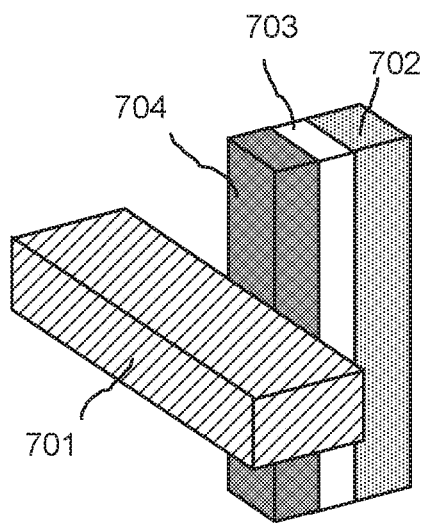
Figure 7C:
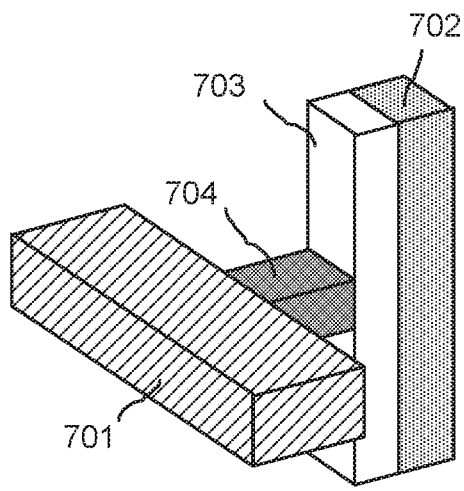
Figure 7D:
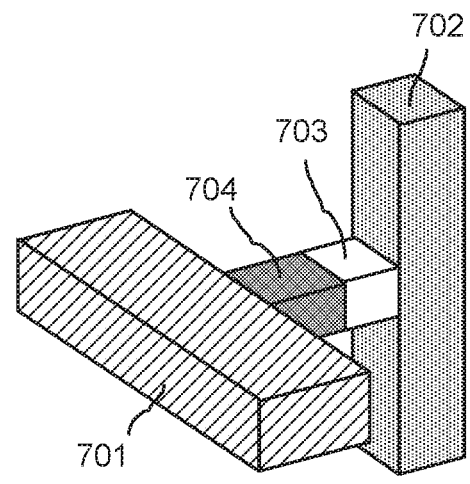

FIG. 6B shows another exemplary embodiment of a circuit that implements a 3D neural network array 608. The array 608 comprises (m+1) inputs 610, (n+1) neurons 611 of a hidden layer, which are connected to (n+1) inputs 612 of an output layer that has (k+1) outputs 613. The array 608 also comprises synapses 614a that connect the inputs 610 to the neurons 611 and synapses 614b that connect the inputs 612 to the outputs 613. As in FIG. 6A, the synapses 614a and 614b comprise selectors and resistive elements. It should be noted that when compared with the embodiment shown in FIG. 6A, the selectors of synapses 614a (e.g., selector 615a) and the selectors of synapses 614b (e.g., selector 615b) pass current in the same direction (e.g., from the input 610 to the neuron 611 or from the input 612 to the output 613) to provide a current path from the inputs 610 to the outputs 613.

Horizontal Arrays

In various exemplary embodiments, the novel circuits disclosed above are implemented using vertical arrays as shown above. In other embodiments, the novel circuits shown above are implemented using horizontal arrays as shown in FIG. 7A to FIG. 8C.

FIGS. 7A-D show exemplary embodiments of synapse structures that can be used to implement a horizontal 3D neural network array. Each synapse structure comprises conductor layers 701 and 702, which comprise metal or polysilicon. Each synapse structure also comprises resistive layer 703 and selector layer 704. The synapse structure shown in FIG. 7A has no selector layer, thus it is suitable for use in the array embodiments shown in FIG. 2 and FIG. 4. The synapse structures shown in FIGS. 7B-D comprise the selector 704, thus they are suitable for use in the array embodiments shown in FIGS. 6A-B. It should be noted that exemplary embodiments are suitable for use in other types of horizontal array structures.

Figure 8A:
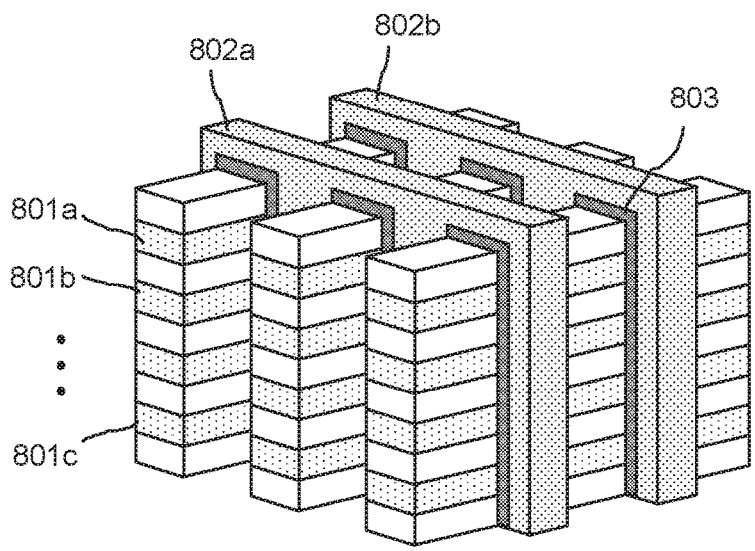
FIGS. 8A-C show exemplary embodiments of 3D neural network array structures comprising implementations of cell structures shown in FIGS. 7A-D.
Figure 8B:
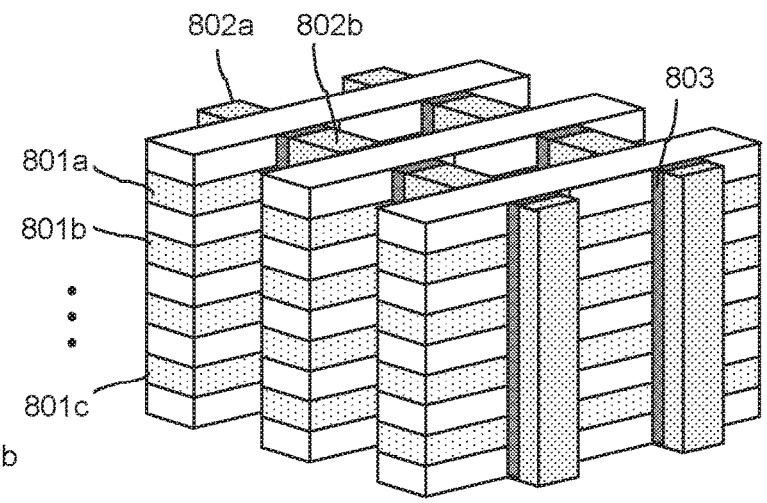
Figure 8C:
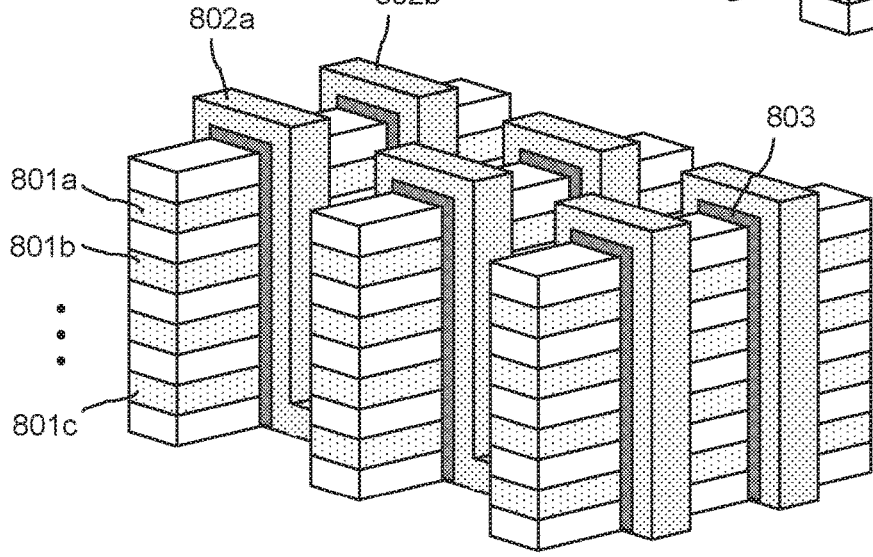

FIGS. 8A-C show exemplary embodiments of 3D neural network array structures comprising implementations of synapse structures shown in FIGS. 7A-D. Each array structure comprises first conductor lines 801a-c, and second conductor lines 802a-b. Each array structure also comprises resistive layer 803. In an exemplary embodiment, the resistive layer 803 comprises a resistive layer plus a selector layer.

Figure 9:
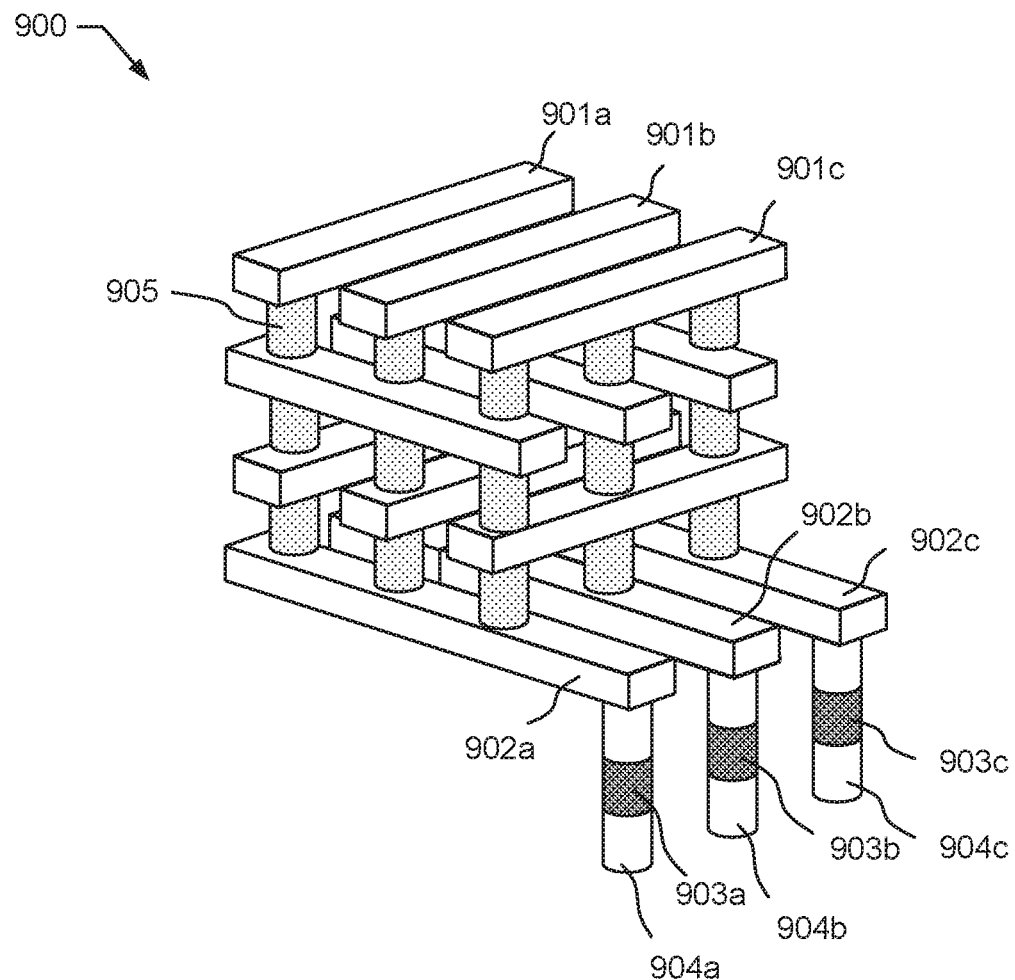
FIG. 9 shows an exemplary embodiment of a cross-point 3D neural network that implements the circuit shown in FIG. 2.

FIG. 9 shows an exemplary embodiment of a cross-point 3D neural network array 900 that implements the circuit shown in FIG. 2. The cross-point array 900 comprises crossing conductor layers 901a-c, and 902a-c. The cross-point array also comprises resistive layers (e.g., resistor 905) and threshold layers 903a-c (e.g., diodes or Schottky diodes) that may be formed on the contacts or circuit vias 904a-c.

FIGS. 10A-E show exemplary embodiments of 3D synapses for use with a 3D neural network arrays.

Figure 10A:
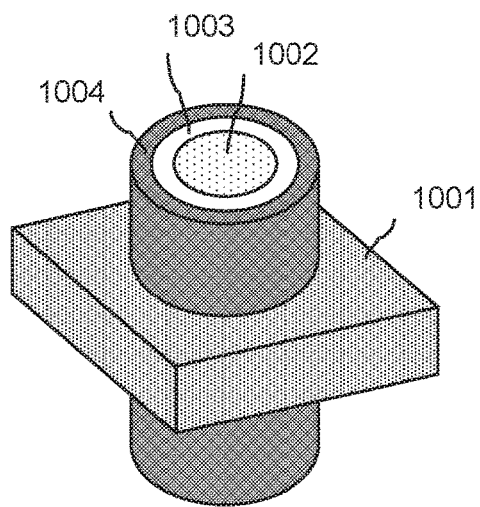
FIGS. 10A-E show exemplary embodiments of the 3D synapses for use with a neuron device.

FIG. 10A shows a 3D synapse the includes conductor layers 1001 and 1002 that may be metal or polysilicon. If metal, conductor layers may be tantalum (Ta), platinum (Pt), or titanium (Ti). The 3D synapse also includes a resistive element or 'weight layer' 1003 that may have current or voltage impedance. The impedance is non-volatile and may be changed by applying proper bias conditions to the conductors 1001 and 1002. The weight layer 1003 may be implemented by using resistive materials, such as HfO/HfOx for example. In another embodiment, the weight layer 1003 may be implemented by using phase change materials, such as chalcogenide for example. In another embodiment, the weight layer may be implemented by using ferroelectric materials, such as Ziconate Titanate for example. In another embodiment, the weight layer may be implemented by using magnetic materials, such as iron, nickel, or cobalt for example.

The 3D synapse also includes an 'activation function' layer 1004 that may be implemented by materials with non-linear behavior or threshold behavior, such as a diode, Schottky diode, NbOx, TaOx, VCrOx. In another embodiment, the layers 1003 and 1004 may be exchanged; thus, the layer 1003 can be the activation layer and the layer 1004 can be the resistive layer. When a diode is used in the activation layer, its current flow direction may be from conductor 1001 to conductor 1002, or from conductor 1002 to conductor 1001.

Figure 10B:
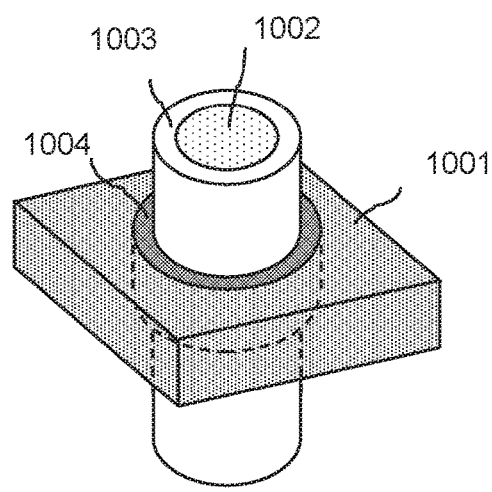

FIG. 10B shows another exemplary embodiment of a 3D synapse. This embodiment is similar to the embodiment shown in FIG. 10A except that the activation function layer 1004 is formed as a discrete island instead of a continuous layer along the resistive layer 1003. For example, a discrete island indicates that the activation function layer 1004 does not extend beyond the upper and lower surfaces of the conductor 1001 and therefore forms a cylindrical ring around the layer 1003.

Figure 10C:
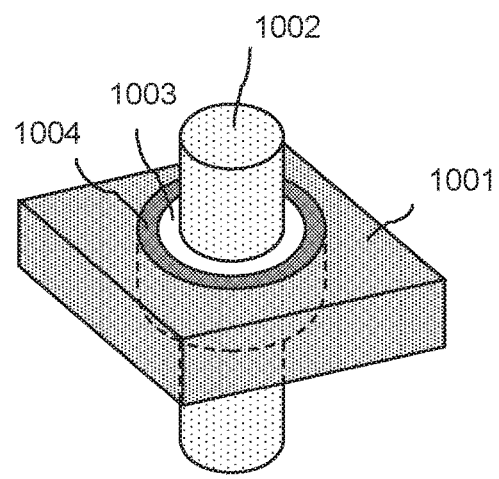

FIG. 10C shows another embodiment of a 3D synapse. In FIG. 10C both of the layers 1003 and 1004 are formed as discrete islands.

Figure 10D:
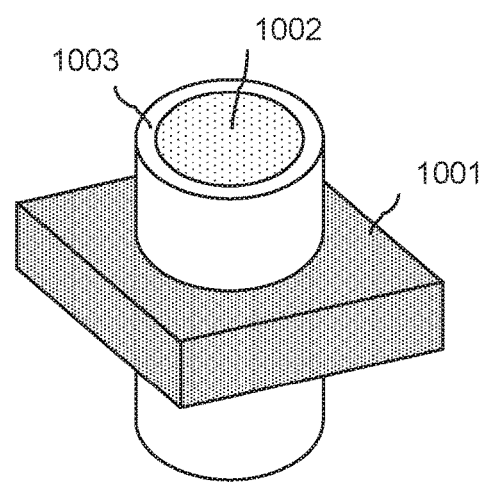

FIG. 10D shows another exemplary embodiment of a 3D synapse. This embodiment does not have the activation layer 1004 as shown in FIG. 10A. The 3D synapse only includes the weight layer 1003. In an exemplary embodiment, the activation function may be performed by the circuit or device connected to the conduction layer 1002 instead of within the synapse.

Figure 10E:
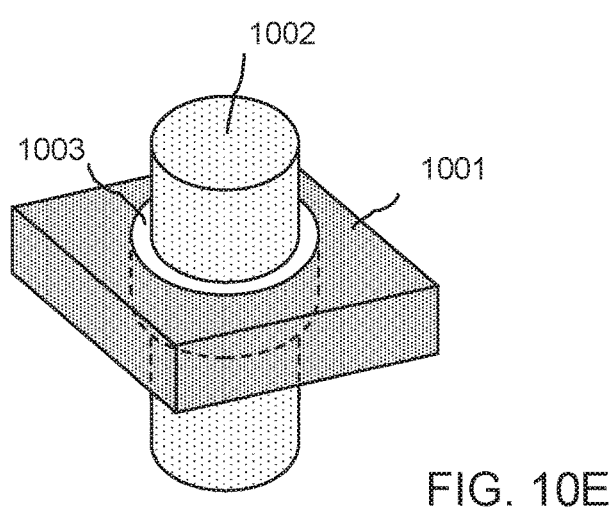

FIG. 10E shows another exemplary embodiment of a 3D synapse. This embodiment is similar to the embodiment shown in FIG. 10D except that the weight layer 1003 is formed as discrete island. In another exemplary embodiment, for the synapses shown in FIG. 10D and FIG. 10E, special materials such as TaOx, for example, may be used in the weight layer, and platinum (Pt) may be used in the conductor layers 1001 or 1002. Thus, an activation layer, such as Schottky, may be formed in the interface between layers 1003 and 1001, or between layers 1003 and 1002.

Figure 11:
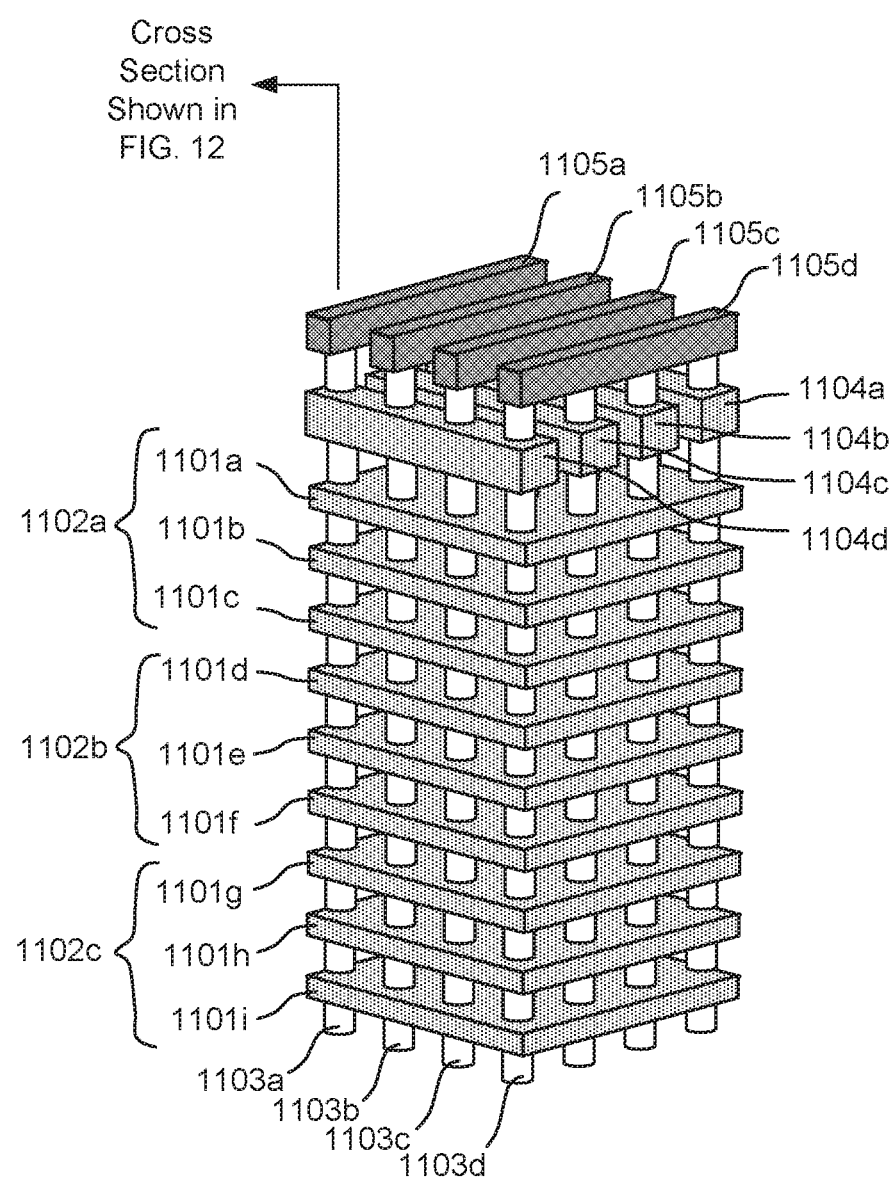
FIG. 11 shows an exemplary embodiment of a 3D neural network array formed using the synapses shown in FIGS. 10A-E.

FIG. 11 shows an exemplary embodiment of a 3D neural network array formed using the synapses shown in FIGS. 10A-E. The neural network array includes multiple layers 1101a to 1101i. Each layer represents one input neuron. The input neurons may be divided into multiple groups (1102a, 1102b, and 1102c). Each group may have the same or different number of the neurons. The vertical strings 1103a to 1103d represent the output neurons. The synapses are formed in the junction between each input neuron and output neuron. The output neurons may be selected by the select gates 1104a to 1104d, and connected to the output lines 1105a to 1105d. The array may be located on substrate, or on top of a circuit that is isolated by an insulator layer.

Figure 12:
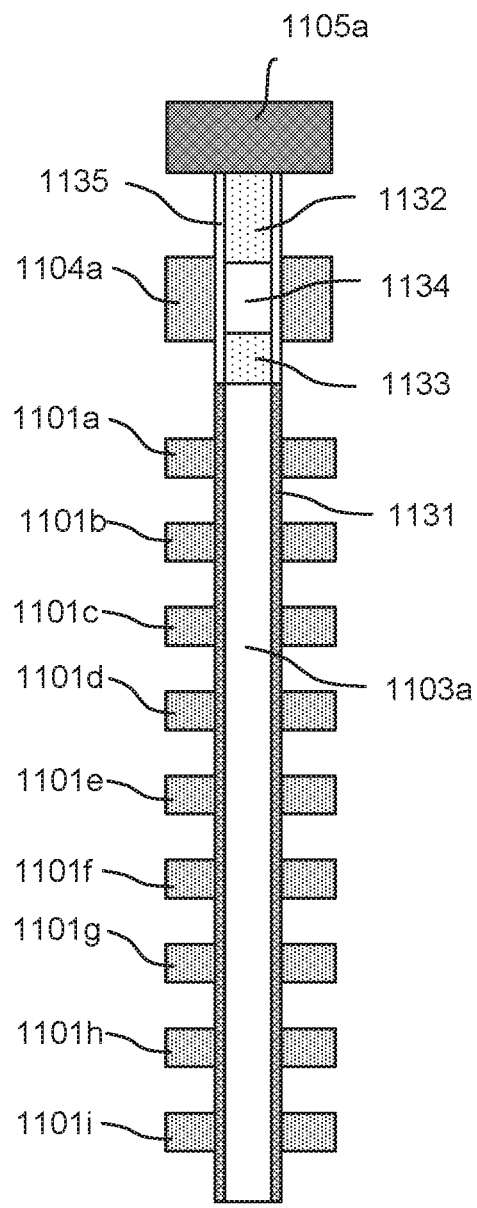
FIG. 12 shows an exemplary embodiment of a cross-section view of one string of the neural network array shown in FIG. 11

FIG. 12 shows an exemplary embodiment of a cross-section view of one string of the neural network array shown in FIG. 11. For example, the cross-section view is taken along the vertical string 1103a as indicated by the cross-section indicator. As shown in FIG. 12, the cross-section view includes select gate 1104d, input neuron layers 1101a to 1101i, and output neuron 1103a. Also shown is output line 1105a that may be formed by a conductor such as metal or polysilicon. Also shown is the synapse layer 1131 that may contain the weight layer and activation function layer. The structure of 1131 is dependent on which embodiment shown in FIGS. 10A-E is used. A select gate 1104a may be added to the top of the output neuron to select the output neuron and connect it to the output line 1105a. The select gate may be formed by any suitable device such as junction or junction-less transistors. The embodiment shows a junction transistor that is formed by lightly-doped silicon or polysilicon layer 1134, heavily-doped source and junctions 1132 and 1133 with the opposite type of doing of 1134, and gate dielectric layer 1135.

FIGS. 13A-H show equivalent circuits of the embodiment of the neural network string shown in FIG. 12 using different embodiments of the synapses shown in FIGS. 10A-E.

Figures 13A, 13B:
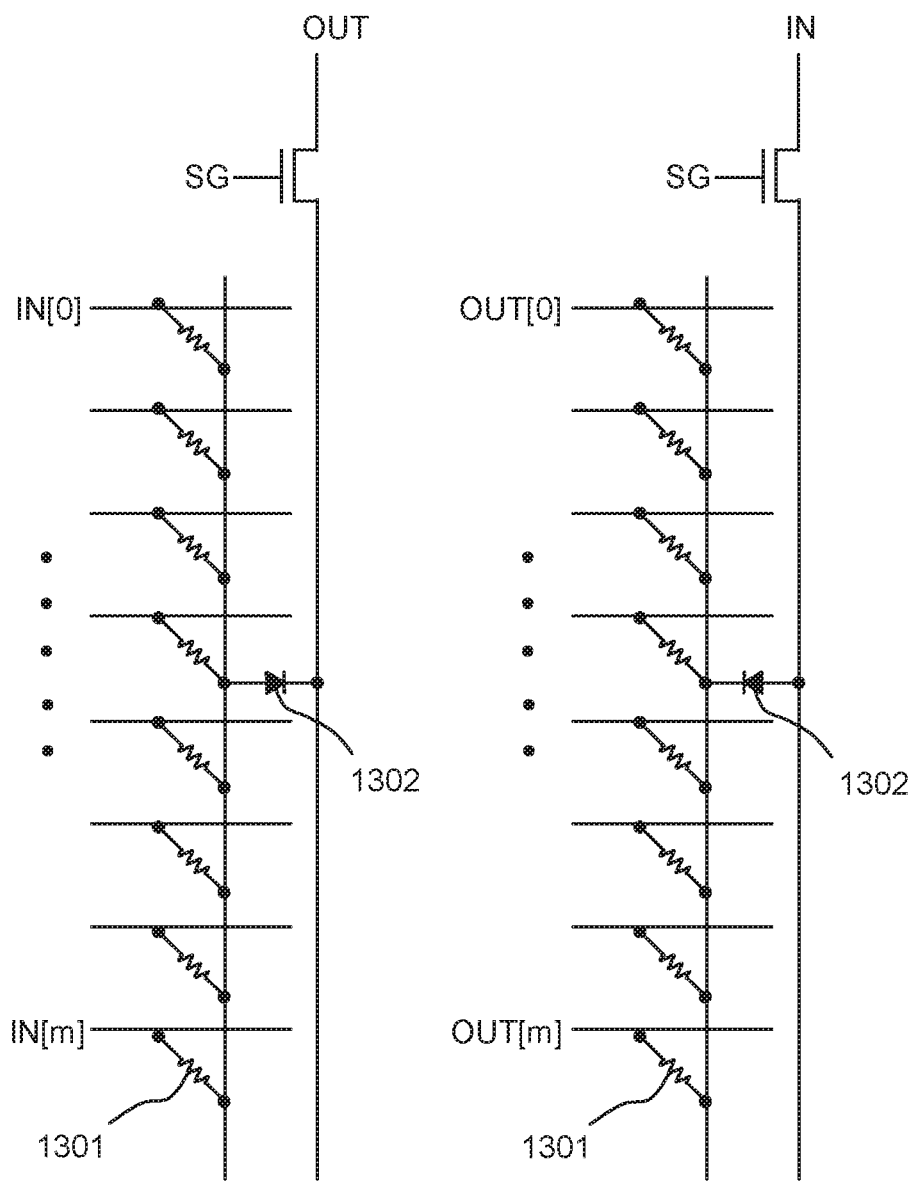
FIGS. 13A-H show equivalent circuits of the embodiment of the neural network string shown in FIG. 12 using different embodiments of the synapses shown in FIGS. 10A-E

FIGS. 13A-B show equivalent circuits of the neural network string using the synapse structure in FIG. 10B. These embodiments have discrete resistive material 1301 as the weight layer and common diode 1302 as the activation function layer. Note the different diode current flow direction shown in FIGS. 13A-B.

FIGS. 13C-F show equivalent circuits of the neural network string that use the structure shown in FIG. 10C. These embodiments use discrete resistive material 1301 as the weight, and discrete diode 1302 as the activation function layer in each synapse.

Figure 13C:
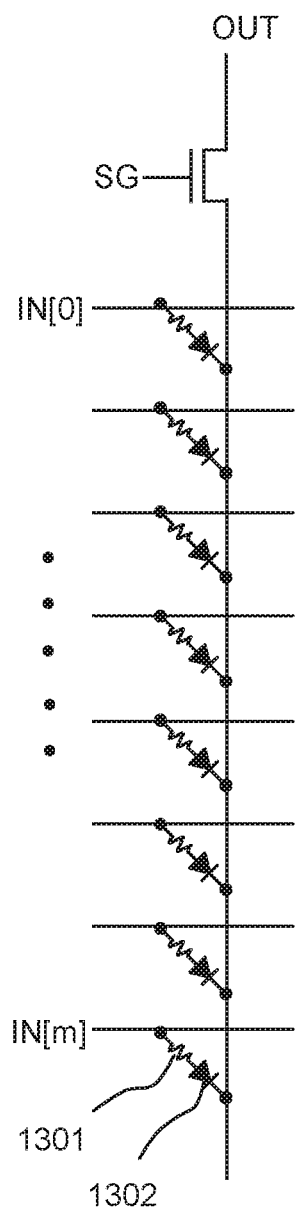
Figure 13D:
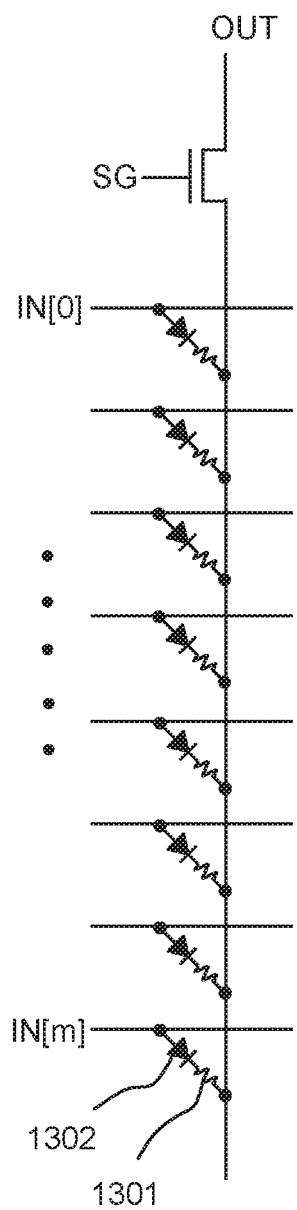
Figure 13E:
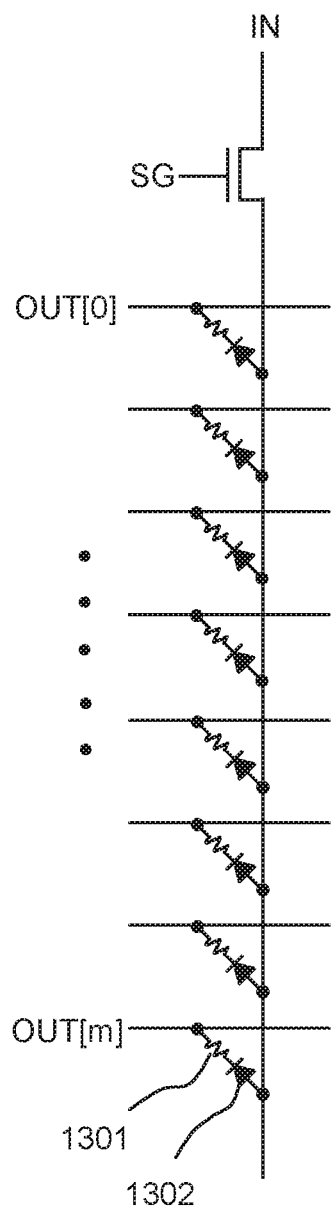
Figure 13F:
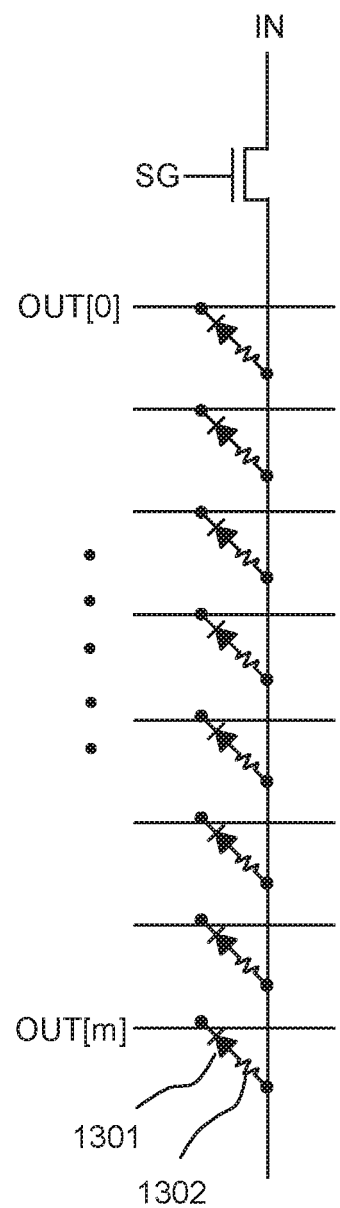
Figure 13G:
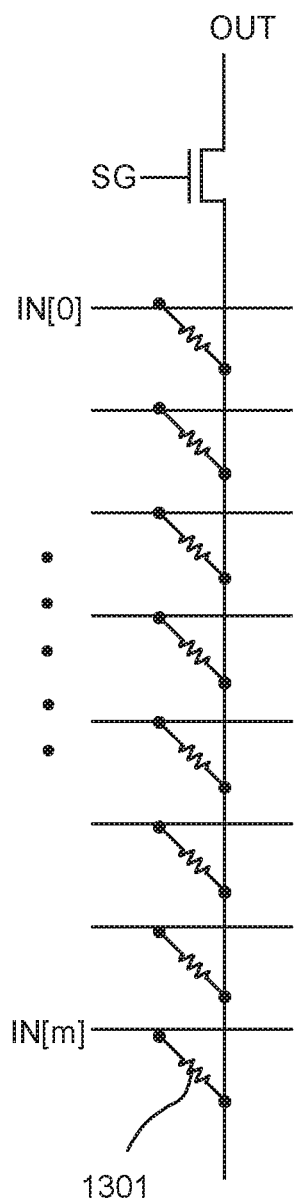
Figure 13H:
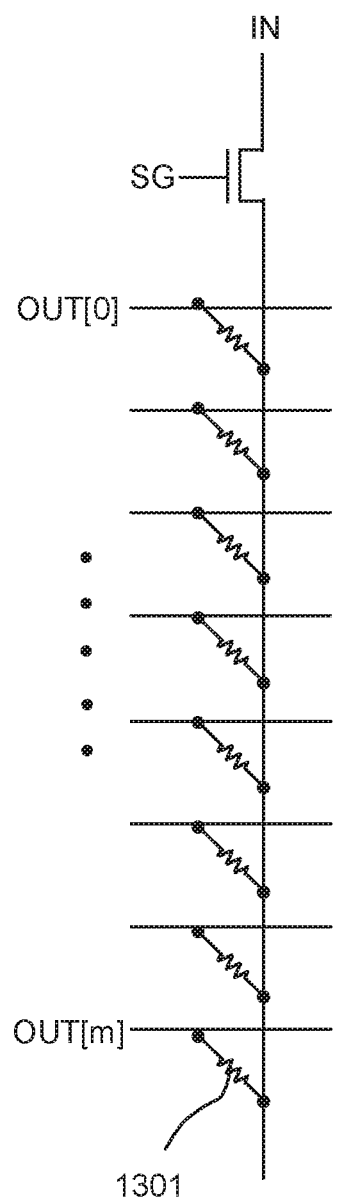

FIGS. 13G-H show equivalent circuits of the neural network string using the synapse structure in FIG. 10E. These embodiments only have discrete weight layer 1301 for each synapse. The activation function may be implemented by the circuit or device connected to the output neurons or output lines. It should be noted that for FIGS. 13A-H, depending on the activation function layer's direction, the direction of inputs and outputs may be reversed.

Figure 14A:
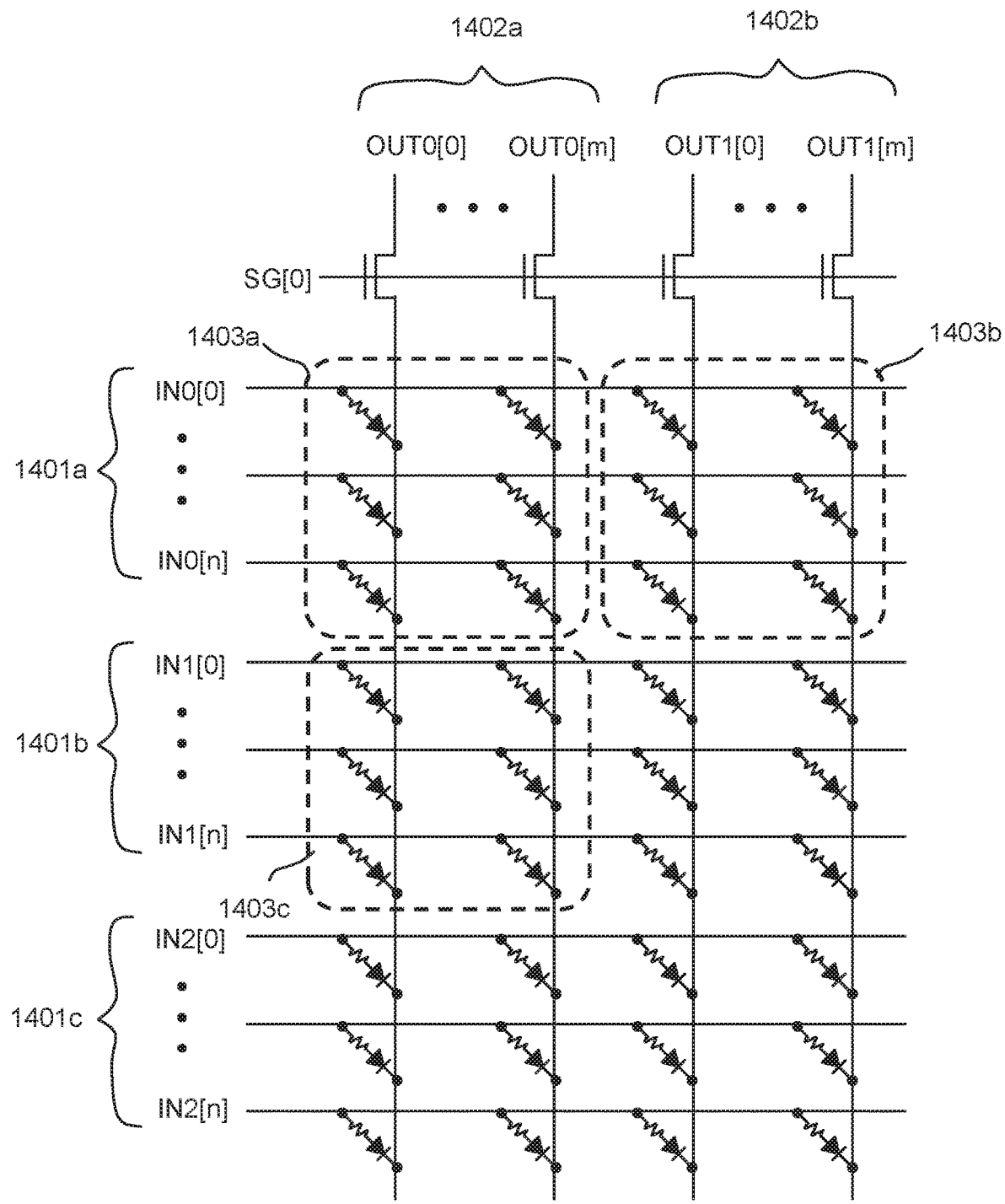
FIG. 14A shows an exemplary embodiment of neural network array circuit taken along a select gate.

FIG. 14A shows an exemplary embodiment of the neural network array shown along a select gate SG[0]. Assume the synapse structure of FIG. 13C is used. The input neurons are divided into multiple groups such as 1401a to 1401c. The output lines are also divided into multiple groups such as 1402a and 1402b. The input neurons may connect to input signals IN0[0] to IN0[n], etc. The output lines may connect to output signals OUT0[0] to OUT0[m], etc. This partitions the synapse array into multiple groups, such as groups 1403a to 1403c, etc. When the input 1401a and the output 1402a are selected, the synapses group 1403a is selected. When the input 1401a and the output 1402b are selected, the synapse group 1403b is selected. The unselected inputs may be floating to avoid disturbing the selected group. By using this implementation, the array may be freely partitioned into multiple groups, with multiple input and output neurons. Each group may be used to learn and perform specific tasks.

Figure 14B:
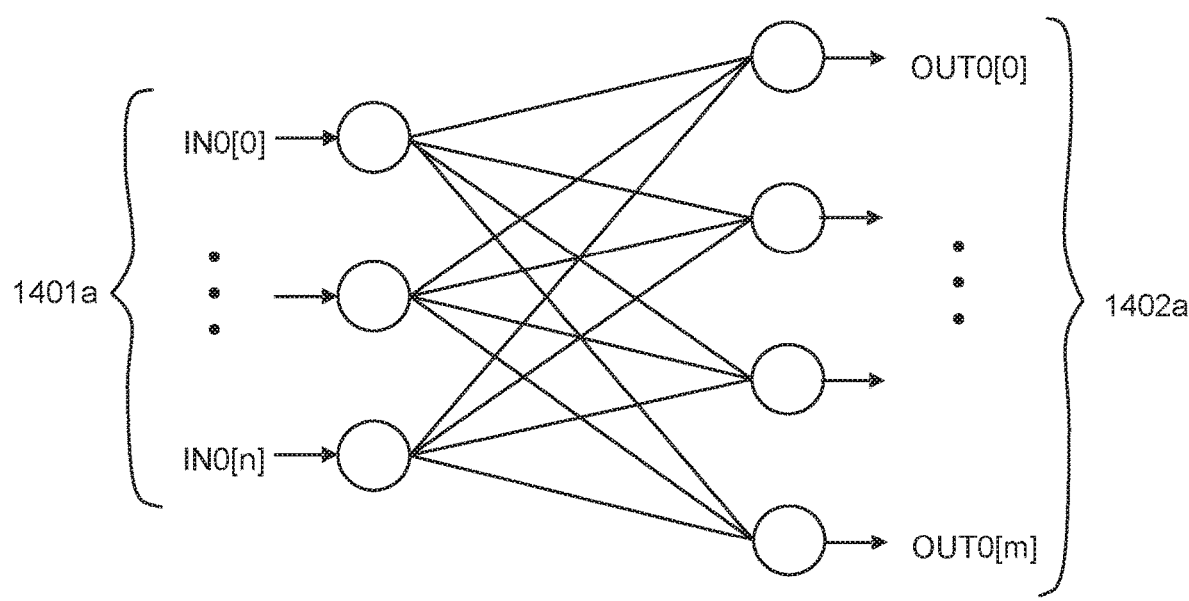
FIG. 14B shows an equivalent neural network diagram of the group shown in FIG. 14A with resistor/diode combinations forming synapses.

FIG. 14B shows an equivalent neural network diagram of the input group 1401a and output group 1402a shown in FIG. 14A with resistor/diode combinations forming the synapses.

In an exemplary embodiment, the neural network array is formed on an integrated circuit chip. To accomplish input and output grouping, the integrated circuit chip may contain built-in FPGA Field Programmable Gate Arrays to partition the numbers and connections of the input and output neurons.

Figure 14C:
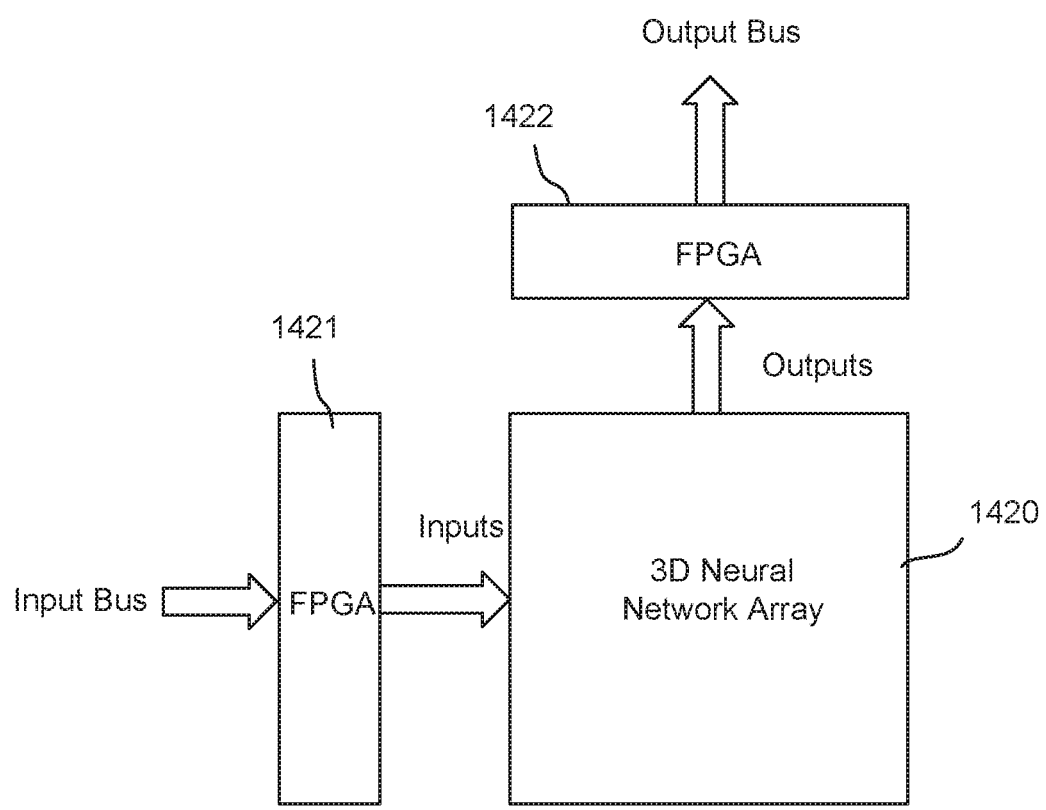
FIG. 14C shows an exemplary embodiment of an integrated circuit chip that includes the 3D neural network array.

FIG. 14C shown an exemplary embodiment of an integrated circuit chip that includes the 3D neural network array 1420. For example, the chip may have a first FPGA 1421 to change the partition of the input neurons, and a second FPGA 1422 to change the partition of the output neurons and output lines. This provides high flexibility for customizing the neural network chip to perform a variety of tasks.

It should be noted that in FIG. 14A, the group 1403a represents 'one layer' of a neural network, for example as shown in FIG. 14B.

Figure 14D:
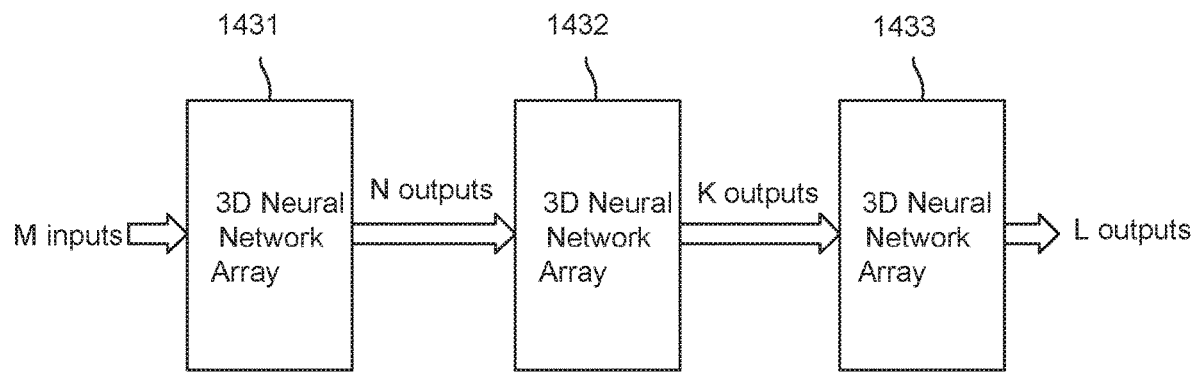
FIG. 14D shows an exemplary embodiment of a chip that implements multiple layers of a neural network.

FIG. 14D shows an exemplary embodiment of an integrated circuit chip that implements multiple layers of a neural network. The outputs of the first neural network array 1431 may be fed into the second neural network array 1432. This creates a two-layer neural network. Moreover, the outputs of the second neural network array 1432 may be fed into a third neural network array 1433. This creates a three-layer neural network array. It can be assumed that the first array 1431 has M inputs and N outputs, the second array 1432 has K outputs, and the third array 1433 has L outputs.

Figure 14E:
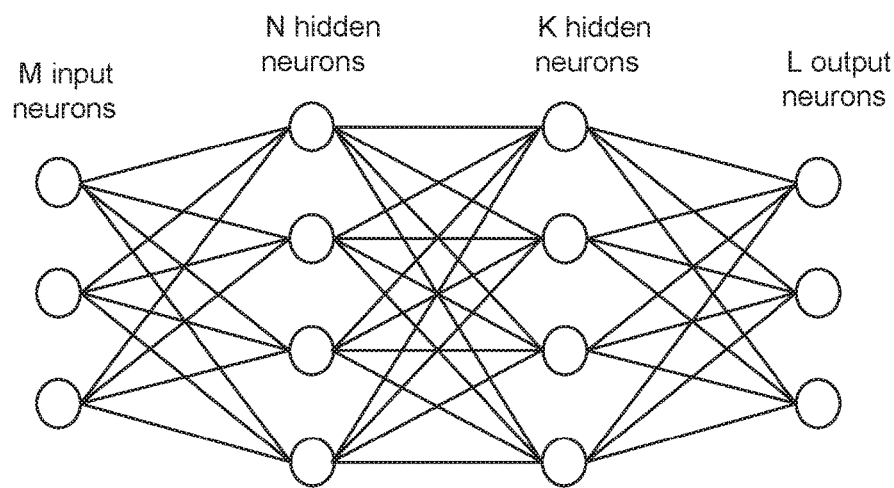
FIG. 14E shows the equivalent neural network architecture for the neural network arrays shown in FIG. 14D.

FIG. 14E shows the equivalent neural network architecture for the neural network arrays shown in FIG. 14D. The input layer has M input neurons. The first hidden layer has N hidden neurons. The second hidden layer has K hidden neurons. The output layer has L output neurons.

Figure 14F:
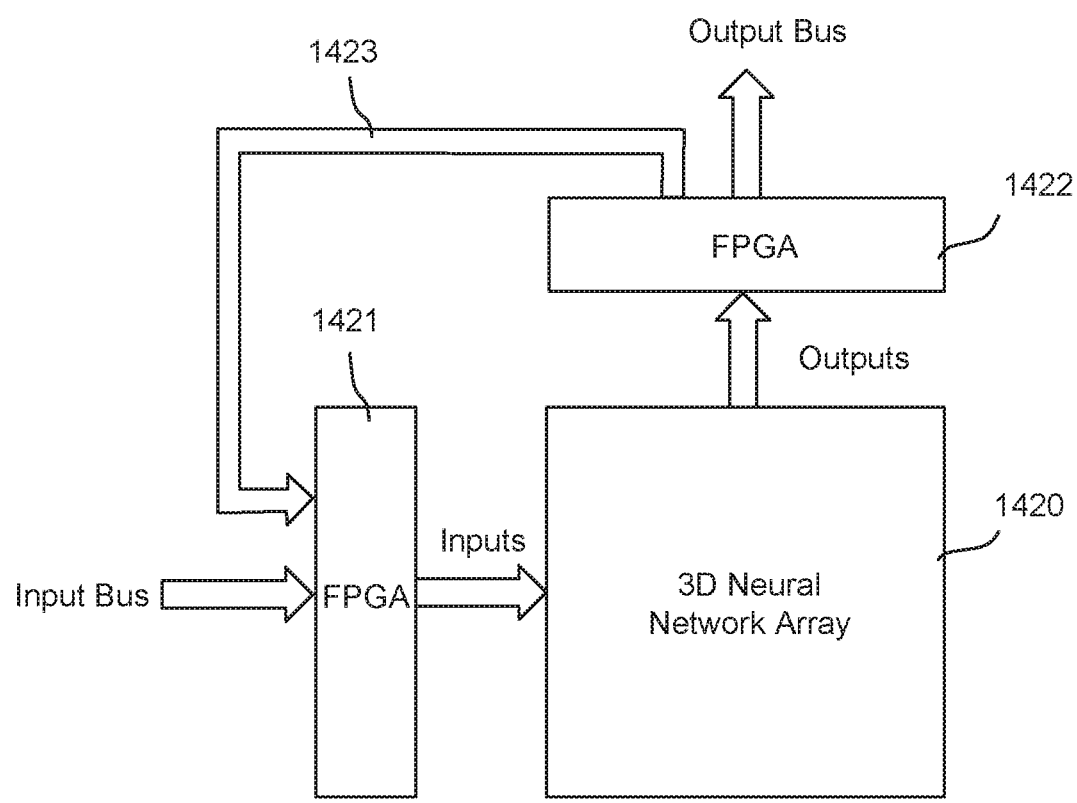
FIG. 14F shows another exemplary embodiment of a multiple-layer neural network.

FIG. 14F shows another exemplary embodiment of a multiple-layer neural network. This embodiment includes one neural network array 1420. The outputs 1423 of the array 1420 flow through the FPGA 1422 and are fed back into the inputs of the array 1420 by passing through the FPGA 1421. The feedback inputs use another group of synapses inside the array 1420, thus realizing a two-layer neural network. Similarly, the outputs of the second layer may be fed back into the inputs of the array, and use another group of the synapses to form the third layer of the neural network, etc. Thus, any number of neural networks may be implemented by using only one neural network array that is partitioned into multiple networks.

Figure 14G:
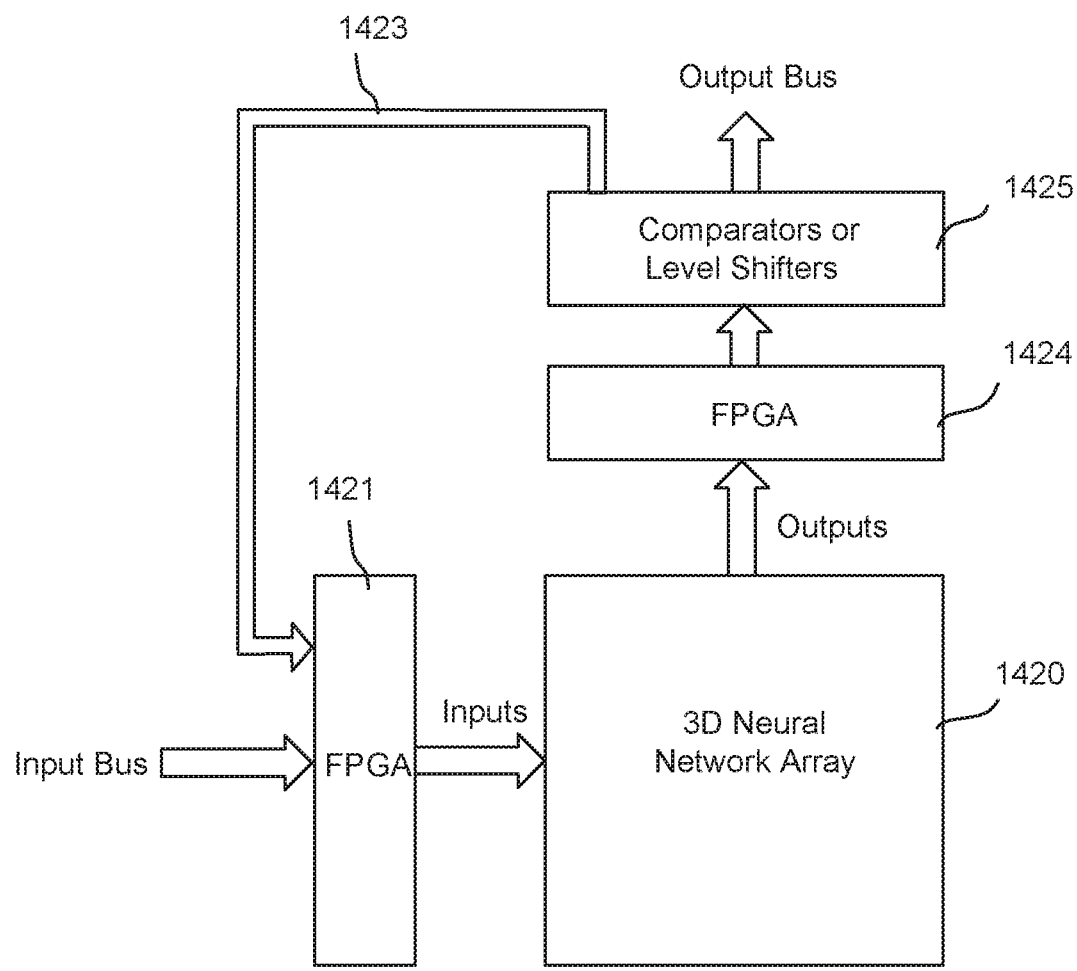
FIG. 14G shows another exemplary embodiment of a multiple-layer neural network.

FIG. 14G shows another exemplary embodiment of a multiple-layer neural. In this embodiment, the synapse structures of FIG. 13G or FIG. 13H are used. The comparator circuit 1425 is added to the output of the neural network to perform the activation function. In another embodiment, when a diode or Schottky diode is used to perform the activation function, the output may have a threshold voltage (Vt) drop, thus the highest output level may become VDD-Vt rather than VDD. In this case, a level shifter circuit 1425 may be added to recover the output high level back to VDD.

Figure 15A:
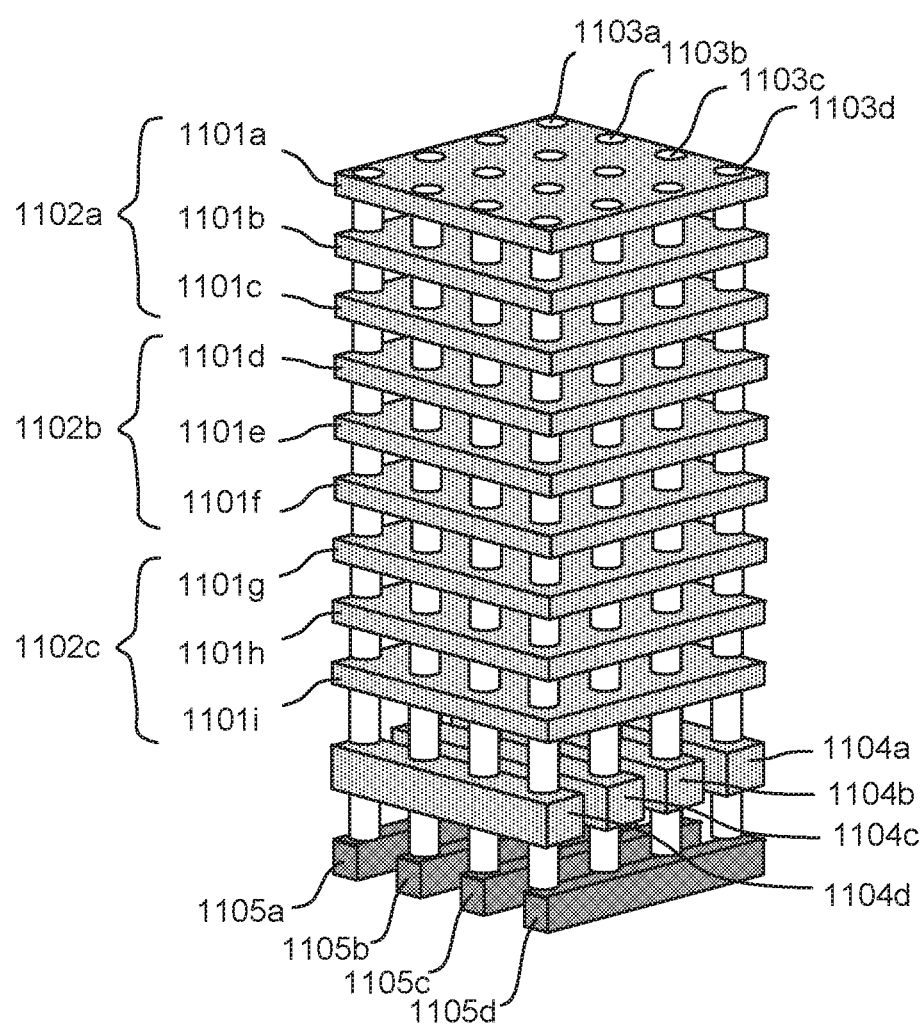
FIGS. 15A-C show exemplary embodiments of a 3D neural network array.

FIG. 15A shows another exemplary embodiment of a 3D neural network array. This embodiment is similar to the embodiment shown in FIG. 11 except that the select gates 1104a to 1104d are located in at bottom of the array. The output lines 1105a to 1105d are conductor layers such as metal, polysilicon, or diffusion layer. The array may be located on a substrate, or on top of circuit and isolated by an insulator layer. For simplicity, the reference numerals are the same as in FIG. 11 and its description can be referred to for additional details.

Figure 15B:
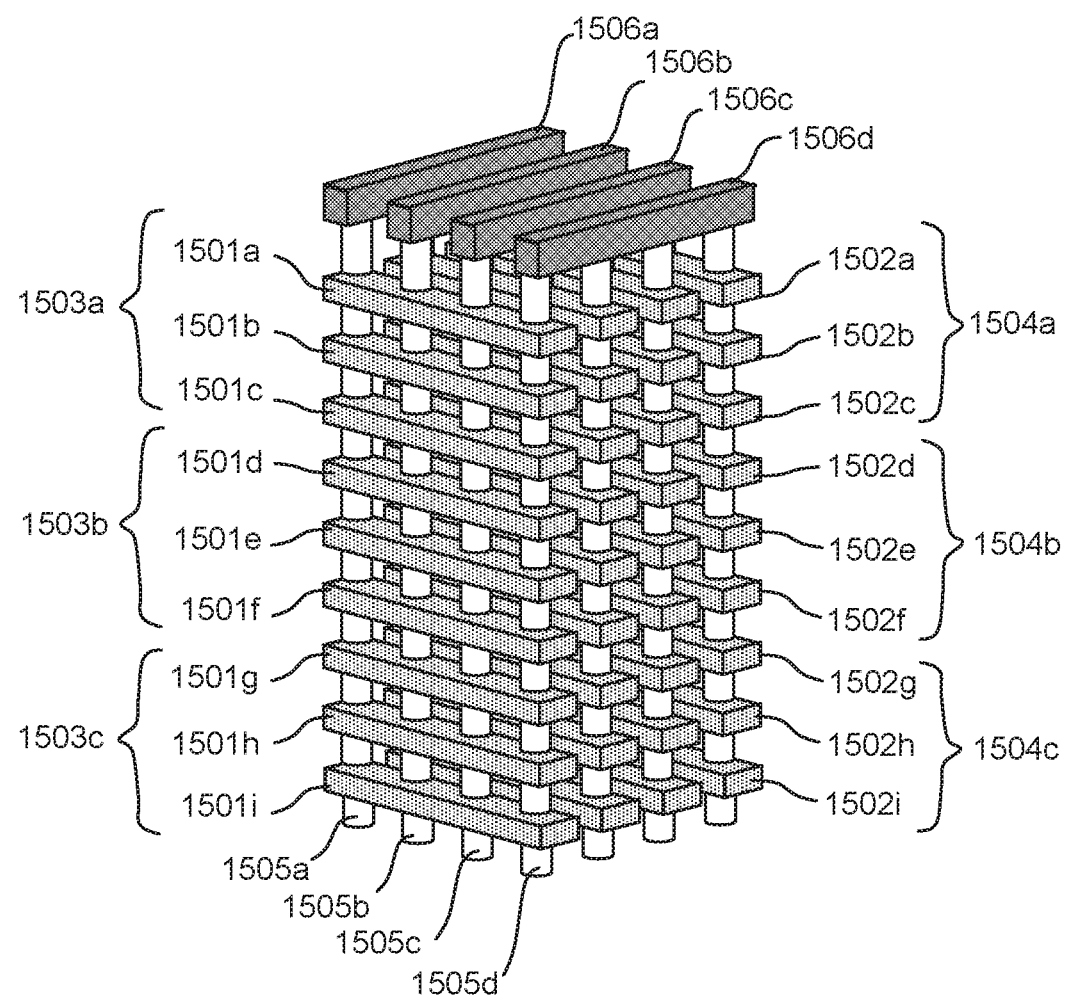

FIG. 15B shows another embodiment of the 3D neural network array. In this array, the input neuron layers are cut by vertical slits for form separated input layers such as 1501a to 1501i and 1502a to 1502i. The input neurons may be divided into groups such as 1503a to 1503c and 1504a to 1504c. The strings 1505a to 1505d, etc. are output neurons and output lines 1506a to 1506d are shown. In this embodiment, because the input layers are separated, the select gates may be eliminated.

Figure 15C:
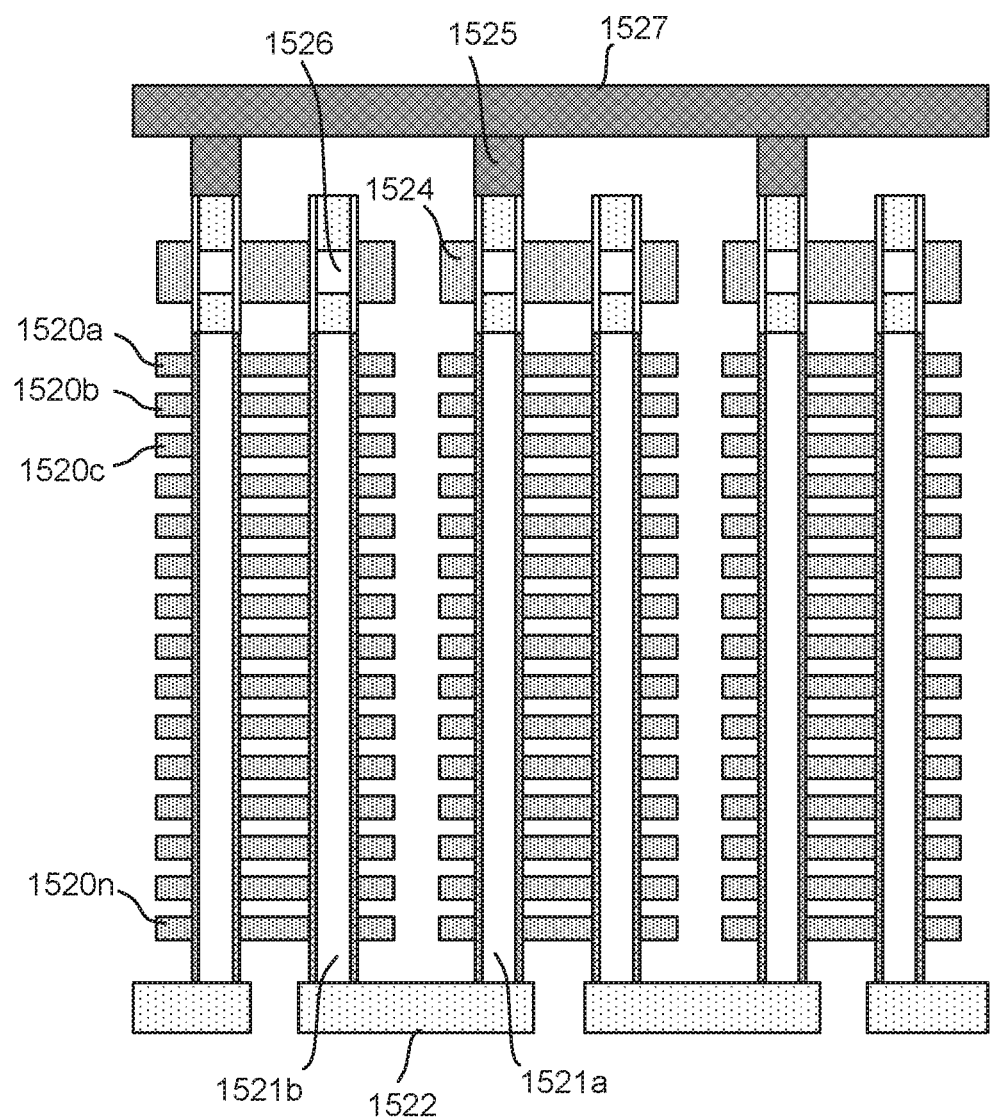

FIG. 15C shows another exemplary embodiment of a 3D neural network. In this embodiment, the input neuron layers 1520a to 1520n are separated by slits. The output neuron strings 1521a and 1521b are connected by the conductor layer 1522, and coupled to different input neuron layers. The first string 1512a may be selectively connected to the output line 1527 by the contact 1525 and the select gate 1524. The select gate 1526 on the second string 1521b is redundant and it is not connected to the output line 1527 and may be eliminated.

Figure 16A:
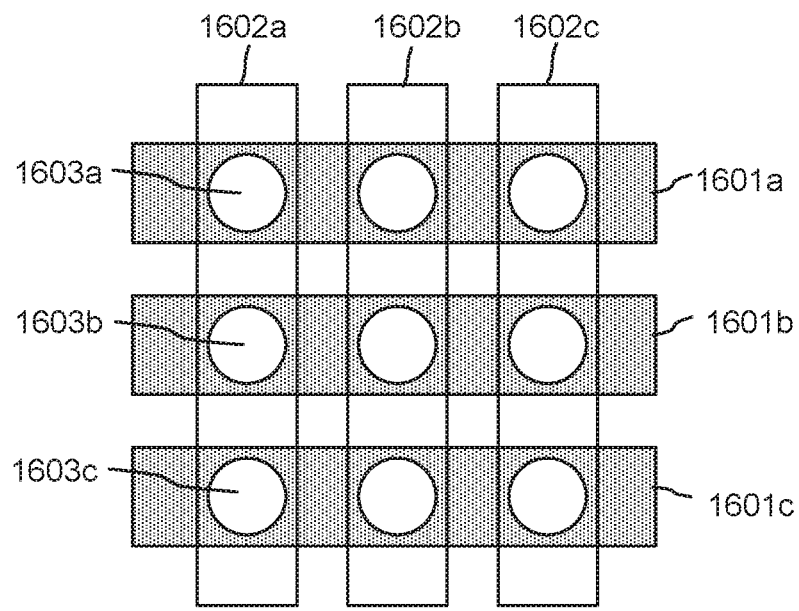
FIGS. 16A-B show top views of exemplary embodiments of a 3D neural network array.
Figure 16B:
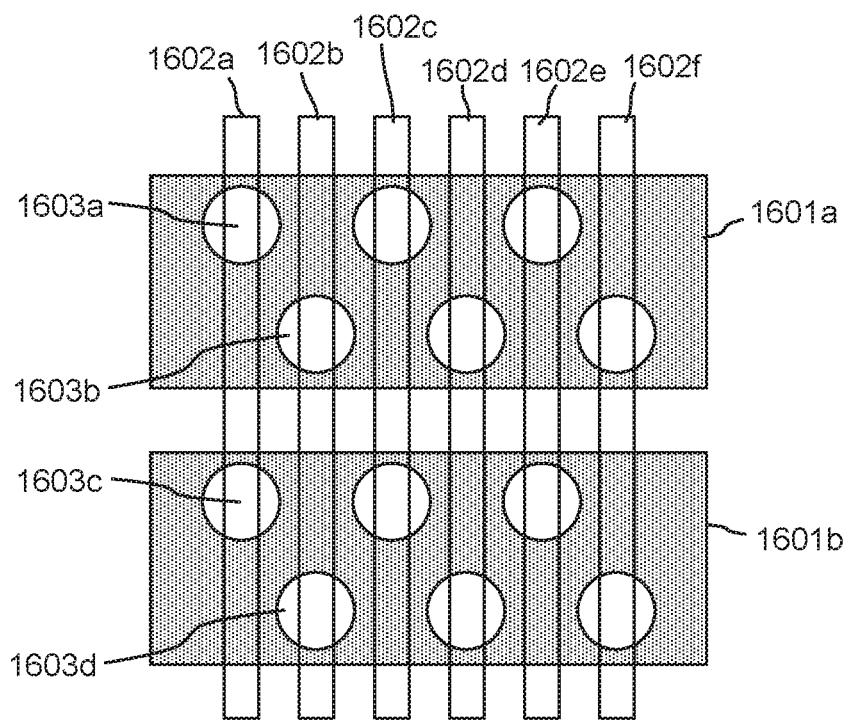

FIGS. 16A-B shows top views of embodiments of a 3D neural network array. FIG. 16A shows the pattern of the select gates 1601a to 1601c for the array embodiments shown in FIG. 11, FIG. 15A and FIG. 15C, or the pattern of the input neuron layers shown in FIG. 15B. Also shown are patterns for the output lines 1602a to 1602c and output neuron strings 1603a to 1603c.

FIG. 16B shows a top view of another embodiment of an array. The output neuron strings 1603a to 1603d are staggered to reduce the pitch of the strings and increase the capacity of the array.

FIGS. 17A-D show exemplary embodiment of synapse structures for use in a 3D neural network. For simplicity, the numbers of the layers are kept the same as FIGS. 10A-E. For example, the conductor layers 1001 and 1002 represent the input neurons and output neurons. The weight layer 1003 and the activation function layer 1004 are also shown. It should be noted that the locations of the layers 1003 and 1004 may be exchanged or reversed.

Figure 17A:
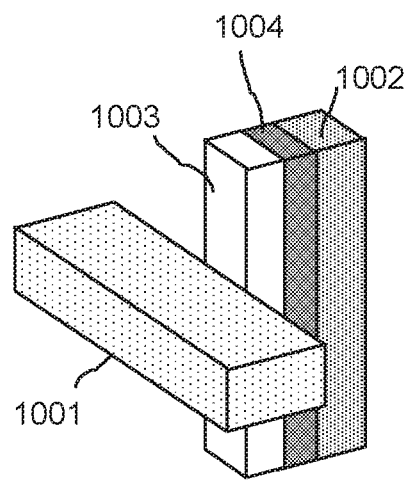
FIGS. 17A-D show exemplary embodiments of synapse structures for a 3D neural network.
Figure 17B:
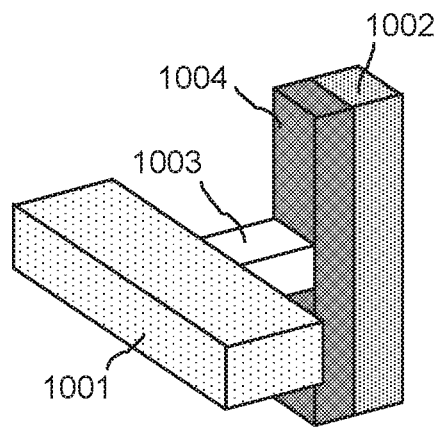
Figure 17C:
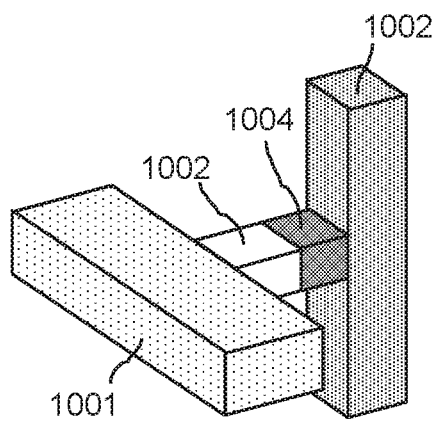
Figure 17D:
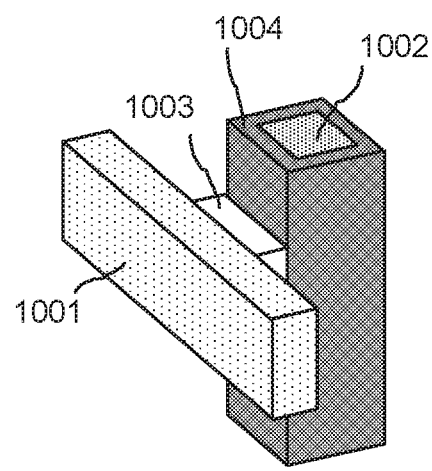
Figure 18A:
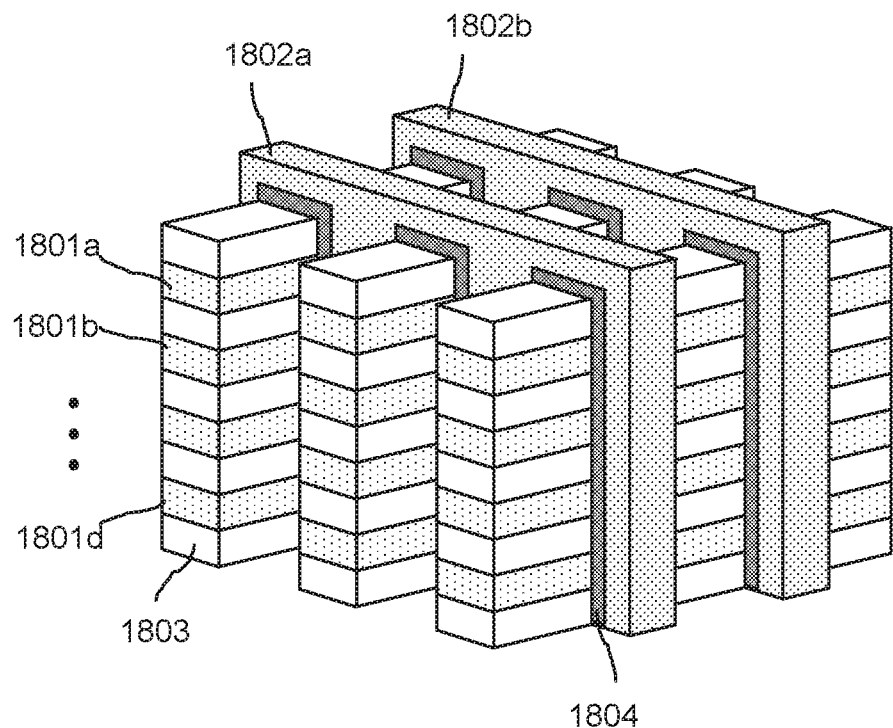
FIGS. 18A-D show exemplary embodiments of 3D neural network arrays using the synapse structures shown in FIGS. 17A-D.

FIGS. 18A-D show exemplary embodiments of 3D neural network arrays using the synapse structures shown in FIGS. 17A-D. FIG. 18A shows input neuron layers 1801a to 1801d and output neuron layers 1802a and 1802b. Also shown are insulator layer 1803 and synapse layer 1804 that contains the weight layer 1003 and the activation function layer 1004 as shown in FIGS. 17A-D. It should be noted that depending on the direction of the activation layer, the direction of input and output neurons may be exchanged.

Figure 18B:
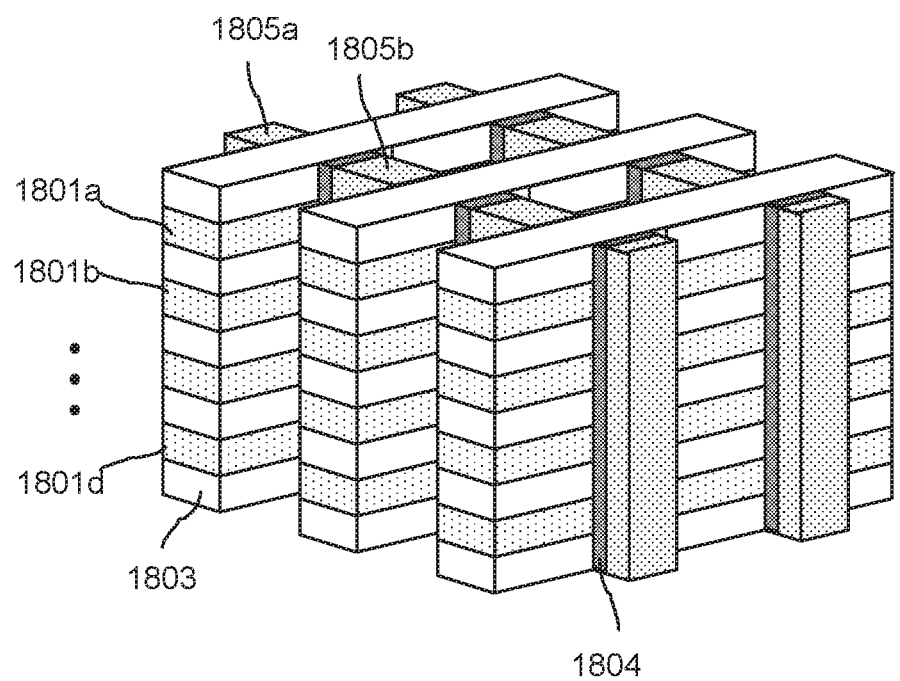

FIG. 18B shows another embodiment of the 3D neural network array. This embodiment is similar to FIG. 18A except that the vertical neurons 1802a and 1802b are changed as shown. Therefore, each horizontal neuron such as 1801a may couple to two vertical neurons such as 1805a and 1805b. Thus, the capacity of the array may be doubled.

Figure 18C:
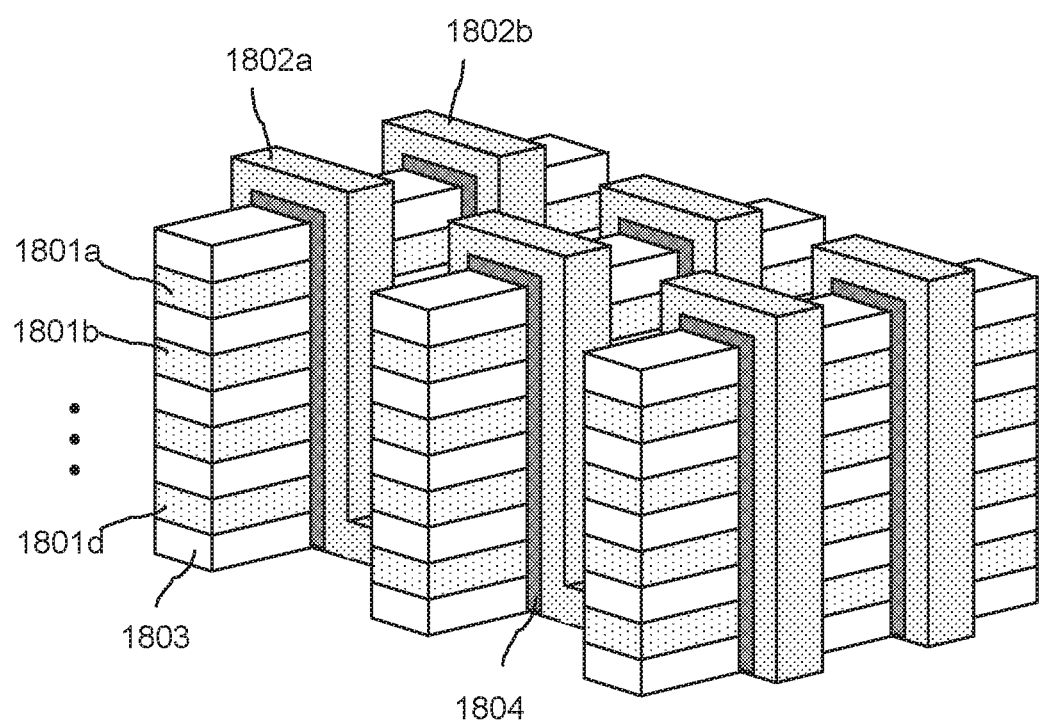

FIG. 18C shows another embodiment of the 3D neural network array. This embodiment is similar to FIG. 18A except the vertical neurons 1802a and 1802b are changed as shown. This embodiment's equivalent circuit is the same as FIG. 18A. Although this embodiment may have larger vertical neurons' pitch, its etching process for the vertical neurons may be easier than FIG. 18A.

Figure 18D:
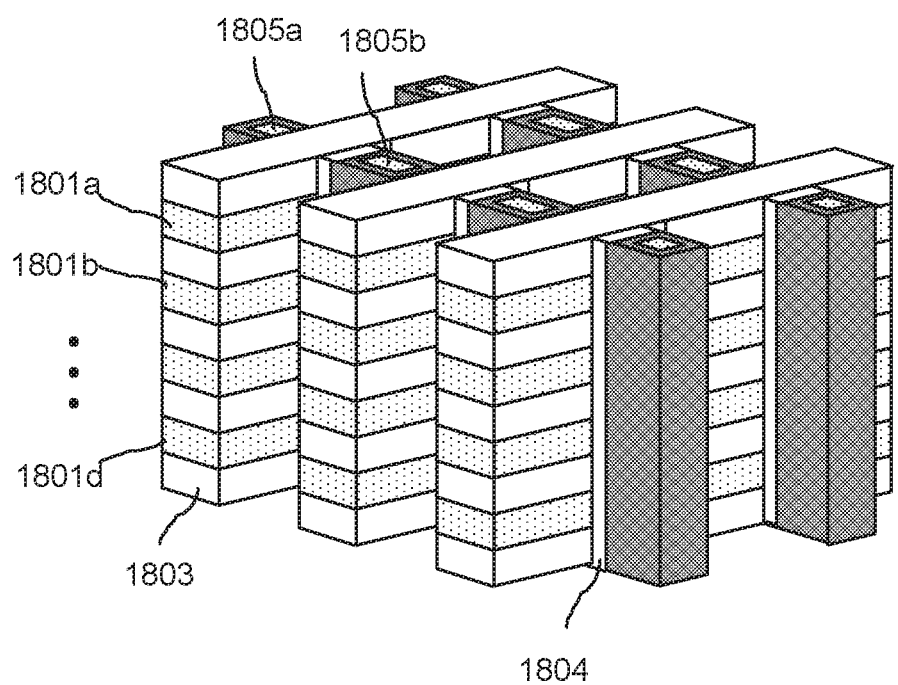

FIG. 18D shows another embodiment of the 3D neural network array using the synapse structure of FIG. 17D. Similar to FIG. 18B, this embodiment's horizontal neurons such as 1801a are connected to two vertical neurons 1805a and 1805b, thus the capacity of the array may be doubled.

Figure 19:
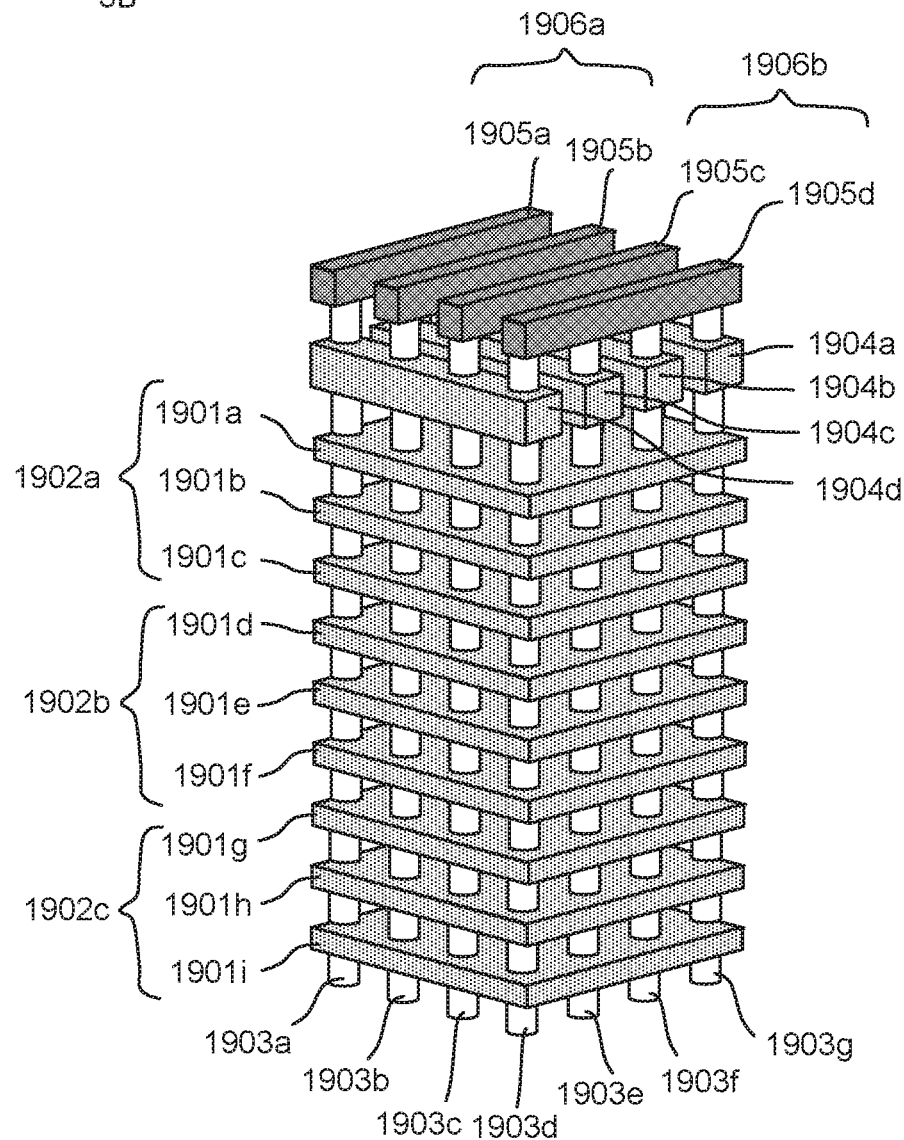
FIG. 19 shows an exemplary embodiment of the 3D neural network array that is formed using the synapses shown in FIGS. 10A-E.

FIG. 19 shows an embodiment of the 3D neural network array that can be formed using the synapses shown in FIGS. 10A-E. The neural network array may contain multiple layers 1901a to 1901i. Each layer may represent an input neuron. The input neuron layers may be divided into multiple groups 1902a, 1902b, and 1902c. Each group may have different number of layers. The vertical strings 19019a to 19019g represent the output neurons. The output neurons may be selected by the select gates 1904 to 1904d, and connected to the output lines 1905a to 1905d. The output lines may be divided into groups such as 1906a and 1906b. The synapses are formed in the junction of each input neuron and output neuron. Each input neuron group and output neuron group form a neural network. The array may be located on substrate, or on top of circuit, isolated by insulator layer.

Figure 20A:
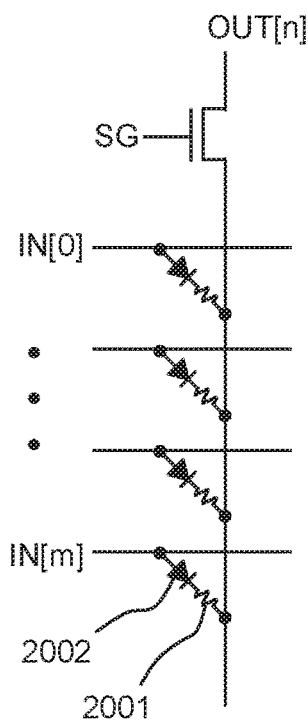
FIGS. 20A-E show exemplary equivalent circuits of an embodiment of a neural network string using the synapse structure shown in FIG. 10C.
Figure 20B:
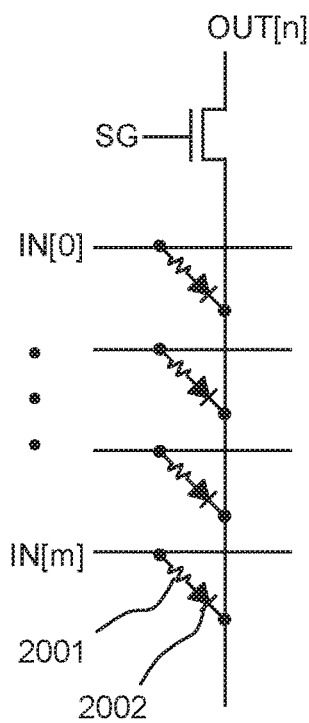
Figure 20C:
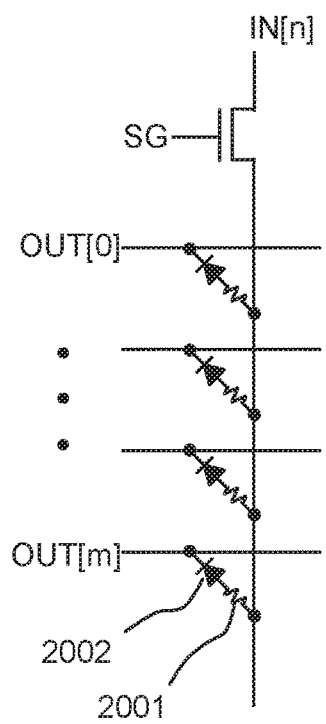
Figure 20D:
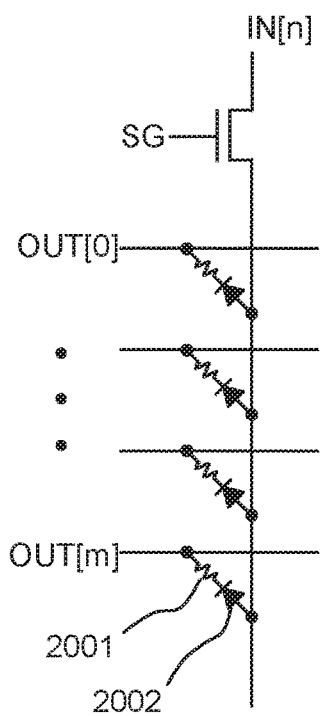
Figure 20E:
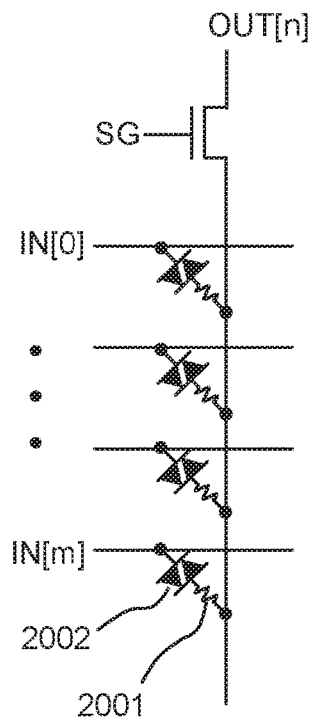

FIGS. 20A-E show equivalent circuits of the embodiment of the neural network string using the synapse structure in FIG. 10C. For example, a weight layer 2001 is shown that may be implemented by a resistive material. Also shown is an activation function layer 2002 that may be implemented by a diode, Schottky diode, or other suitable materials. Depending on the direction of the diodes, the inputs and the outputs may be reversed. In another embodiment, the diode may be bi-directional as shown in FIG. 20E.

Figure 21A:
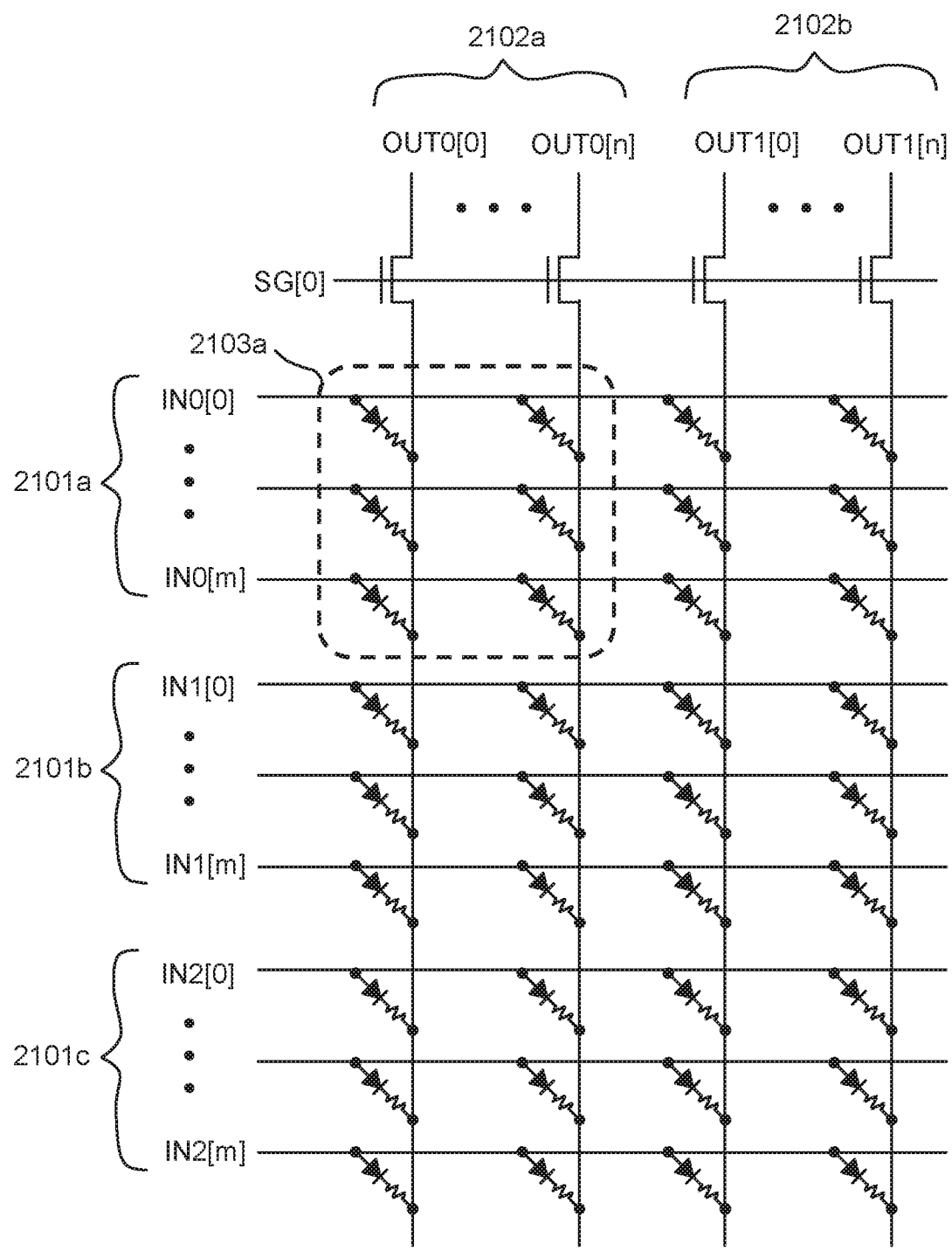
FIGS. 21A-C show exemplary embodiments of a neural network array circuit.

FIG. 21A shows an exemplary embodiment of a neural network array circuit along a select gate SG[0]. Assume the synapse structure of FIG. 20A is used. The input neurons are divided into multiple groups 2101a to 2101c. The output lines are also divided into multiple groups 2102a and 2102b. The input neurons may connect to input signals IN0[0] to IN0[m]. The output lines may connect to output signals OUT0[0] to OUT0[n]. When the input group 2101a and the output group 2102a are selected, the synapses group 2103a is selected. The unselected inputs and outputs may be floating or applied a reverse-bias during normal operation, or inhibit voltage during write operation. Please notice, because of the diodes, any sneak path leakage current flowing through the floating input and output neurons is eliminated.

Figure 21B:
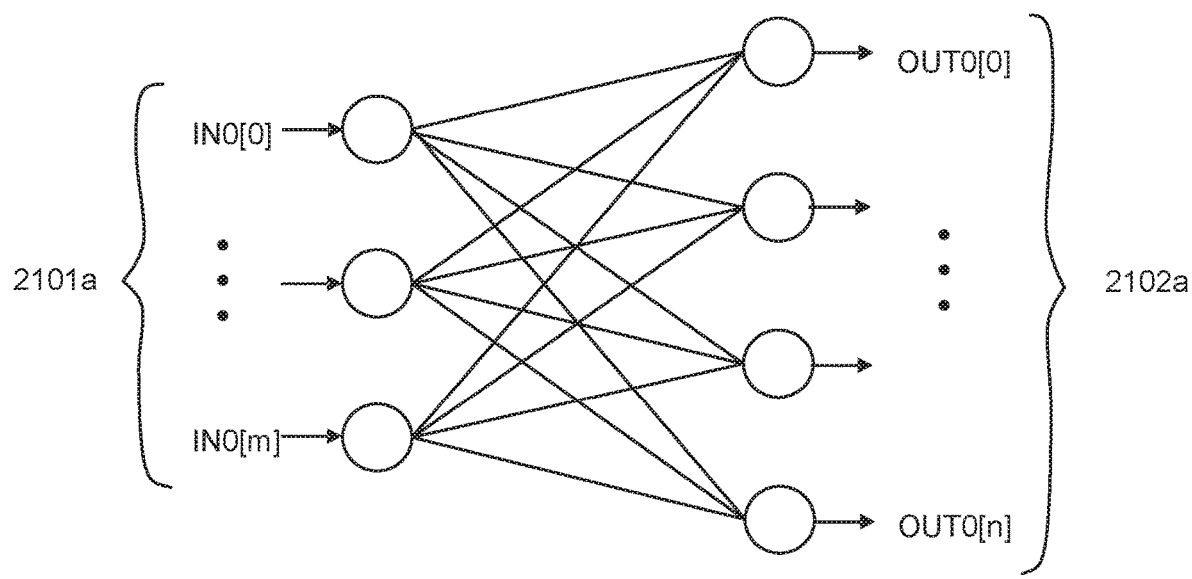

FIG. 21B shows an equivalent neural network diagram of the group 2103a shown in FIG. 21A. By using this technique, a very large array may be partitioned into multiple groups to allow each group to be used to learn and perform specific tasks.

Figure 21C:
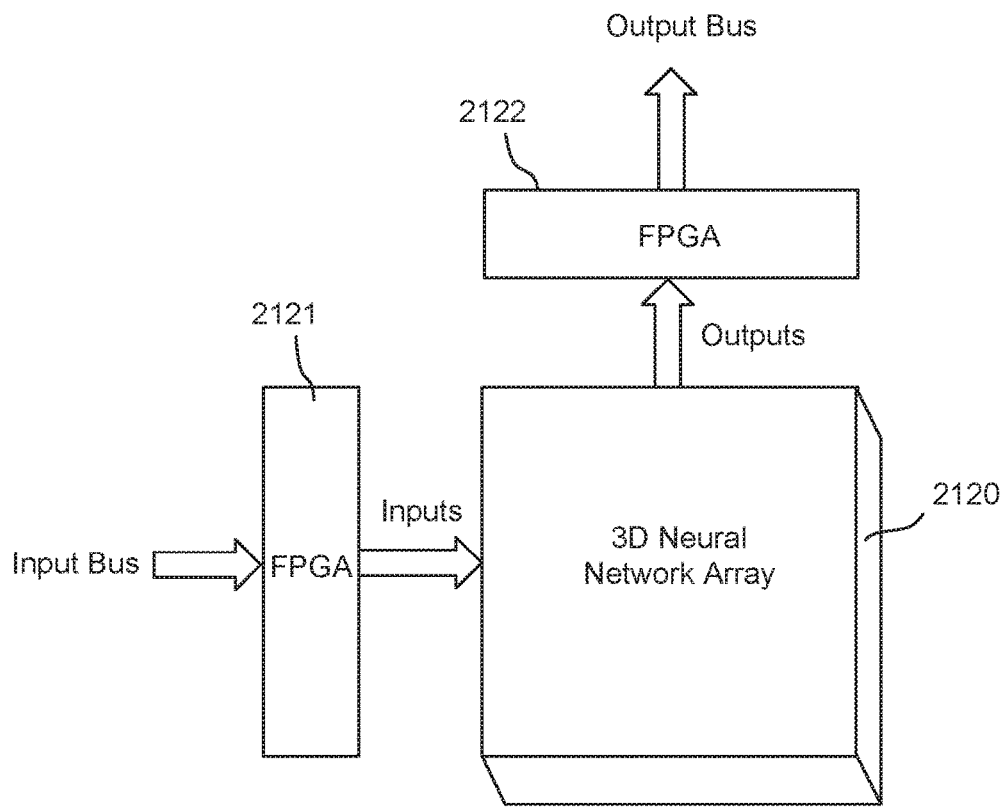

FIG. 21C shows an exemplary integrated circuit chip that includes a built-in FPGA Field Programmable Gate Array or other programmable logic to partition the number and connections of the input and output neurons. The 3D neural network array 2120 is part of the chip. The chip has a first FPGA 2121 to change the partition of the input neurons, and a second FPGA 2122 to change the partition of the output neurons and output lines. This provides high flexibility for customizing the neural network chip. The FPGAs may be implemented by using any proper technology, such as resistive material, MOS transistor, flash memory, etc.

Figure 22A:
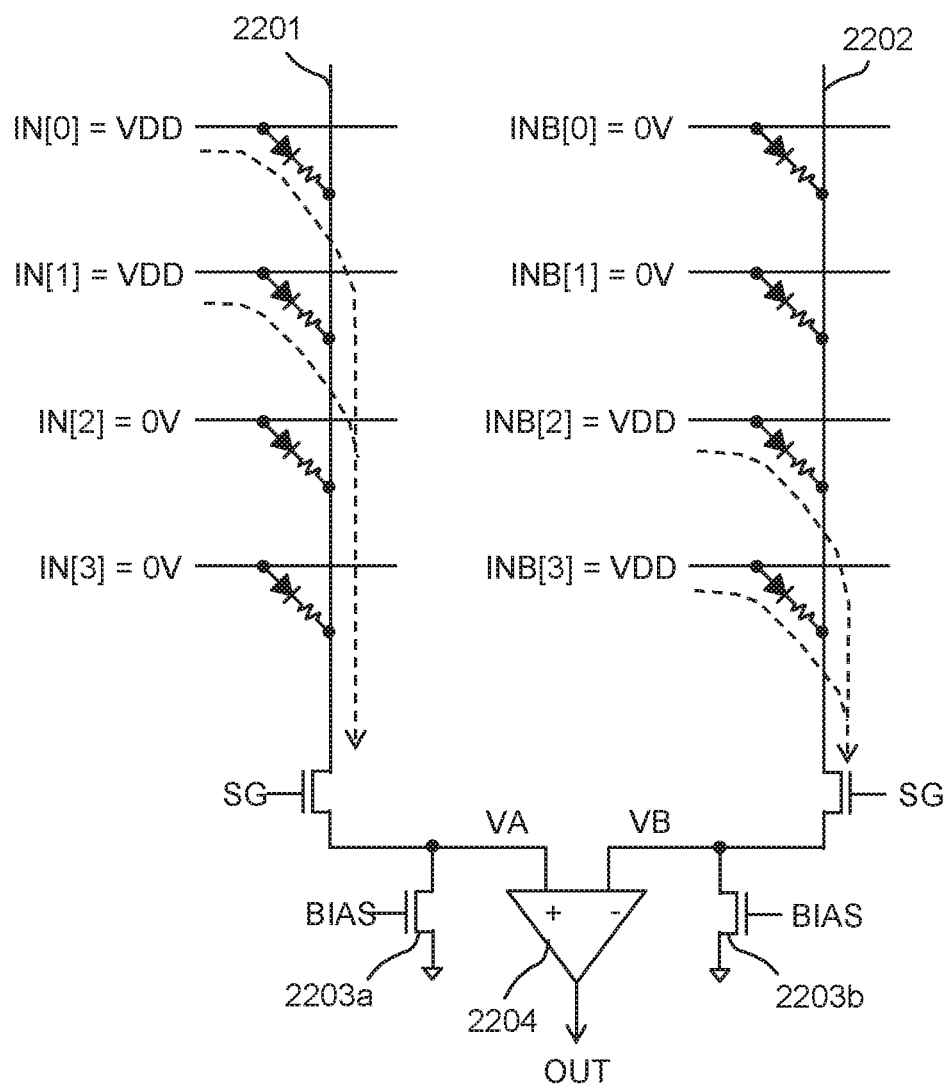
FIGS. 22A-J show exemplary embodiments of a neural network array.

FIG. 22A shows an exemplary embodiment of a neural network array designed to overcome current restrictions. For example, although the diodes prevent sneak leakage current through the unselected floating neurons, the diodes also cut off the current if the input is lower than the threshold of the diodes. Therefore, only the inputs that are higher than the threshold of the diodes may pass current to the output neuron.

Referring to FIG. 22A, assuming the inputs IN[0] to IN[3] are supplied with VDD and 0V as shown. Because of the diodes, only the VDD input, IN[0] and IN[1], will flow current into the output neuron 2201. The 0V input, IN[2] and IN[3], will not overcome the diode threshold to have current flow. As a result, the output neuron 2201 will be only pulled up by IN[0] and IN[1], but not pulled down by IN[2] and IN[3]. To solve this problem, the exemplary embodiment discloses a novel approach called a "complementary array." The complementary array contains another output neuron 2202 that is supplied with the complementary inputs INB[0] to INB[3]. The data of IN[0:3] and INB[0:3] are complementary. For example, for digital input, the complementary input of 1 (VDD) may be 0 (0V). For analog input from 1V to 10V scale, the complementary data of 3V may be 7V. By using the complementary input, the INB[2] and INB[3] are supplied with VDD and will flow current to the output neuron 2202, while INB[0] and INB[1] will not. The pull up current of the two output neurons 2201 and 2202 are rationed with pull-down devices 2203a and 2203b to generate output voltages VA and VB, respectively. The pull-down devices may be implemented by using resistors, too. VA and VB are compared by a comparator 2204 to generate the output OUT. Because the VA and VB are connected to the positive and negative inputs of the comparator, respectively, the synapses on 2201 represent 'positive weight' and the synapses on 2202 represents 'negative weight'.

Figure 22B:
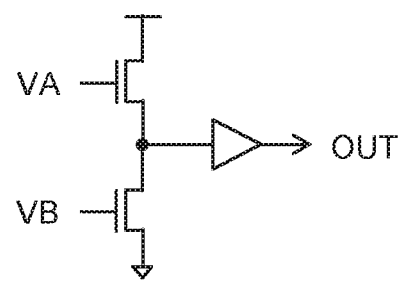

The voltages of VA and VB may be compared by a comparator circuit, or a simplified circuit shown in FIG. 22B to reduce the circuit size. The circuit in FIG. 22B may be implemented by using a 'latch-type' comparator.

Figure 22C:
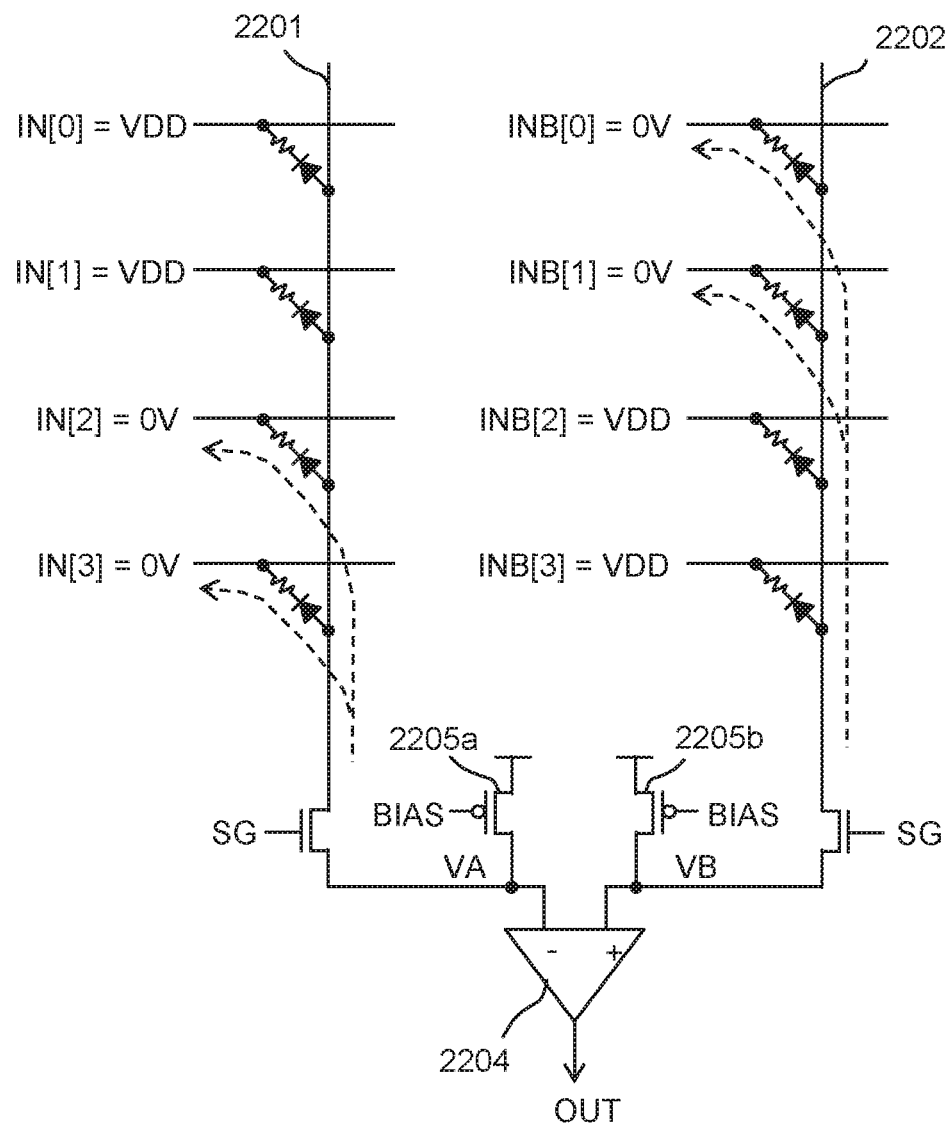

FIG. 22C shows another exemplary embodiment. In this embodiment, it is assumed that the diodes' direction is reverse from the output neurons toward the input neurons. For the output neuron 2201, the current will flow from the neuron to the 0V inputs, IN[2] and IN[3]. For the complementary output neuron 2202, the current will flow from the neuron to the 0V inputs, INB[0] and INB[1]. Two pull-up devices 2205a and 2205b are used to ratio with the pull-down current to generate VA and VB that are compared by a comparator 2204 to generate the output OUT. The pull-up devices may be implemented by using resistors.

Figure 22D:
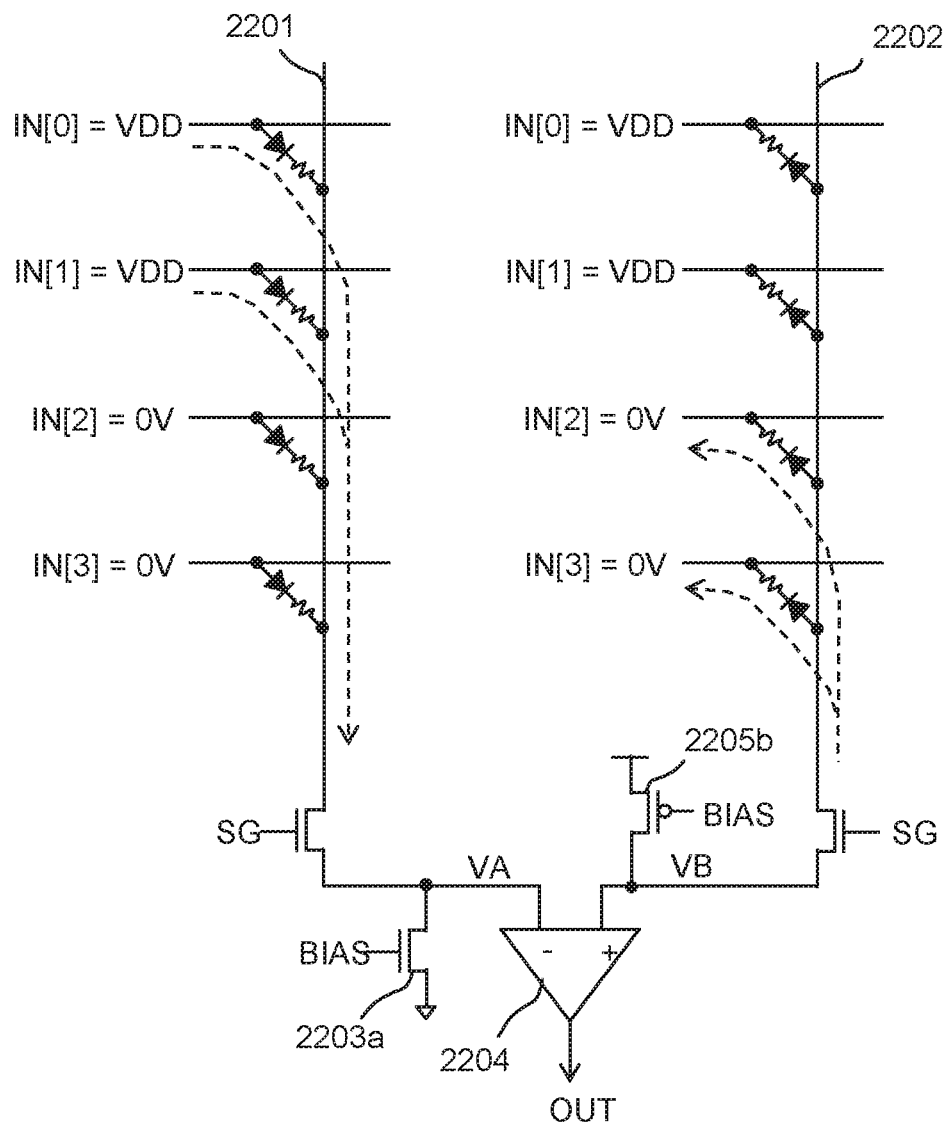

FIG. 22D shows another exemplary embodiment. In this embodiment, the array 2201 and the complementary array 2202 have the opposite-direction diodes as shown. Therefore, the array 2201 will be a pull-up array while the complementary array 2202 will be a pull-down array. In this way, the same inputs may be applied to both arrays. The pull-up array may have a pull-down device 2203a and the pull-down array may have a pull-up device 2205b. The voltages VA and VB then are compared by a comparator 2204 to generate the output OUT. The reverse diode of the complementary array may be realized by process, or by reversing the inputs and outputs connection of the array. For example, referring to FIG. 21A, the first array may use 2101a as input and 2102a as output, while the complementary array may use 2102a as input and 2101a as output.

Figure 22E:
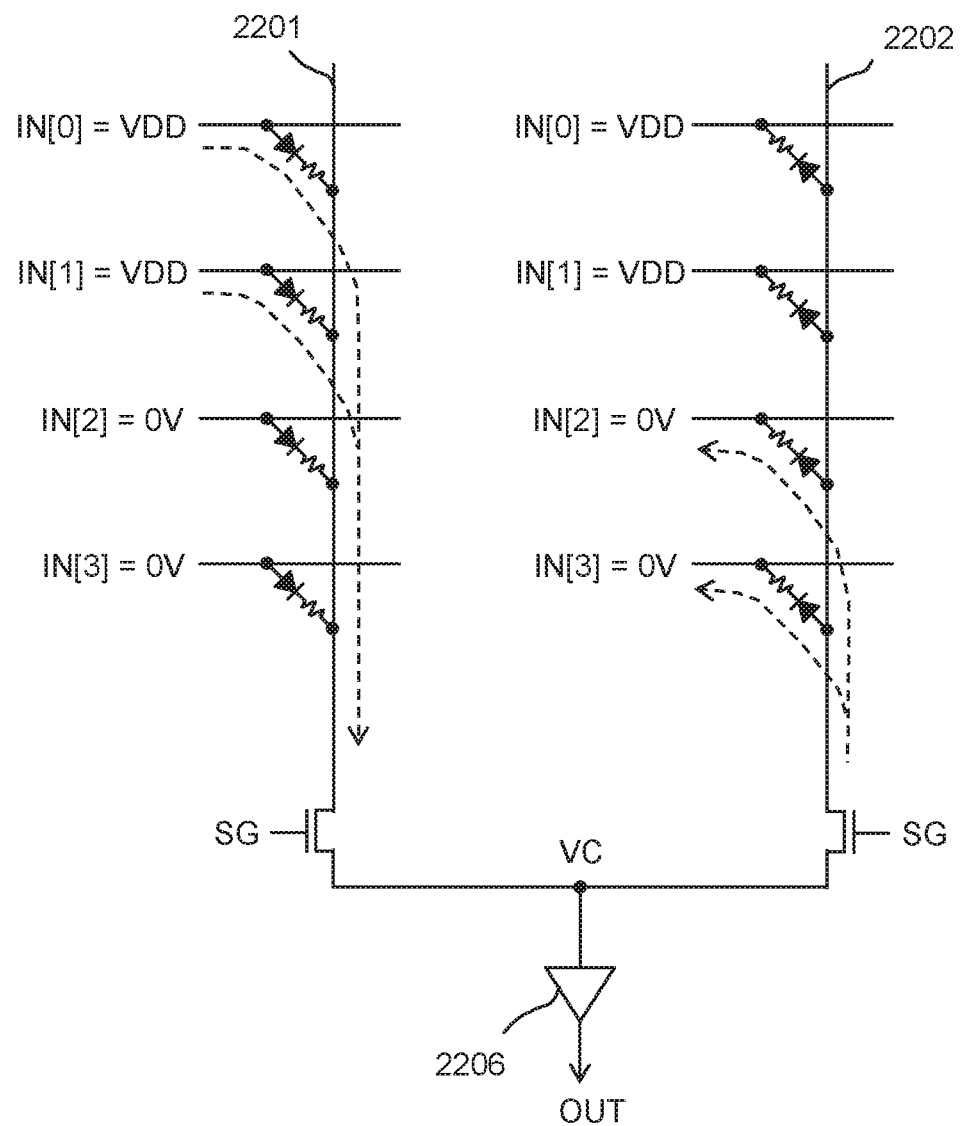

FIG. 22E shows another exemplary embodiment. This embodiment is similar to FIG. 22D, except that the output neuron in the first array 2201 and the output neuron in the complementary array 2202 are connected to let the inputs IN[0] and IN[1] ratio with the inputs IN[2] and IN[3] to directly generate the voltage VC. VC may be applied to a buffer 2206 or a comparator with a reference voltage to generate the output OUT.

Figure 22F:
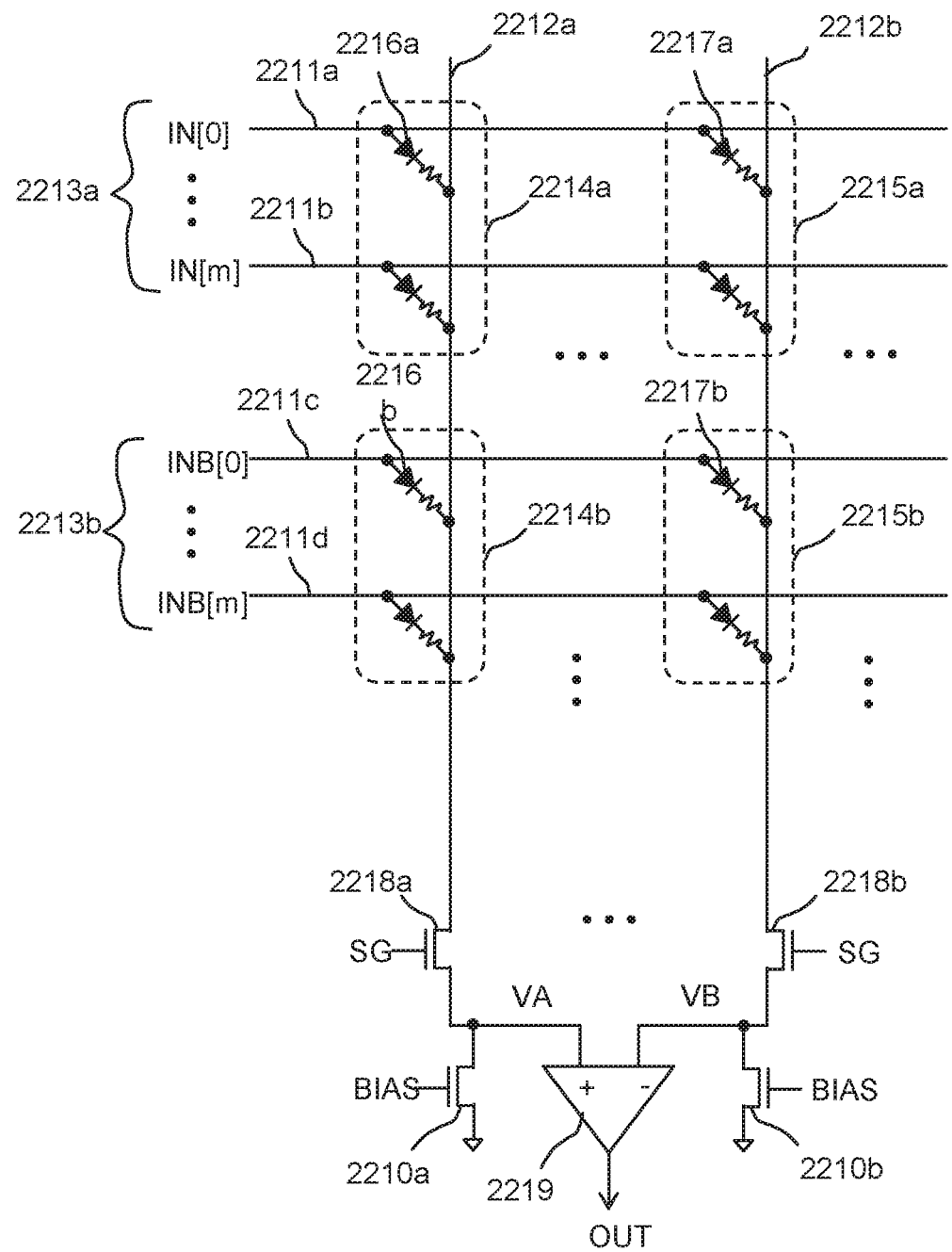

FIG. 22F shows another exemplary embodiment of a neural network array. The input group 2213a is connected to the inputs IN[0] to IN[m], and the input group 2223b is connected to the complementary inputs INB [0] to INB [m]. The output neurons such as 2212a and 2212b may be located in the same array or different arrays. This embodiment solves the problem that may occur when the inputs are lower than the threshold of the diode and thus cannot pass current. In this embodiment, each input may have four synapses. The groups 2214a and 2215a are for high inputs and the groups 2214b and 2215b are for low inputs. Also shown are positive weights 2214a and 2214b and negative weights 2215a and 2215b.

For example, if IN[0] is VDD, it will pass current through synapses 2216a and 2217a to the neurons 2212a and 2212b, respectively. The current through 2216a will pull high VA to make output 1, while the current through 2217b will pull high VB to make output 0. Therefore, the synapses 2214a and 2214b represent positive and negative weights, respectively. If IN[0] is 0V, it will not pass the synapses 2216a and 2217a. Instead, its complementary inputs INB[0] will VDD, that will pass current through the synapses 2216b and 2217b to the neurons (or signal lines) 2212a and 2212b, respectively. In this way, the high and low inputs, and the positive and negative weights are taken into account by this neural network array architecture.

The signal lines 2212a and 2212b may be selected by decoders such as 2218a and 2218b, and connected to a comparator 2219. The signal lines 2212a and 2212b may be connected with pull-down devices 2210a and 2210b or pull-down resistors to generate voltages VA and VB. The comparator 2219 compares VA and VB to generate the output OUT.

Figure 22G:
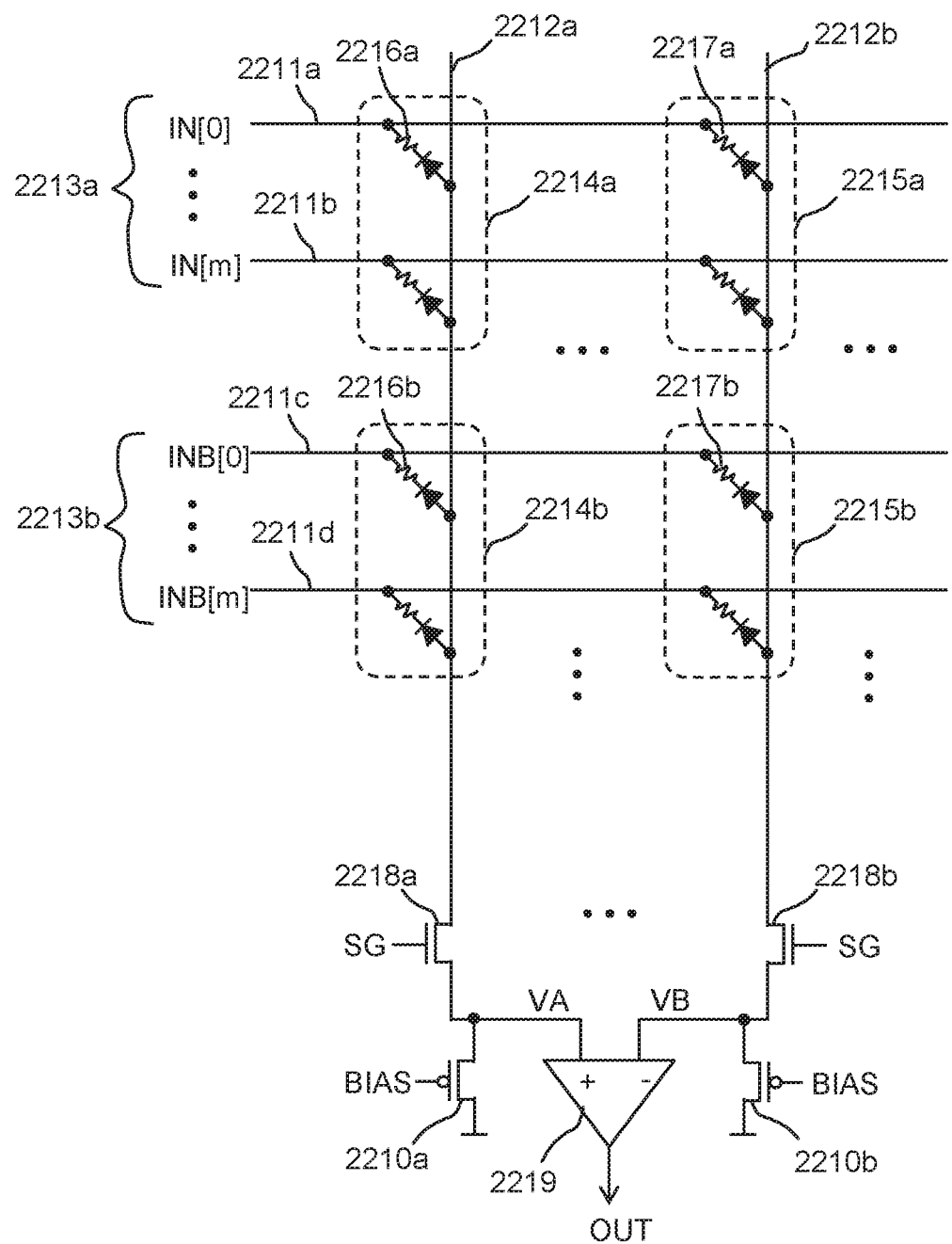

FIG. 22G shows another embodiment of a neural network array. In this embodiment, the diodes of the synapses may have the opposite direction as those shown in FIG. 22F. In embodiment, the synapse groups 2214a and 2215a are for low inputs. The groups 2214b and 2215b are for high inputs. The devices 2210a and 2210b may be pull-up devices or pull-up resistors.

Figure 22H:
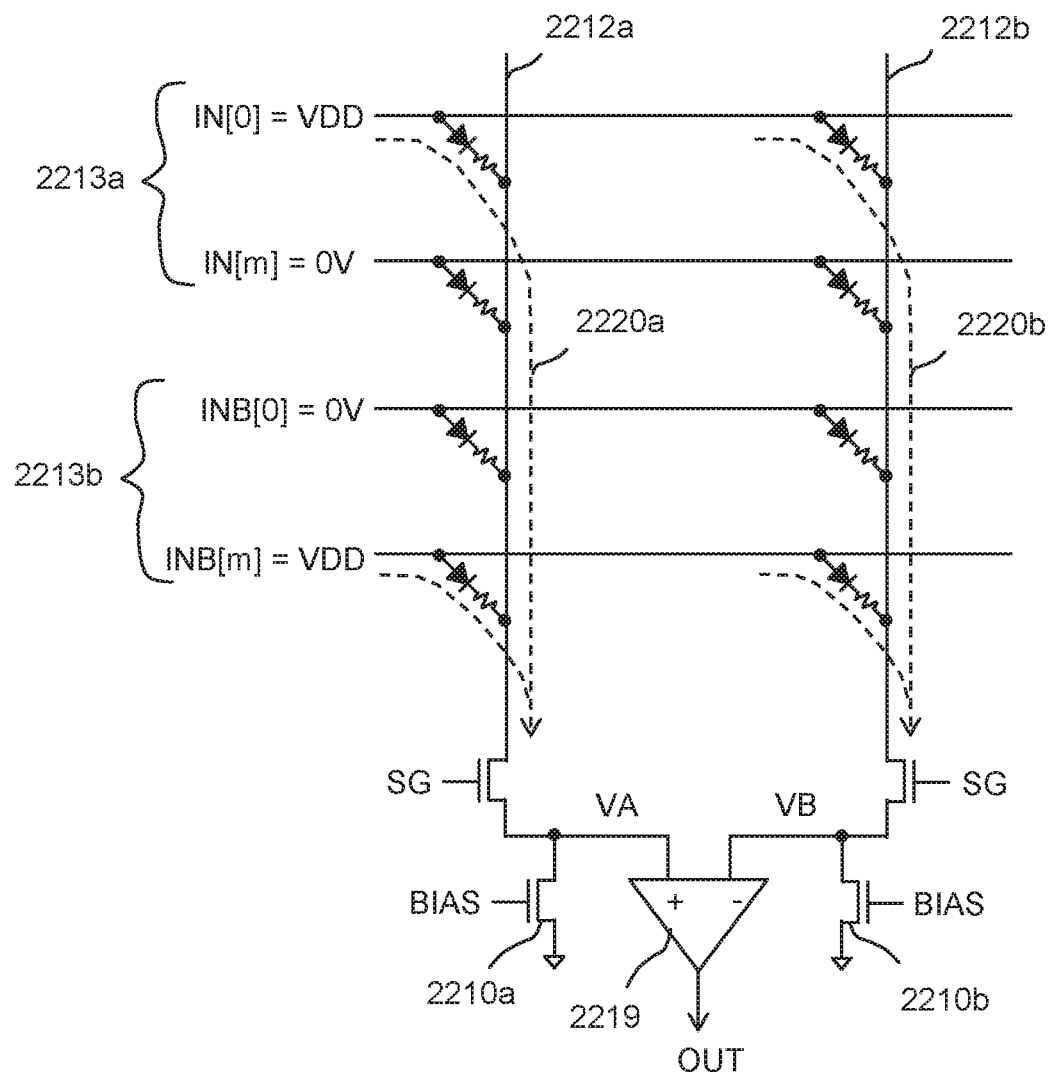

FIG. 22H shows exemplary operation of the array embodiment shown in FIG. 22F. Assuming inputs IN[0] and IN[m] are VDD and 0V, respectively. IN[0] and INB[m] will pass current to the output neurons 2212a and 2212b as shown by the dashed lines 2220a and 2220b, respectively.

Figure 22I:
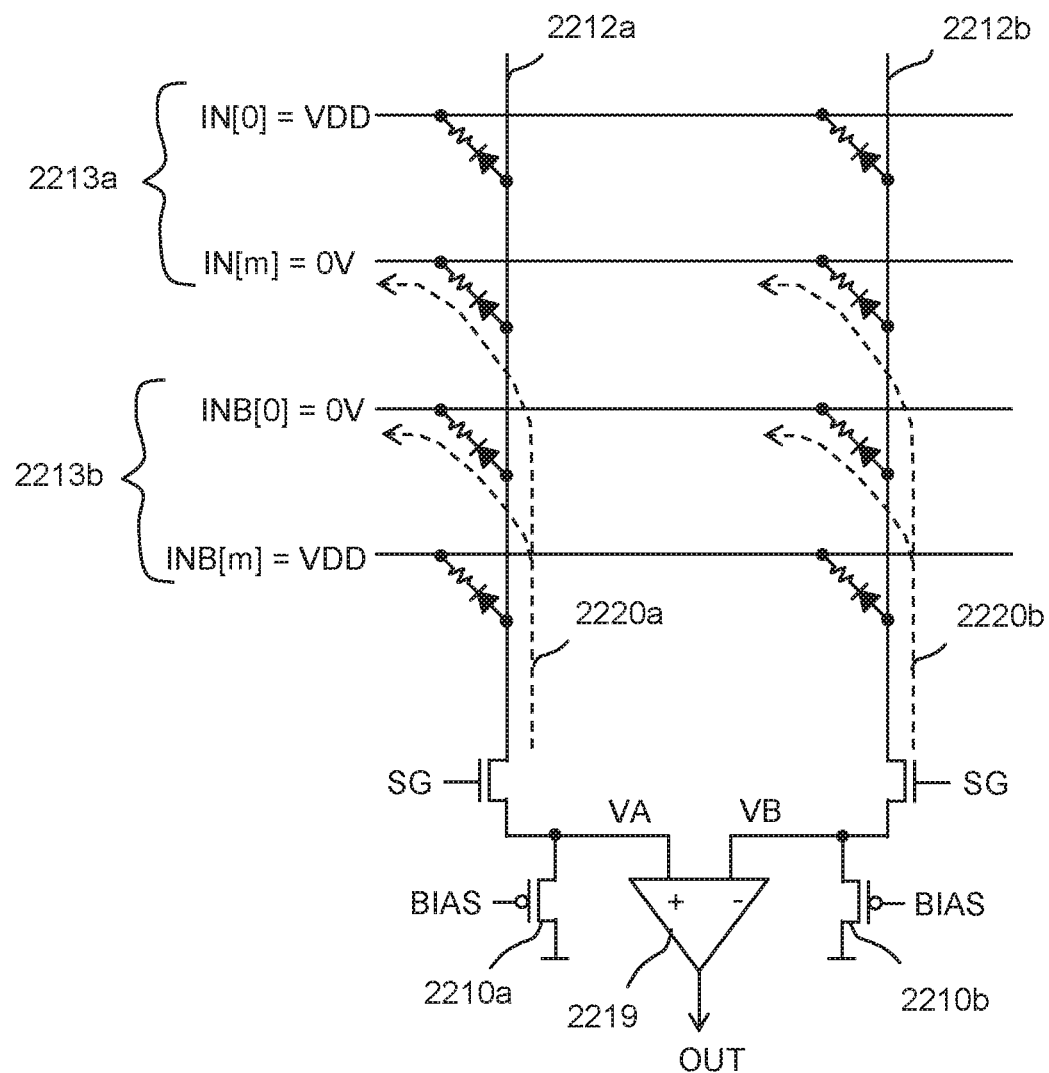

FIG. 22I shows exemplary operation of the array embodiment shown in FIG. 22G. Assuming inputs IN[0] and IN[m] are VDD and 0V, respectively. INB[0] and IN[m] will pass current from the output neurons 2212a and 2212b as shown by the dashed lines 2220a and 2220b, respectively.

Figure 22J:
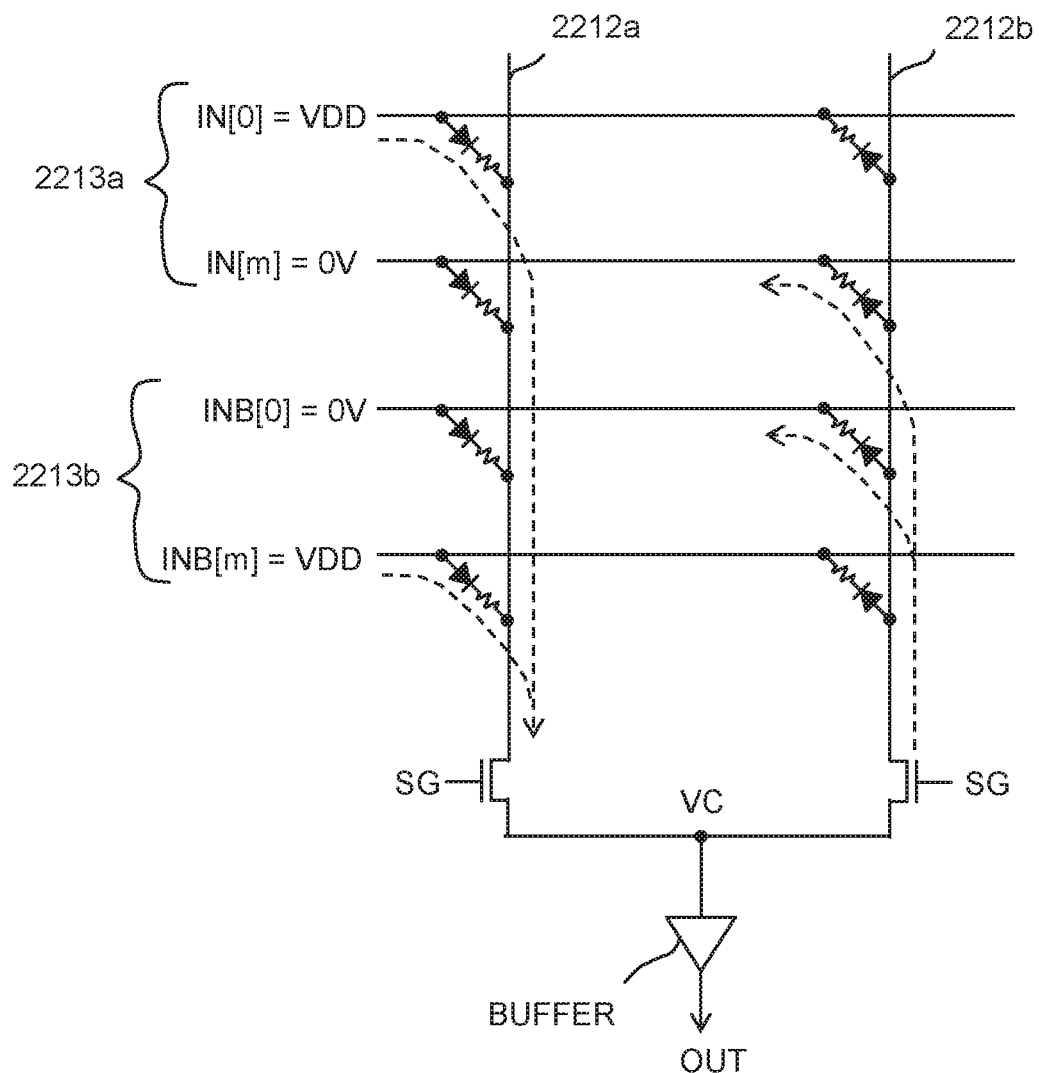

FIG. 22J shows another exemplary neural network array embodiment having output neurons 2212a and 2212b that have the diodes in opposite directions. In this embodiment, the outputs neurons are directly connected to generate the voltage VC at the output of the buffer as shown.

In various exemplary embodiments, the first (or normal) array and the complementary array may be physically separated into two arrays, or may be merged inside one array.

Figure 23A:
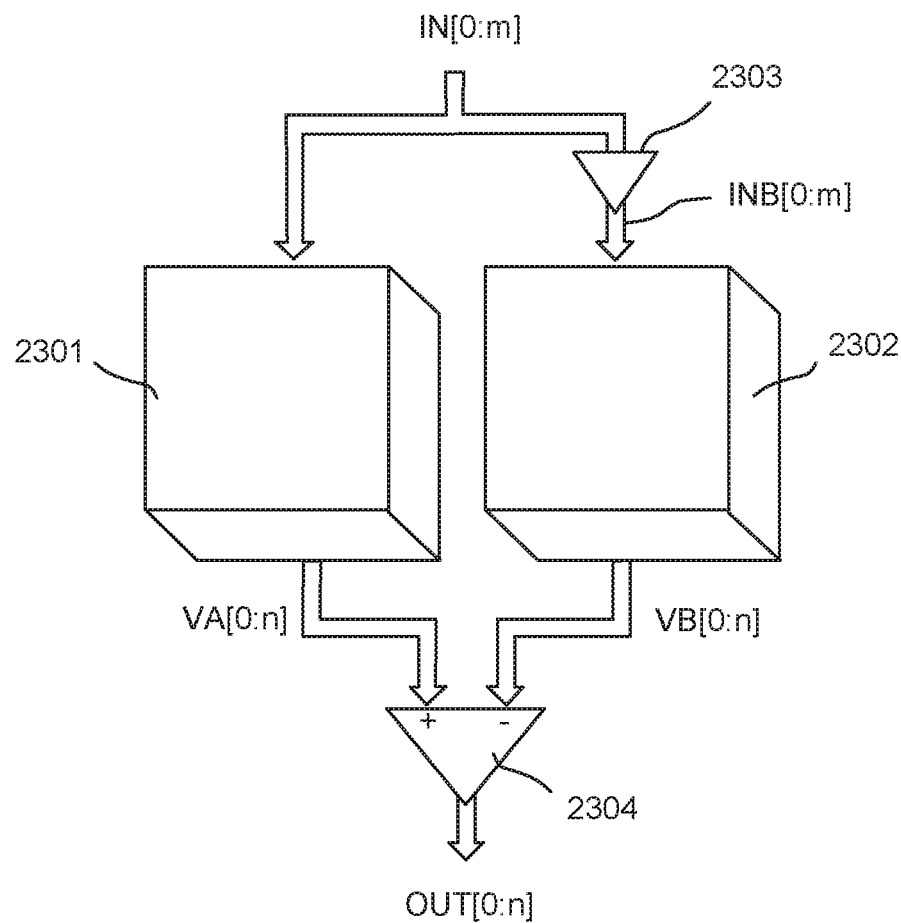
FIGS. 23A-C show exemplary embodiments of a neural network diagrams.

FIG. 23A shows an embodiment of a neural network array block diagram. The block diagram in FIG. 23A represents one layer of neural network, for example, as shown in FIG. 21B. A normal array 2301 and a complementary array 2302 are shown. The inputs IN[0:m] may be fed into inverters 2303 for digital inputs or a complementary data generator for analog inputs, to generate the complementary inputs INB[0:m]. The inputs IN[0:m] are fed into the normal array 2301 to generate the output voltage VA[0:n]. The complementary inputs INB[0:m] are fed into the complementary array 2302 to generate the output voltage VB[0:n]. The voltages VA[0:n] and VB[0:n] are fed into comparators 2304 to generate the outputs OUT[0:n].

Figure 23B:
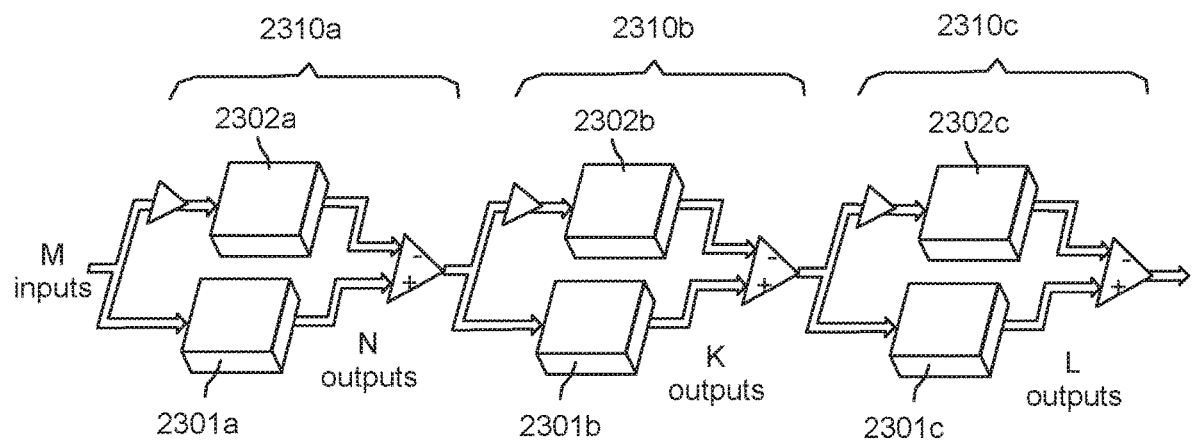
Figure 23C:
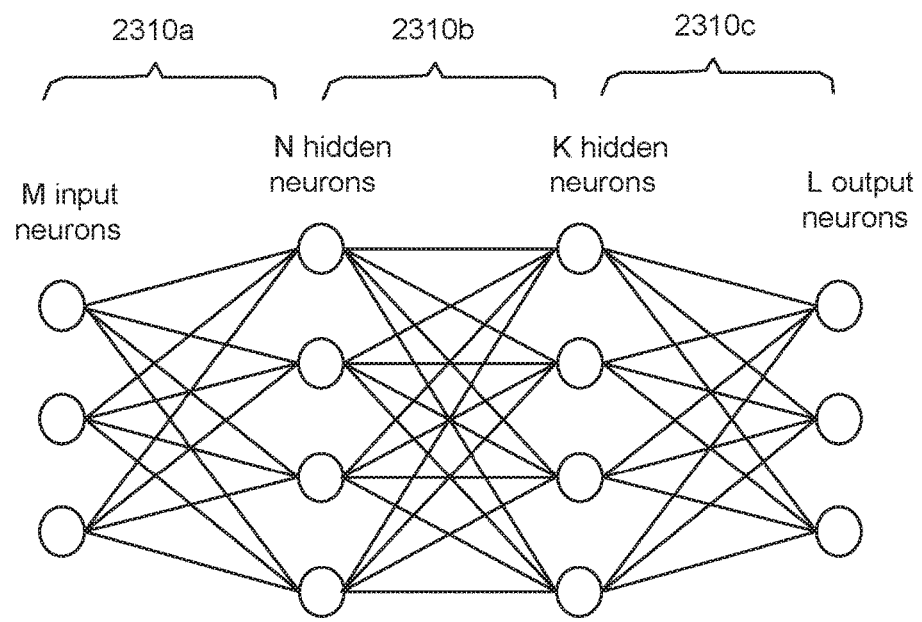

FIG. 23B shows an exemplary embodiment of an integrated circuit chip comprising a neural network array wherein a chip contains multiple blocks (e.g., 2310a to 2310c). Each block's outputs are sent to the next block's inputs. This creates multiple-layer neural networks. For example, the normal arrays 2301a to 2301c and the complementary arrays 2302a to 2302c are shown. As previously described, each array's number of inputs and outputs may be freely configured by using FPGA or other programmable logic. For example, the first block 2310a may have M inputs and N outputs. The second block 2310b may have N inputs and K outputs. The third block 2310c may have K inputs and L outputs. As a result, the blocks shown in FIG. 23B realizes the multiple-layer neural network shown in FIG. 23C. The embodiments described above using the complementary array requires double array capacity.

Figures 24A, 24B:
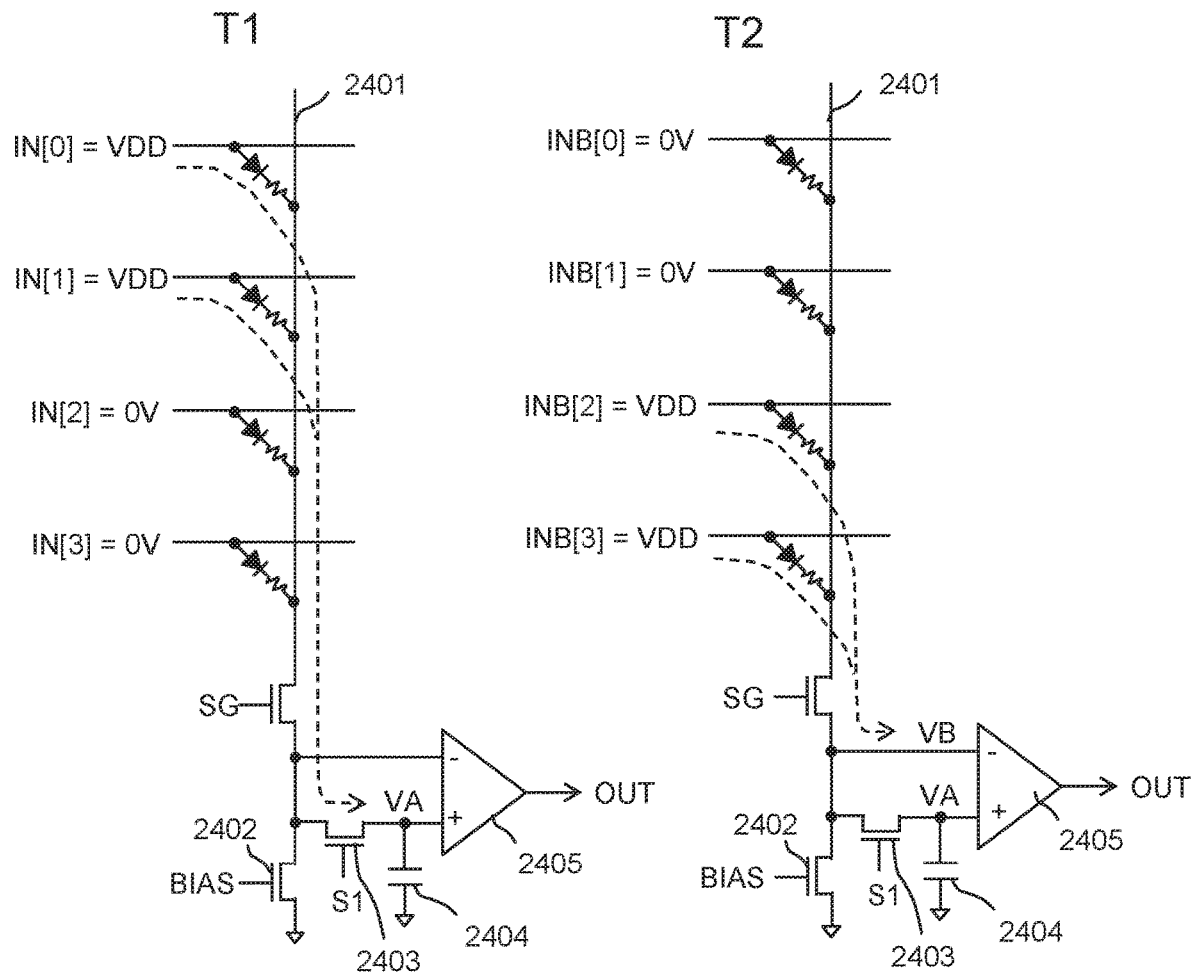
FIGS. 24A-E show exemplary embodiments of neural network arrays.

FIGS. 24A-B show exemplary embodiments of neural network arrays that only require single array capacity. Referring to FIG. 24A, at T1 time, the inputs IN[0] to IN[3] are applied to the array. Due to the diodes, only the high inputs IN[0] and IN[1] will flow current to the output neuron 2401. The current is connected with the pull-down device 2402 to generate the voltage VA. The voltage VA is stored in a capacitor 2404 by turning on the transistor 2403. After VA is stored, the transistor 2403 is turned off.

At T2 time, the complementary inputs INB[0] to INB[3] are applied to the array. This time, only the high inputs INB[2] and INB[3] will flow current to the output neuron 2401. The current is connected with the pull-down device 2402 to generate voltage VB. Then, the voltage VB is compared with the voltage VA stored in the capacitor 2404 by a comparator 2405 to generate the output OUT. After the outputs are generated, the outputs may be sent to the next layer's neural network. By using this embodiment, only single array capacity is required.

Figure 24C:
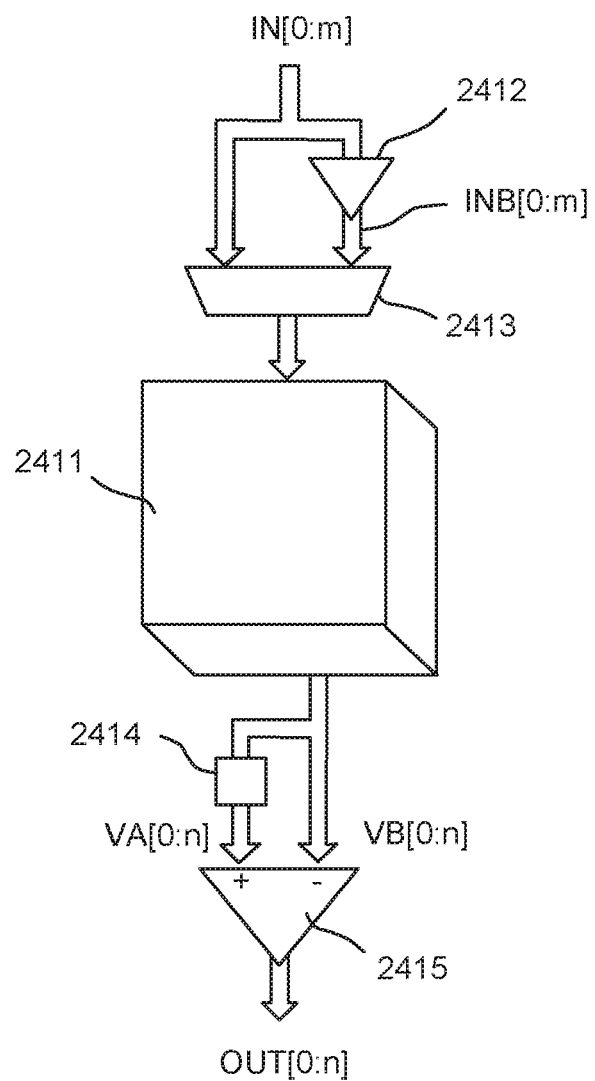

FIG. 24C shows an exemplary block diagram of an integrated circuit having a neural network array 2411. The inputs IN[0:m] may be fed into inverters 2412 for digital inputs or a complementary data generator for analog inputs, to generate the complementary inputs INB[0:m]. Also shown is a multiplexer 2413. At T1 time, the multiplexer 2413 will select IN[0:m] as the array's inputs to generate the output VA[0:n] that are stored in the sampling and hold circuit 2414. At T2 time, the multiplexer 2413 will select INB[0:m] as the array's inputs to generate the outputs VB[0:n]. The outputs VA[0:n] and VB[0:n] are fed into comparators 2415 to generate the outputs OUT[0:n]. In an embodiment, the block diagram in FIG. 24C represents one layer of neural network, as shown in FIG. 21B.

Figure 24D:
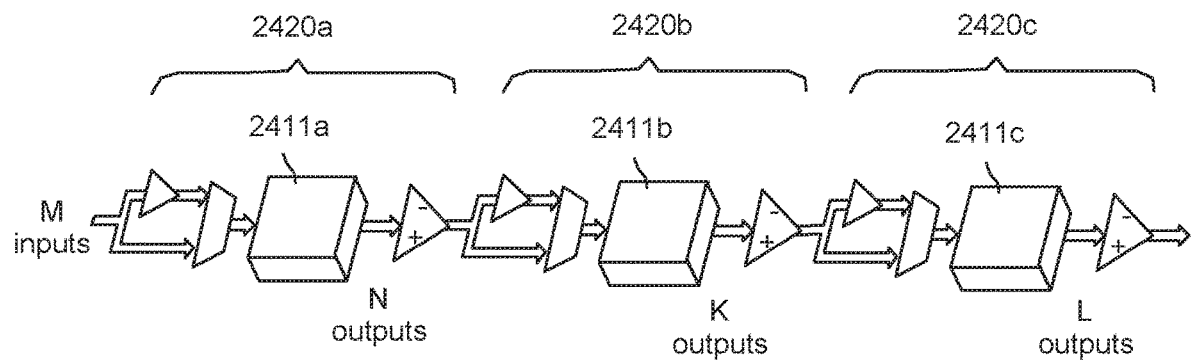
Figure 24E:
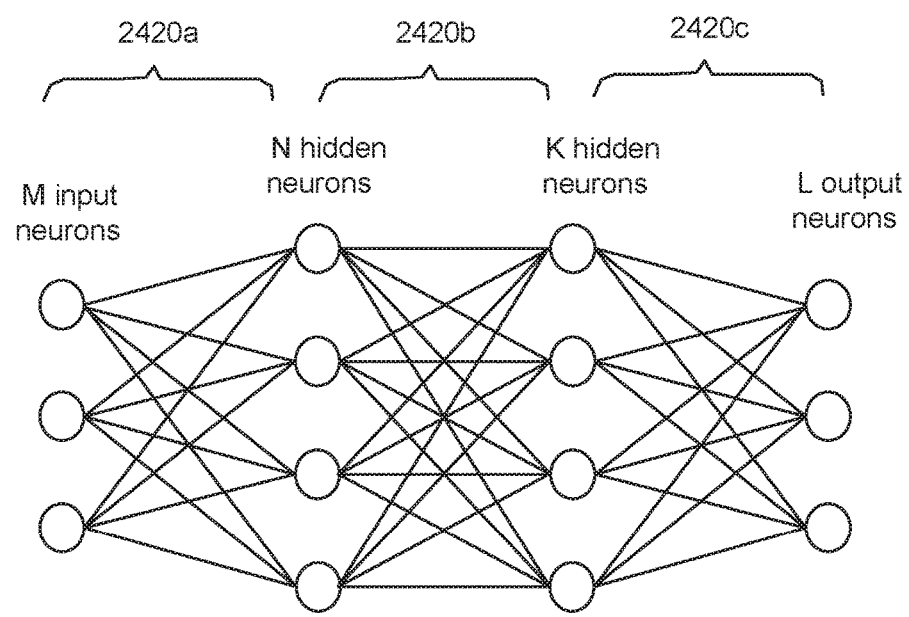

FIG. 24D shows an exemplary embodiment of an integrated circuit chip that contains multiple neural network blocks 2420a to 2420c. Each block's outputs are sent to the next block's inputs. This creates multiple-layer neural networks. The neural network arrays 2411a to 2411c are shown. As previously described, each array's number of inputs and outputs may be freely configured by using FPGA or other programmable logic. For example, the first block 2420a may have M inputs and N outputs. The second block 2420b may have N inputs and K outputs. The third block 2420c may have K inputs and L outputs. As a result, the blocks shown in FIG. 24D realizes the multiple-layer neural network shown in FIG. 24E.

Figure 25A:
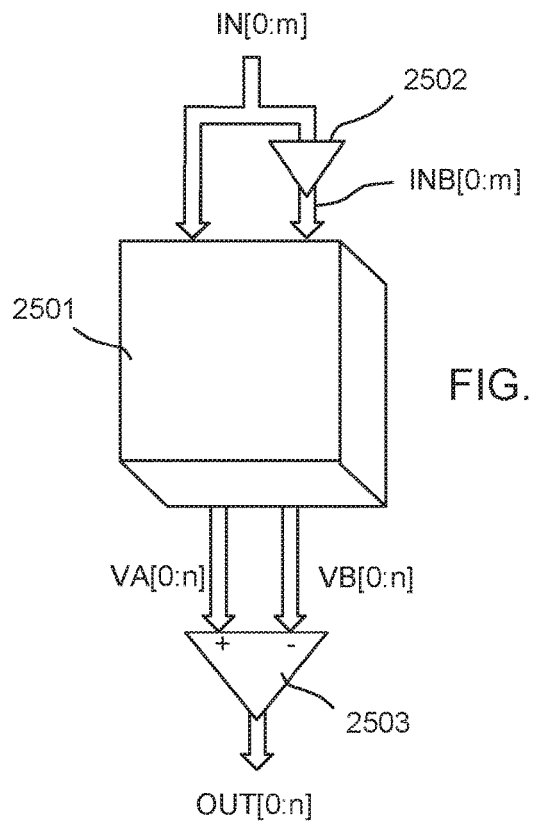
FIGS. 25A-C show exemplary embodiments of neural network structures according to the embodiments shown in FIGS. 22F-G.

FIG. 25A shows an exemplary embodiment of a neural network according to the embodiments shown in FIGS. 22F-G. The 3D neural network array 2501 is shown. In this embodiment, both the positive weights and negative weights are located in the same array. A complementary input generator 2502 is shown, which may be invertors for digital inputs or complementary value generators for analog inputs. The complementary input generator 2502 will generate the complementary inputs INB[0:m]. Both IN[0:m] and INB[0:m] may be fed into the array 2501 to generate outputs VA[0:n] and VB[0:n]. The comparators 2503 compare VA[0:n] and VB[0:n] to generate the outputs OUT[0:n].

Figure 25B:
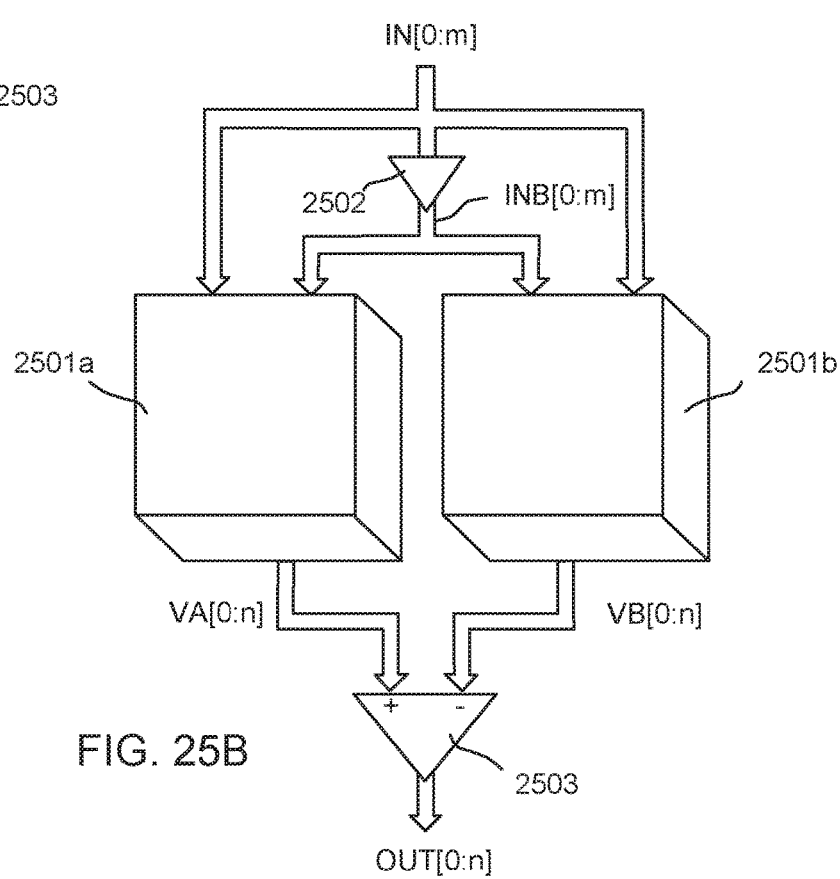

FIG. 25B shows another exemplary embodiment of a neural network block diagram. In this embodiment, the positive weights and negative weights are located in two arrays 2501a and 2501b, respectively. The outputs of the arrays, VA[0:n] and VB[0:n] are compared by the comparators 2503 to generate the outputs OUT[0:n].

Figure 25C:
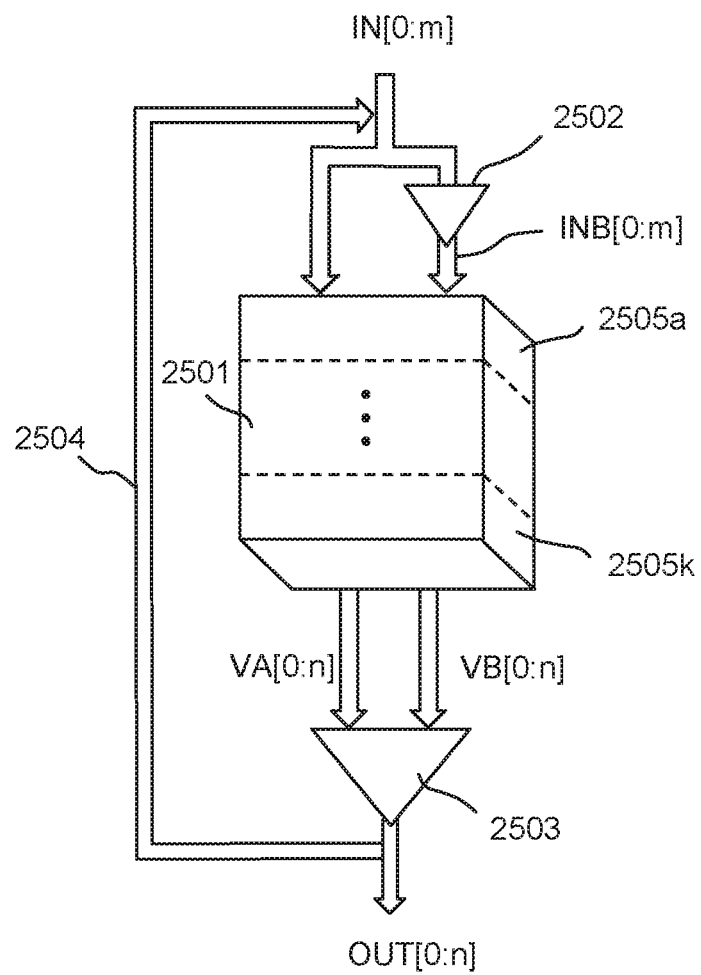

FIG. 25C shows another exemplary embodiment of a neural network array. In this embodiment, the synapses of multiple layers of a neural network, such as layers 2505a to 2505k, are located in the same array. The outputs of the first layer are fed back to the inputs as shown by path 2504 to be the inputs of the second layer. The second layer's outputs may be fed back to be the inputs of the third layer, and so on.

Figure 26:
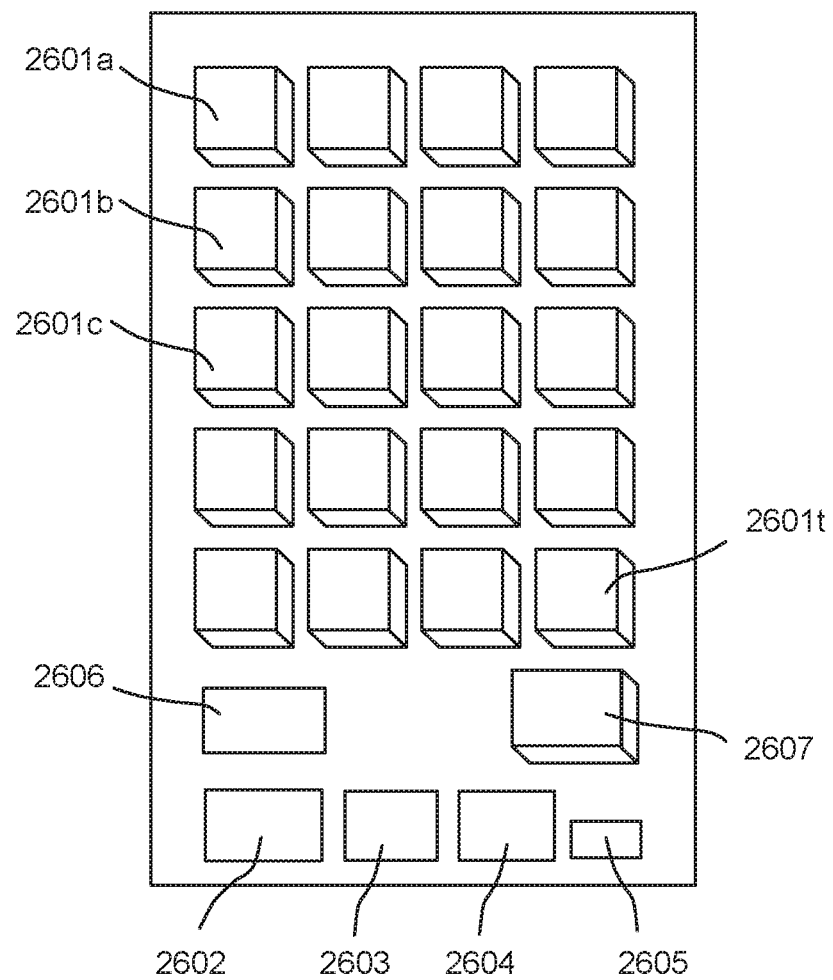
FIG. 26 shows an exemplary embodiment of the 3D neural network chip.
Figure 27A:
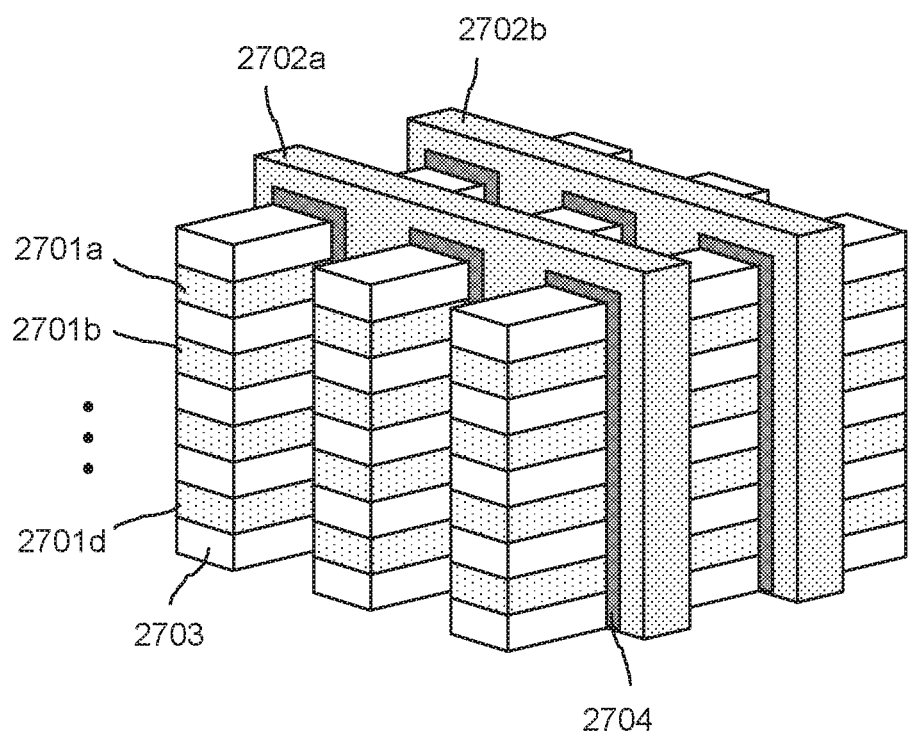
FIGS. 27A-D show exemplary embodiments of 3D neural network arrays.
Figure 27B:
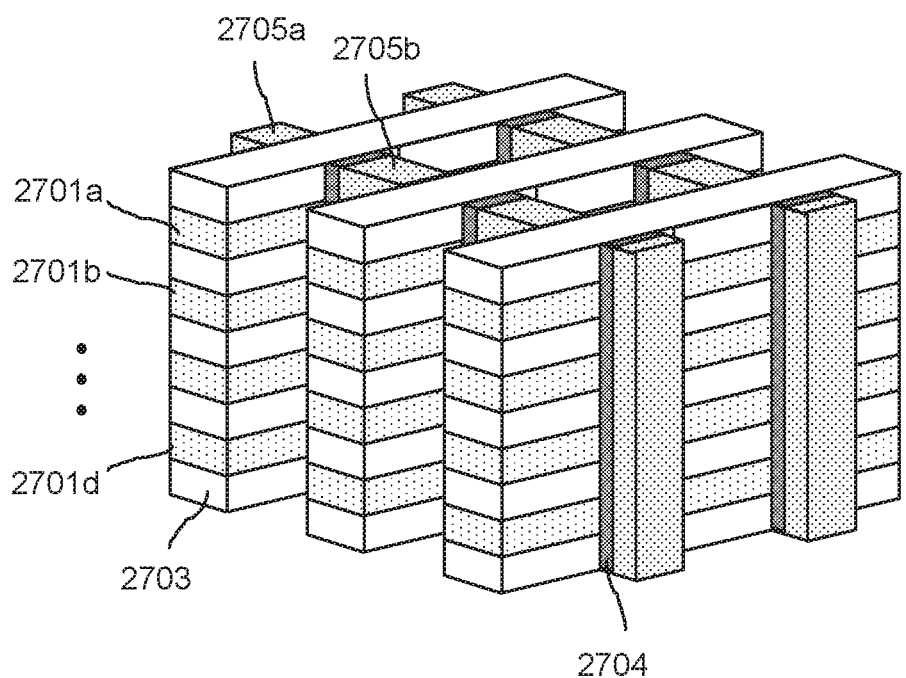
Figure 27C:
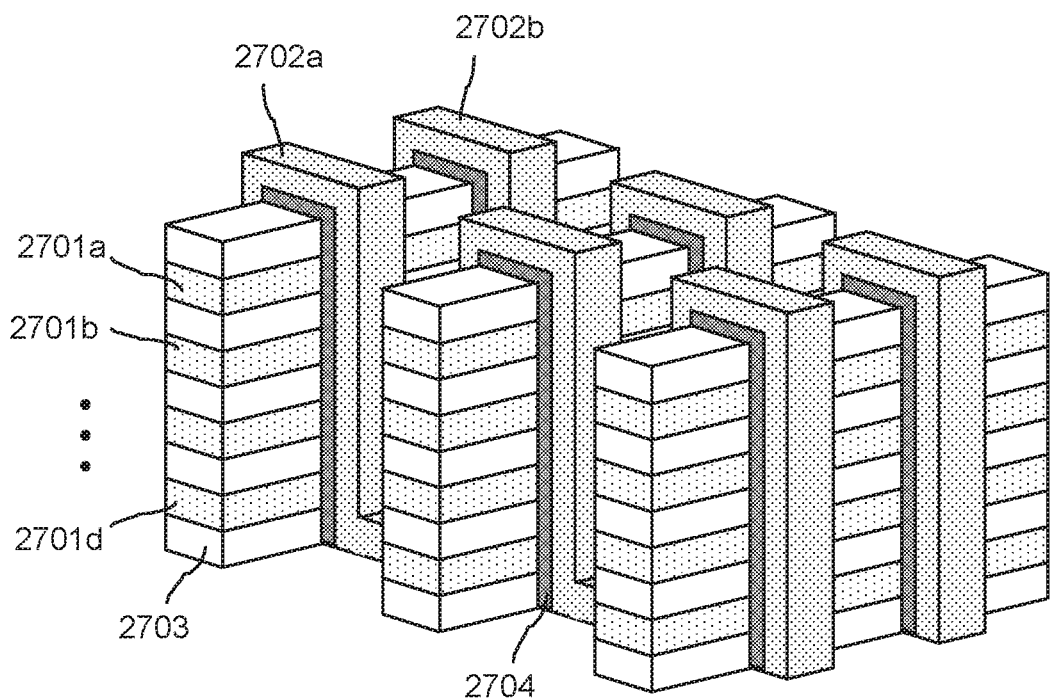
Figure 27D:
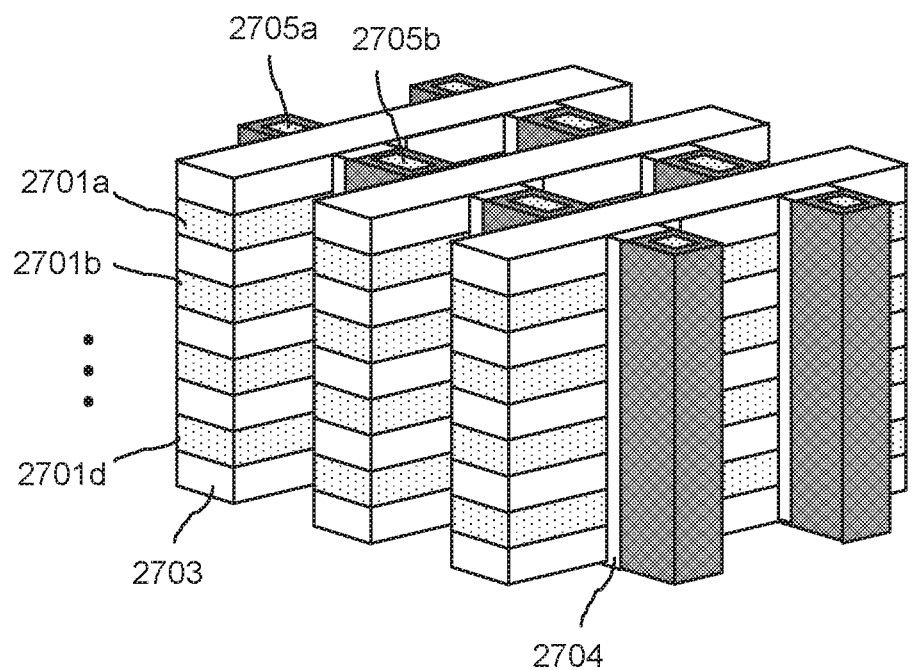

FIG. 26 shows an exemplary embodiment of a 3D neural network chip. The chip comprises multiple 3D neural network arrays 2601a to 2601t as previously described. The number of each array's inputs and outputs may be freely configured by using FPGA or other programmable logic. The arrays may be also freely connected to form any number of layers of neural networks. The chip includes an embedded processor 2602 to perform forward-propagation and back-propagation algorithms. The chip also includes a programming control unit 2603 to program the weights of the neural networks after their values are determined by the processor 2602. The chip also includes a FPGA or programmable logic unit 2604 to configure the array architecture and bus routing. The chip also includes an I/O control unit 2605, a working memory 2606 and a non-volatile memory 2607. The non-volatile memory may be also formed as a 3D array with the same elements as the 3D neural network arrays.

FIGS. 27A-D show several embodiments of 3D neural network arrays. The arrays include input neuron layers 2701a to 2701d and output neuron layers 2702a to 2702b. Also shown are a synapse layer 2703 including a weight layer and an activation function layer.

Figure 28A:
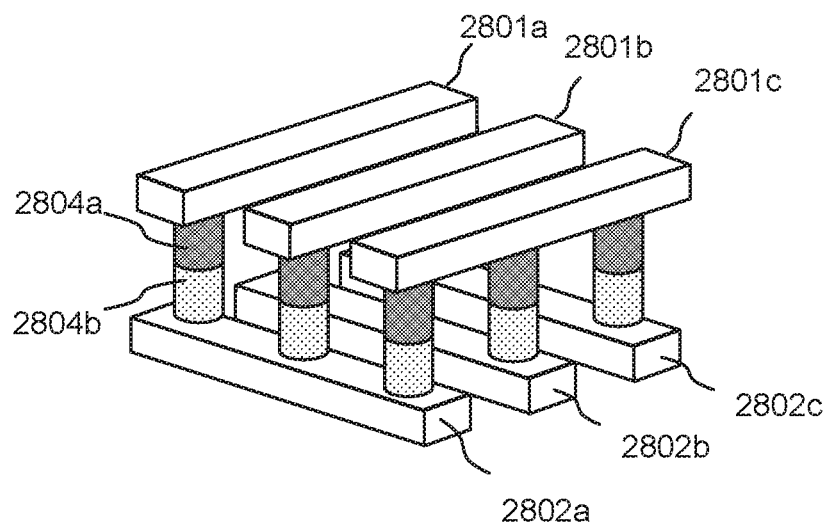
FIGS. 28A-B show exemplary embodiments of single-layer crossbar array

FIG. 28A shows an exemplary embodiment of single-layer crossbar array having input neurons 2801a to 2801d and output neurons 2802a to 2802c. The array also includes a weight layer 2804a and an activation function layer 2804b.

Figure 28B:
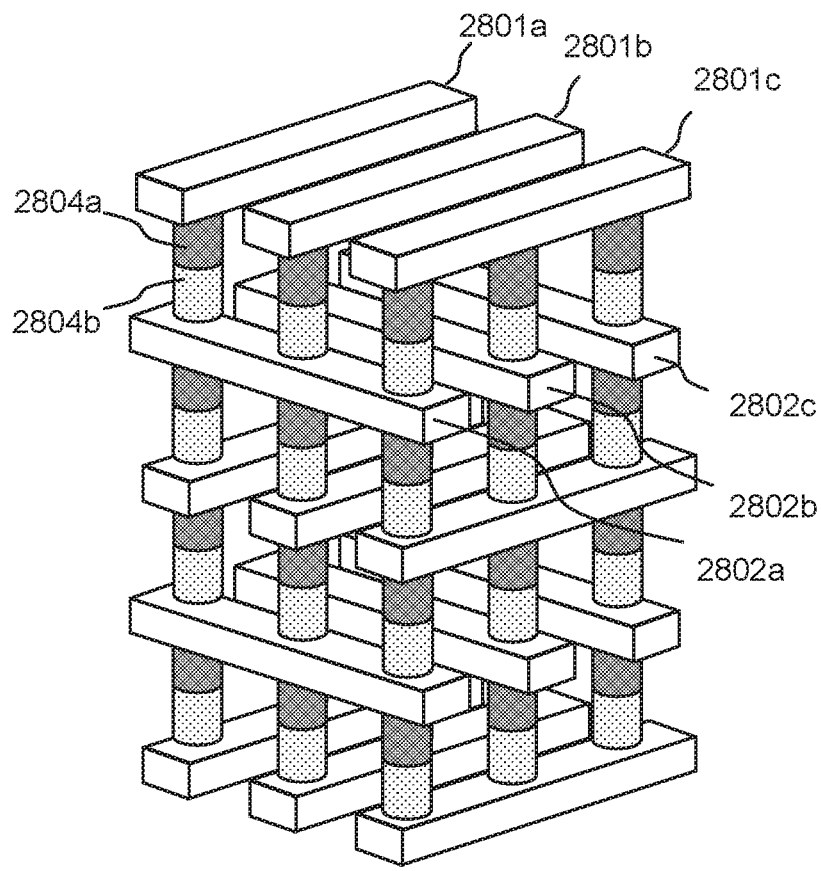

FIG. 28B shows another embodiment of multiple-layer crossbar neural network array that includes additional layers within the scope of the embodiment.

Figure 29:
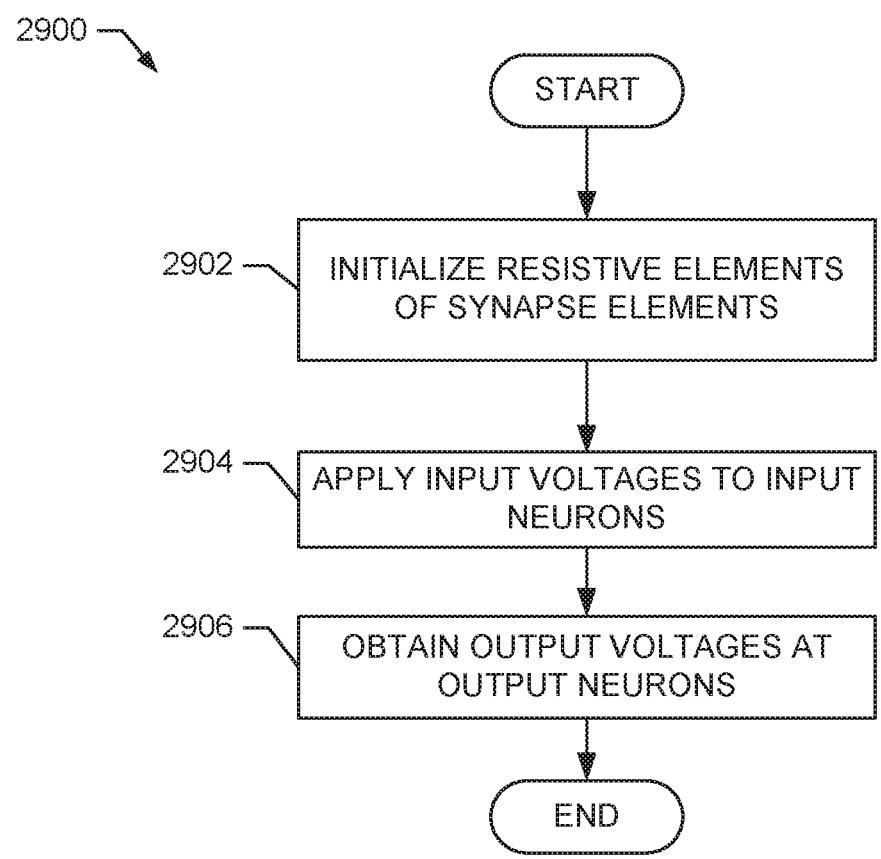
FIG. 29 shows an exemplary embodiment of method for operating a 3D neural network structure.

FIG. 29 shows an exemplary embodiment of method 2900 for operating a 3D neural network structure. For example, the method 2900 is suitable for use with the 3D arrays described above.

At block 2902, the resistive elements (or weights) of the synapse elements of the array are initialized. For example, resistive elements of each synapse of a 3D neural network structure are set to a particular resistance value as determined from training or other type of learning operations. In an exemplary embodiment, the resistive element of each synapse element is appropriately biased to achieve the desired resistive value. For example, each resistive element can be set to a particular resistive value selected from a range of resistive values or to a particular resistive value selected from a plurality of resistive "steps."

At block 2904, input voltages are applied. For example, input voltages are applied to the input neurons or input signal lines of the input layer of the 3D neural network structure.

At block 2906, output voltages are obtained at the output neurons or output signal lines of the 3D neural network structure. For example, the input signals flow through the synapses associated with the input layer, hidden layers, and output layer to generate the output voltages of the 3D neural network structure.

Thus, the method 2900 operates a 3D neural network structure. It should be noted that the method 2900 is exemplary and that the disclosed operations may be combined, rearranged, added to, deleted, and/or modified within the scope of the embodiments.

Figure 30:
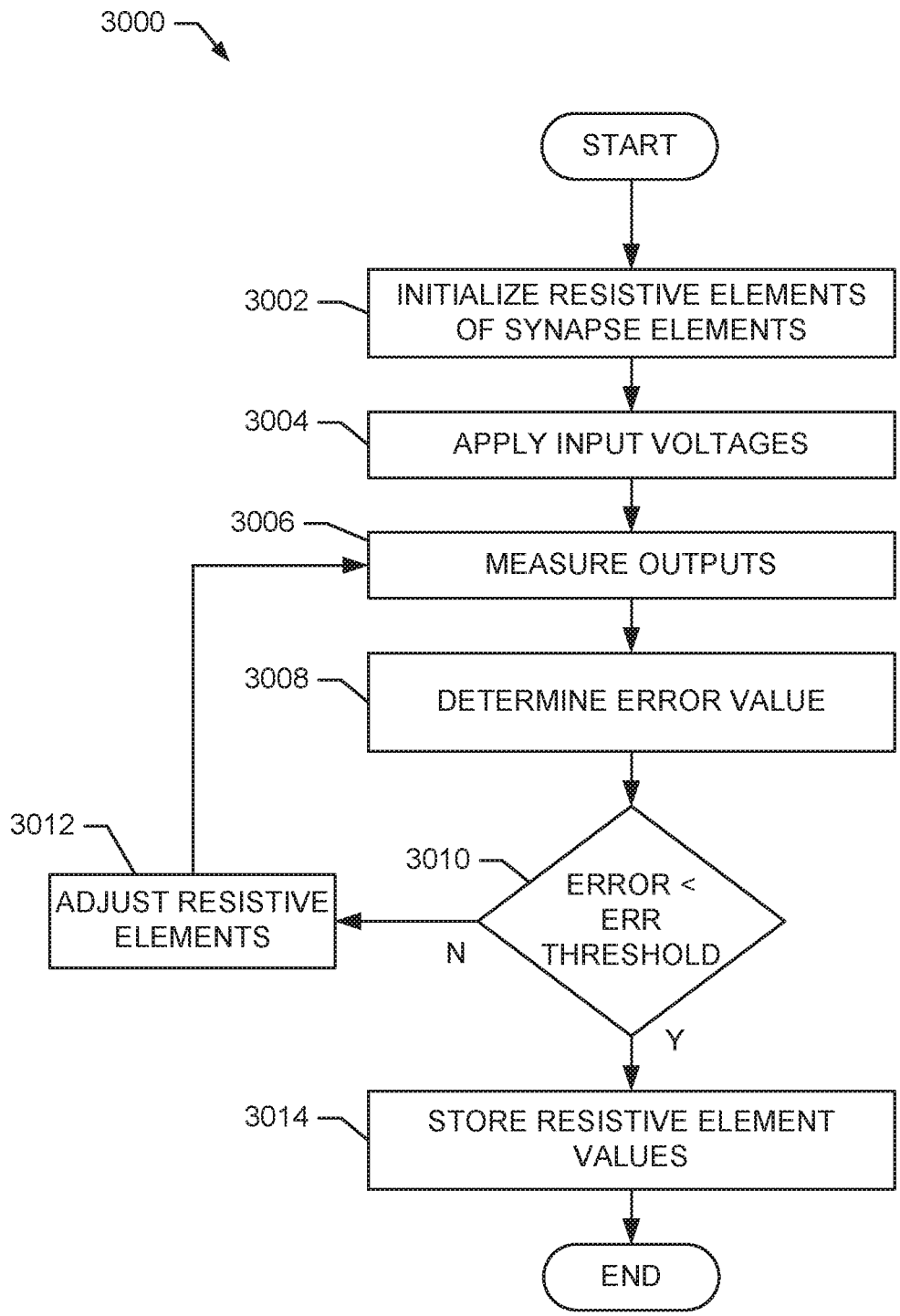
FIG. 30 shows an exemplary embodiment of method for programming a 3D neural network structure.

FIG. 30 shows an exemplary embodiment of method 3000 for operating a 3D neural network structure to program synapse elements. For example, the method 3000 is suitable for use to operate the 3D array neural network structures described above.

At block 3002, the resistive elements (or weights) of the synapse elements are initialized. For example, the resistance values for each synapse may be stored in a memory and programmed into the 3D neural network array. For example, a resistance value is programmed into a resistive element by appropriately biasing the resistive element to achieve the desired resistance value. An external programming device may be used to bias the resistive elements appropriately.

At block 3004, input voltages are applied. For example, the input voltages are applied to the neurons of the input layer. The input voltages then flow through the layers of the 3D neural network structure based on the weights of the synapse elements and the summing performed at each neuron.

At block 3006, outputs of the 3D neural network structure are obtained at the output layer.

At block 3008, an error value is computed. For example, a desired output voltage is known and a difference between the actual output voltage and the desired output voltage is taken to determine an error value.

At block 3010, a determination is made as to whether the error value is less than an error threshold. For example, the determined error value is compared to a pre-stored error threshold. If the error value is not less than the error threshold, the method proceeds to block 3012. If the error value is less than the error threshold, the method proceeds to block 3014.

At block 3012, the weights associated with one or more synapse elements are adjusted to reduce the error value. In an exemplary embodiment, a back-propagation algorithm is used to determine selected synapse elements to adjust and to determine how much to adjust those selected elements. Then, those elements are set to have the updated resistance (or weight) values. The method then proceeds to block 3006 to determine a new output value based on the newly configured synapse weights.

At block 3014, the weights of the synapse elements of the 3D neural network structure are stored. For example, the current resistance values have resulted in the error value being less than the error threshold. When the 3D neural network structure is to be operated to perform the desired function, the stored weights are retrieved from memory and used to set the values of the resistive elements to configured the 3D neural network structure to perform the selected function.

Thus, the method 3000 provides a method for operating a 3D neural network structure to program synapse elements. It should be noted that the method 3000 is exemplary and that the disclosed operations may be combined, rearranged, added to, deleted, and/or modified within the scope of the embodiments.

While exemplary embodiments of the present invention have been shown and described, it will be obvious to those with ordinary skills in the art that based upon the teachings herein, changes and modifications may be made without departing from the exemplary embodiments and their broader aspects. Therefore, the appended claims are intended to encompass within their scope all such changes and modifications as are within the true spirit and scope of the exemplary embodiments of the present invention.

What is claimed is:

1. A monolithic three-dimensional (3D) neural network array structure, comprising:
a plurality of input conductors forming input neurons as a plurality of stacked input layers having a first orientation;
at least one output conductor forming an output neuron as an output layer having the first orientation;
a plurality of hidden conductors forming hidden neurons having a second orientation, and wherein each hidden conductor includes an in-line threshold element; and
synapse elements coupled between the hidden neurons and the input neurons and between the hidden neurons and the output neuron, and wherein each synapse element includes a programmable resistive element, and wherein at least a portion of the synapse elements are located on corresponding input layers of the input neurons.

2. The 3D neural network of claim 1, wherein the hidden conductors pass through the input and output layers.

3. The 3D neural network of claim 1, wherein the first orientation is horizontal and the second orientation is vertical.

4. The 3D neural network of claim 1, wherein the input and output layers are perpendicular to the hidden conductors.

5. The 3D neural network of claim 1, wherein the input layers are coupled to the hidden conductors on an input side of the in-line threshold elements and the output layer is coupled to the hidden conductors on an output side of the in-line threshold element.

6. The 3D neural network of claim 1, wherein each in-line threshold element comprises threshold material selected from a set of materials comprising diode material, Schottky diode material, NbOx material, TaOx material or VCrOx material.

7. The 3D neural network of claim 1, wherein each programmable resistive element comprises material selected from a set of materials comprising resistive material, phase change material, ferroelectric material, and magnetic material.

8. The 3D neural network of claim 1, wherein each programmable resistive element is programmable to provide a selected one of a plurality of selectable resistances.

9. The 3D neural network of claim 1, wherein input signals applied to the input conductors flow through programmable resistive elements of a first group of synapse elements to the hidden conductors, flow through the in-line threshold elements of the hidden conductors, and flow through programmable resistive elements of a second group of synapse elements to the output conductor.

10. A synapse element for use in a monolithic three-dimensional (3D) neural network array structure having a first conductor forming an input neuron having a first orientation and a second conductor forming a hidden neuron having a second orientation, the synapse element comprising:
a threshold layer having an outside surface connected to the first conductor and having an inside surface; and
a programmable resistive layer having an outside surface connected to the inside surface of the threshold layer and having an inside surface connected to the second conductor, and wherein the programmable resistive layer is programmable to provide a plurality of resistance values, and wherein the synapse element is located the same layer as the input neuron.

11. The synapse element of claim 10, wherein the threshold layer comprises threshold material selected from a set of materials comprising diode material, Schottky diode material, NbOx material, TaOx material or VCrOx material.

12. The synapse element of claim 10, wherein the programmable resistive layer comprises material selected from a set of materials comprising resistive material, phase change material, ferroelectric material, and magnetic material.

13. The synapse element of claim 10, wherein the first and second conductors are orientated in different directions.

14. A monolithic three-dimensional (3D) neural network array structure, comprising:
a first plurality of input conductors forming a first plurality of input layers;
a second plurality of input conductors forming a second plurality of input layers;
a plurality of output conductors forming a plurality of output layers;
a plurality of hidden conductors; and
a plurality of synapse elements that connect the input and output conductors to the hidden conductors, wherein each synapse element includes a programmable resistive element and a threshold element, and wherein at least a portion of the synapse elements are located on corresponding input layers of the input conductors.

15. The 3D neural network of claim 1, wherein each threshold element comprises a diode having a diode input and a diode output.

16. The 3D neural network of claim 15, wherein synapse elements that connect the input conductors to the hidden conductors have diode outputs connected to the hidden conductors.

17. The 3D neural network of claim 15, wherein synapse elements that connect the output conductors to the hidden conductors have diode outputs connected to the output conductors.

18. The 3D neural network of claim 15, further comprising logic that directs output signals from the output conductors to either the first plurality of input conductors or the second plurality of input conductors.

19. The 3D neural network of claim 18, wherein the hidden conductors are partitioned into two or more groups that further partition the first plurality of input conductors and the second plurality of input conductors into a corresponding number of groups, and wherein the logic directs the output signals from the output conductors to any of the groups of the first plurality of input conductors and the second plurality of input conductors.

20. An integrated circuit, comprising:
  a monolithic three-dimensional (3D) neural network array structure, comprising:
    a plurality of input conductors forming input neurons as a plurality of stacked input layers having a first orientation;
    at least one output conductor forming an output neuron as an output layer having the first orientation;
    a plurality of hidden conductors forming hidden neurons having a second orientation, and wherein each hidden conductor includes an in-line threshold element; and
  synapse elements coupled between the hidden neurons and the input neurons and between the hidden neurons and the output neuron, and wherein each synapse element includes a programmable resistive element, and wherein at least a portion of the synapse elements are located on corresponding input layers of the input neurons.

\* \* \* \* \*